US012686235B2

(12) United States Patent
Liukkula et al.

(10) Patent No.: US 12,686,235 B2
(45) Date of Patent: Jul. 21, 2026

(54) STUDDED TYRE HAVING REDUCED ROAD WEAR

(71) Applicant: NOKIAN RENKAAT OYJ, Nokia (FI)

(72) Inventors: Mikko Liukkula, Nokia (FI); Lauri Heikkinen, Nokia (FI); Aappo Laitila, Nokia (FI); Noora Kemppainen, Nokia (FI); Alexandra Shakun, Nokia (FI); Juoko Ilomäki, Nokia (FI); Jarkko Kulmala, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 18/657,589

(22) Filed: May 7, 2024

(65) Prior Publication Data

US 2024/0375457 A1    Nov. 14, 2024

(30) Foreign Application Priority Data

May 8, 2023    (EP) ...................................... 23172081
Apr. 30, 2024    (EP) ...................................... 24173334

(51) Int. Cl.
*B60C 11/16*    (2006.01)
*B60C 9/20*    (2006.01)
(Continued)

(52) U.S. Cl.
CPC .. *B60C 11/1625* (2013.01); *B60C 2009/1828* (2013.01); *B60C 9/20* (2013.01);
(Continued)

(58) Field of Classification Search
CPC . B60C 2009/2223; B60C 9/2204; B60C 9/22; B60C 11/16; B60C 11/1625;
(Continued)

(56) References Cited

U.S. PATENT DOCUMENTS 4,011,899 A    3/1977    Chamberlin
2002/0074072 A1 *  6/2002    Suzuki ................ B60C 15/0072
152/546
(Continued)

FOREIGN PATENT DOCUMENTS

EP    0997322 B1    7/2003
EP    4052927 A1 *  9/2022    ............... B60C 1/00
(Continued)

OTHER PUBLICATIONS

Traficom, "Technical requirements for and type-approval of studded tyres for vehicles", Issued Oct. 2, 2021, (Year: 2021).*
(Continued)

*Primary Examiner* — Katelyn W Smith
*Assistant Examiner* — Thomas Frank Schneider
(74) *Attorney, Agent, or Firm* — Merchant & Gould P.C.

(57)    ABSTRACT

A tyre (200) includes a tread (210) and multiple studs (100) in the tread (210) such that at least pins (110) of the studs (100) are exposed on the tread (210). The tyre (200) is configured such that a load index (LI) of the tyre (200) as defined in The European Tyre and Rim Technical Organization Standards Manual (2023) table G.7 is from eighty-six to one hundred sixteen (from 86 to 116). The tyre (200) is further configured such that a road wear of the tyre (200) as measured according to the standard SFS7503:2022:en is less than the value calculatable by the polynomial formula $-0.000139 \times LI^2 + 0.0431 \times LI - 1.90$.

25 Claims, 12 Drawing Sheets

(51) Int. Cl.

| | |
|---|---|
| *B60C 9/22* | (2006.01) |
| *B60C 11/03* | (2006.01) |
| *B60C 9/18* | (2006.01) |

(52) U.S. Cl.

CPC ... *B60C 2009/2223* (2013.01); *B60C 11/0302* (2013.01); *B60C 2200/04* (2013.01)

(58) Field of Classification Search

CPC ............. B60C 11/1643; B60C 11/1675; B60C 11/005; B60C 11/0058; B60C 11/0066; B60C 11/0075

See application file for complete search history.

(56) References Cited

U.S. PATENT DOCUMENTS

| | | | | |
|---|---|---|---|---|
| 2010/0065180 | A1 * | 3/2010 | Ishiyama | B60C 9/22 152/527 |
| 2014/0034205 | A1 * | 2/2014 | Yukawa | B60C 17/0009 152/510 |
| 2015/0239296 | A1 * | 8/2015 | Fukuda | B60C 11/0041 152/209.5 |
| 2016/0024280 | A1 * | 1/2016 | Wang | C08C 19/42 524/399 |
| 2017/0190886 | A1 * | 7/2017 | Sakurai | C08L 7/00 |
| 2017/0274710 | A1 * | 9/2017 | Matsumoto | B60C 9/2204 |
| 2019/0135046 | A1 * | 5/2019 | Yasunaga | B60C 11/1625 |
| 2020/0139761 | A1 * | 5/2020 | Moriyama | B60C 1/0016 |

FOREIGN PATENT DOCUMENTS

| | | | | | |
|---|---|---|---|---|---|
| EP | 3753755 | B1 | | 11/2022 | |
| FI | 123781 | B1 | * | 10/2013 | ............ B60C 11/16 |
| JP | 2004224277 | A | | 8/2004 | |
| JP | 2015039898 | A | * | 3/2015 | |
| RU | 2643328 | C1 | | 1/2018 | |
| RU | 2748476 | C2 | * | 5/2021 | .......... B60C 11/005 |
| WO | 2010128862 | A1 | | 11/2010 | |
| WO | 2011138504 | A1 | | 11/2011 | |

OTHER PUBLICATIONS

Gong, Dao et al., "Modelling rubber dynamic stiffness for numerical predictions of the effects of temperature and speed on the vibration of a railway vehicle car body", Jun. 9, 2019, Journal of Sound and Vibration https://www.sciencedirect.com/science/article/pii/S0022460X19301452 (Year: 2019).*

Discount Tire, "Load Range vs. Load Index", pp. 5-8, Wayback machine Sep. 29, 2020, https://web.archive.org/web/20200929225042/https://www.discounttire.com/learn/load-range-load-index (Year: 2020).*

European Search Report received for EP Application No. 23172081.4 on Oct. 20, 2023, 12 pgs.

Anonymous: "Studs grip the/ Nokian Tires", Nokian Tyres, Jan. 1, 2020, XP055886019, retrieved from the Internet: https://www.nokiantires.com/company/hakkapeliitta-80-years/teemat/studs-grip-the-road/#kometa-hakkapeliitta, 7 pgs.

Anonymous: "Needs to amend the requirements for approval of studs and studded tyres (translation extracts of finnish document)", Ministry of Transport and Communication, Jan. 1, 2008, 12 pgs.

Extended European Search Report received for EP Application No. 24173334.4 on Sep. 11, 2024, 9 pgs.

* cited by examiner

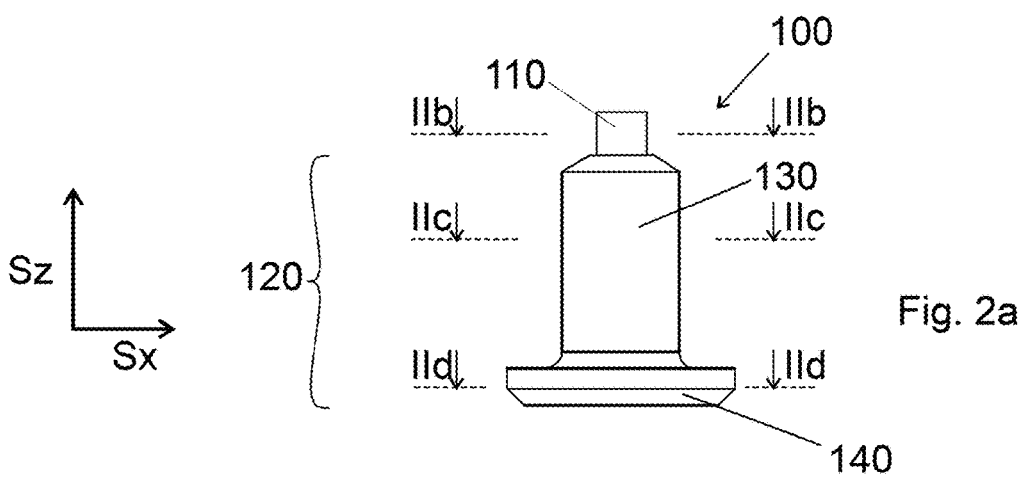
Fig. 2a
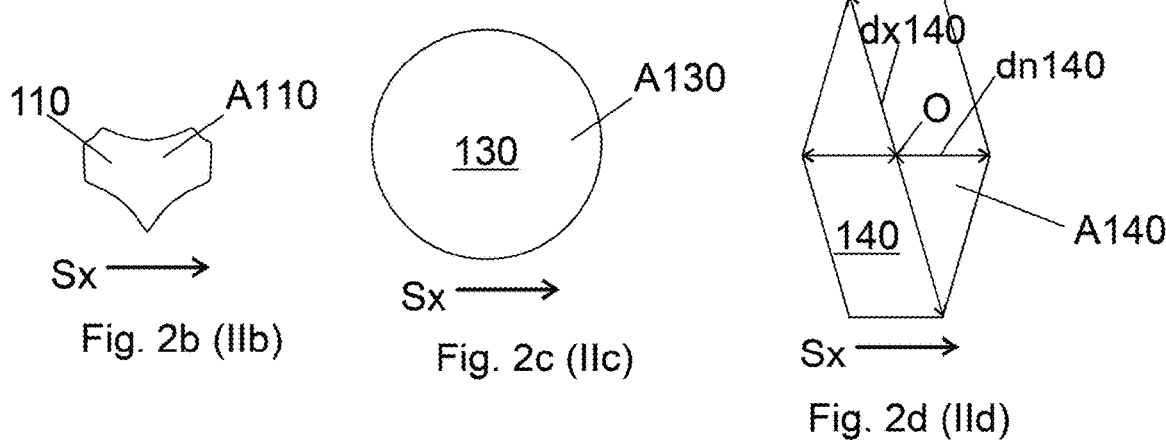
Fig. 2b (IIb)          Fig. 2c (IIc)          Fig. 2d (IId)
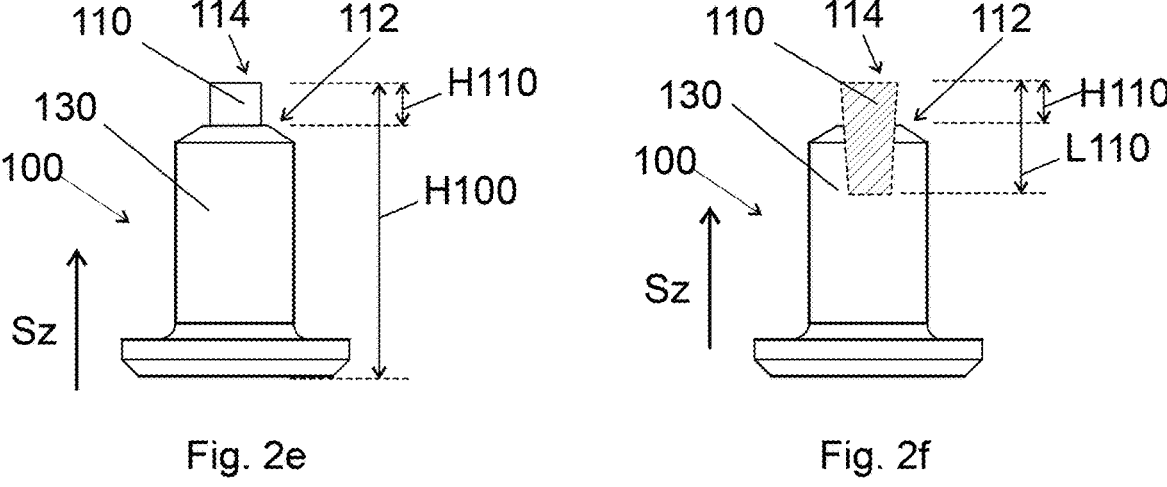
Fig. 2e          Fig. 2f

110

120

120    110

CL r17  r14  r11  r21  r24  r27
r18  r15  r12  r22  r25  r28
r19  r16  r13  r23  r26  r29

100a

100b

100a

100a

100b

S1

W210

S2

H1,
N1

H2,
N2

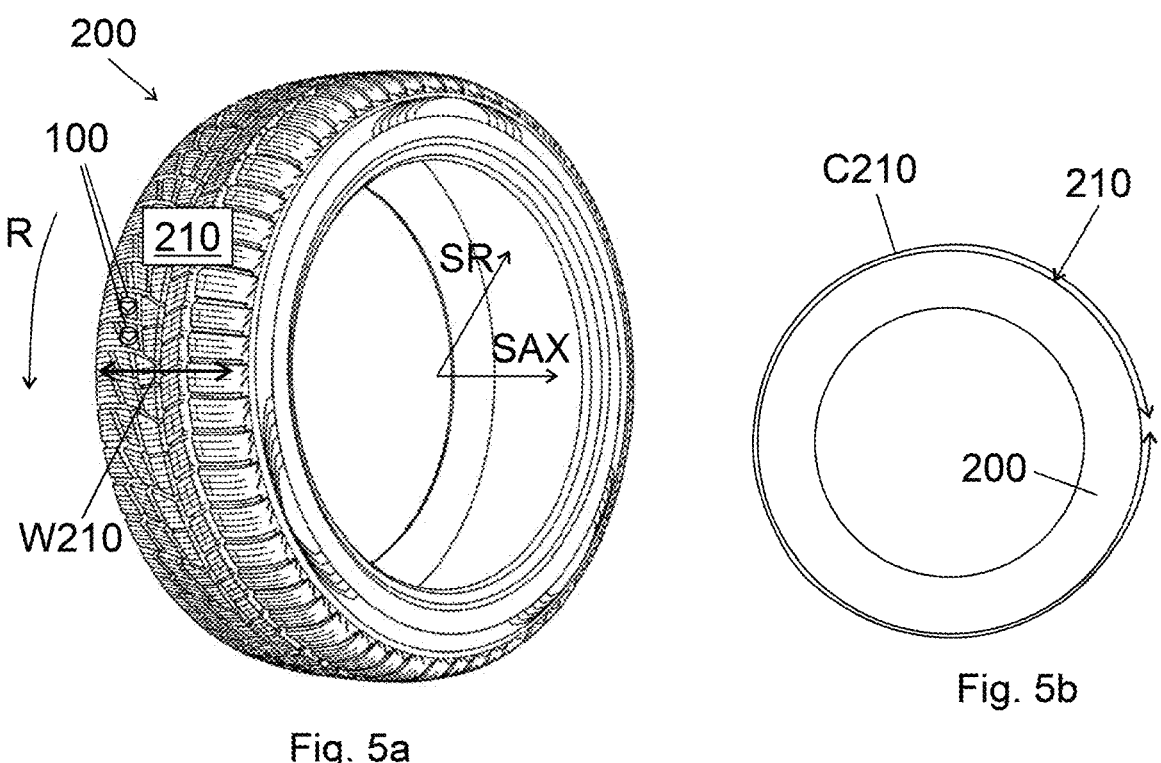
Fig. 5a
Fig. 5b
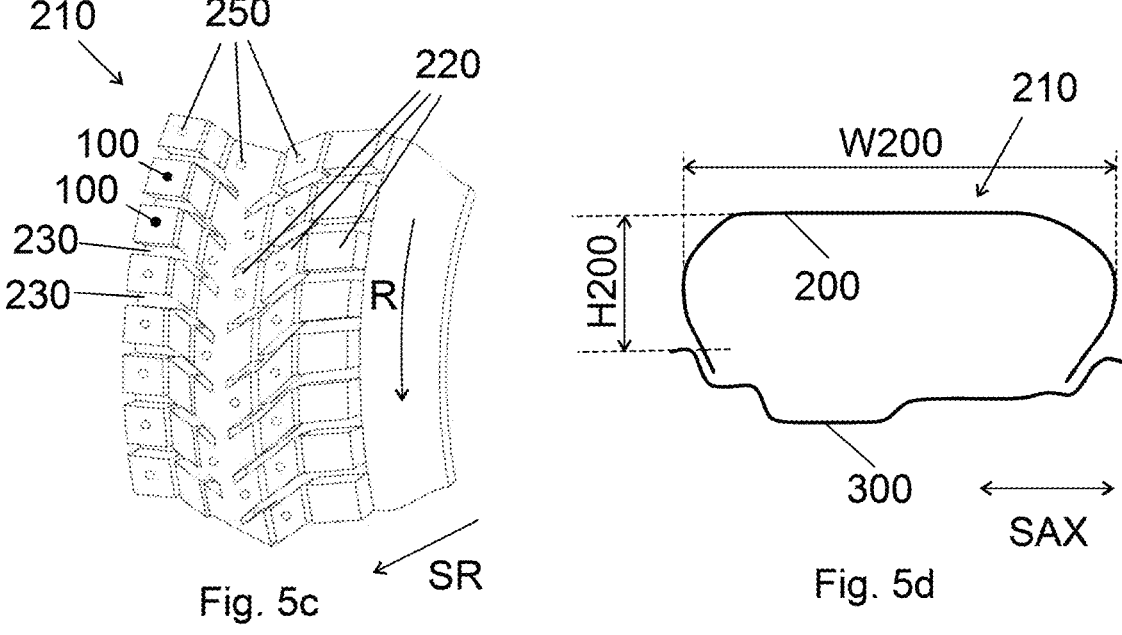
Fig. 5c
Fig. 5d

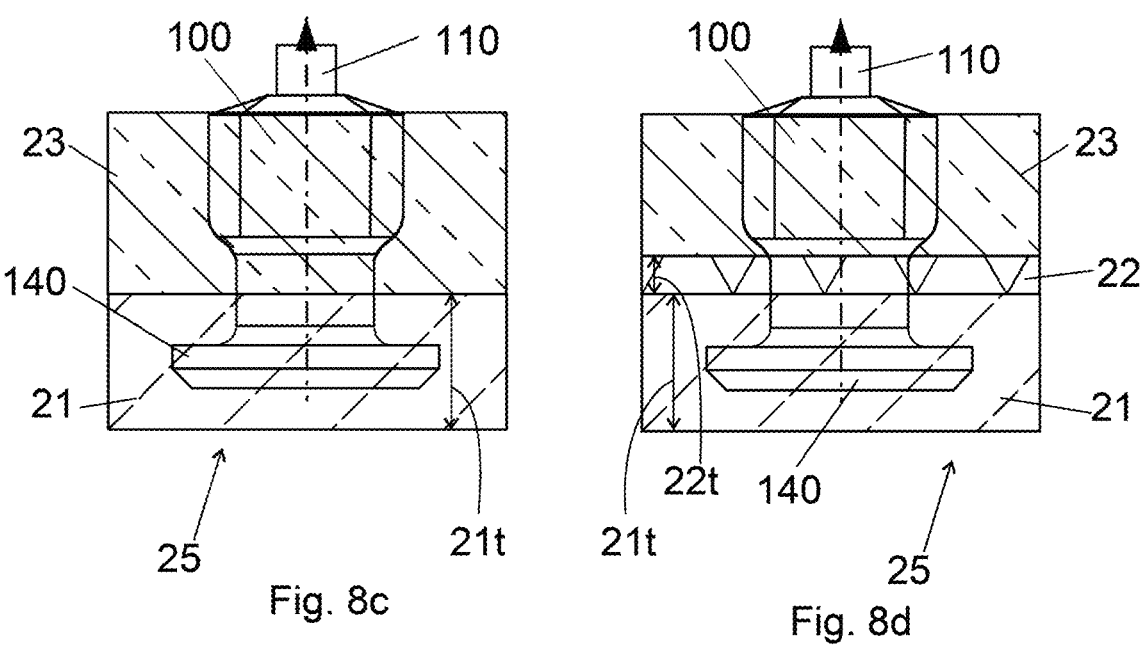
Fig. 8c
Fig. 8d
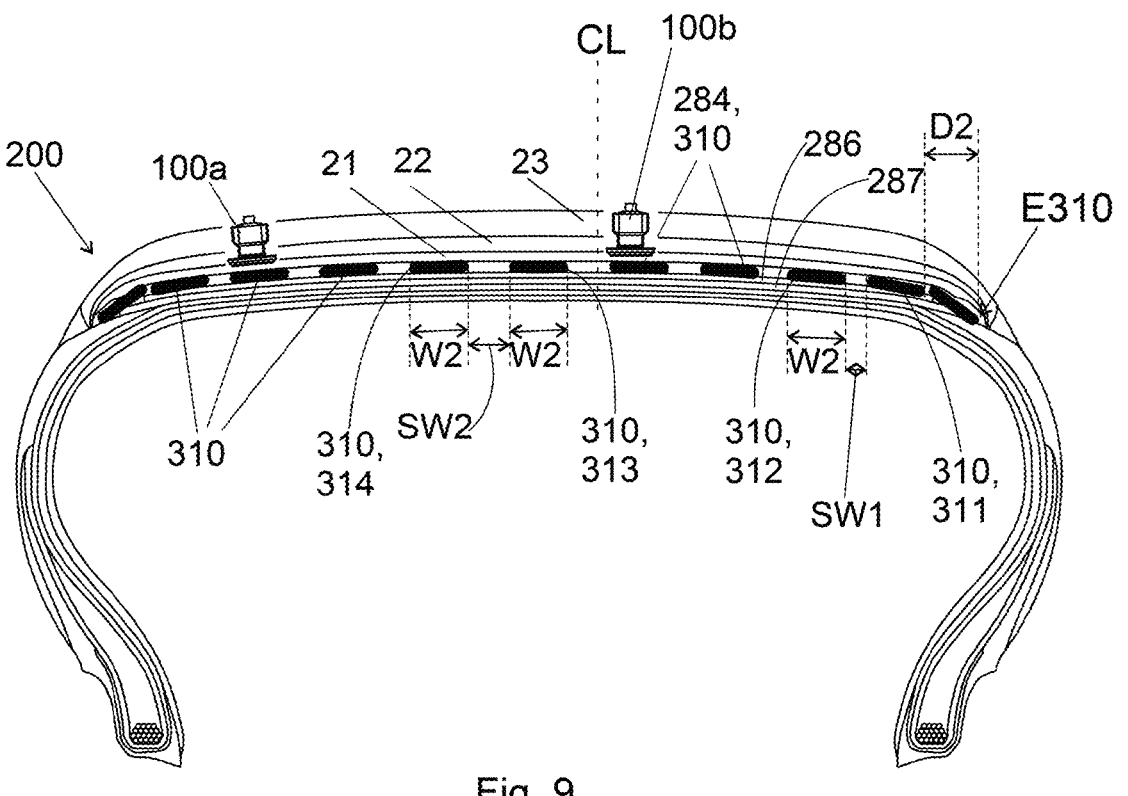
Fig. 9

STUDDED TYRE HAVING REDUCED ROAD WEAR

CROSS-REFERENCE TO RELATED APPLICATION

The present application claims priority to European Patent Application No. 23172081.4 filed on May 8, 2023, which application is incorporated herein by reference in its entirety.

TECHNICAL FIELD

The invention relates to studded tyres. The invention relates to studded pneumatic tyres. The invention relates to studded pneumatic tyres for passenger car vehicles. The invention relates to studs for studded tyres.

BACKGROUND

Functions of a tyre on an automotive vehicle include providing sufficient traction for accelerating, driving, and braking; and providing adequate steering control particularly at high speeds. Traction is commonly referred to as grip and steering control as handling. Grip is affected also by the ground on which the tyre is commonly used. Winter tyres, which are intended for icy and snowy (wintry) roads, are commonly equipped with studs to improve grip on ice. However, studded tyres cause more road wear than tyres without studs.

Reduced road wear is beneficial from economic and environmental points of view. Reduced road wear implies that less material will be eroded from the road. Such material will normally fly or drain off the road with air or rainwater. Moreover, reduced road wear implies less maintenance need for the road. Reduced road wear of studded tyre is therefore an important issue of a studded tyre. Naturally, also grip and handling are important characteristics of a studded tyre. A good, studded tyre may be an optimal compromise between these features.

SUMMARY

According to a first aspect of the invention, a stud for a studded tyre is presented, which stud generally does not cause much road wear and still provides good grip. According to a second aspect of the invention, a studded tyre having a certain load index and a reduced road wear is presented. According to a third aspect of the invention, a studded tyre having a special type of a textile belt, which has been found to affect the road wear caused by the tyre, is presented.

BRIEF DESCRIPTION OF THE DRAWINGS

FIGS. 1a to 1e and 2a to 2e show different views of studs. The different views/details have been indicated close to the number of the figure. Thus, e.g. FIG. 1b shows the view/detail Ib of FIG. 1a. This is indicated by the reference "(Ib)" near the figure number "FIG. 1b". In line with this, one can see the text "FIG. 1b (Ib)" on the figure page 1/12. Similar notation is used in other figures, too, as detailed below.

FIG. 1a shows a stud in a side view,

FIG. 1b shows a cross-section Ib of a pin of the stud of FIG. 1a, the cross-section Ib indicated in FIG. 1a, FIG. 1c shows a cross-section Ic of a second flange of the stud of FIG. 1a, the cross-section Ic indicated in FIG. 1a, FIG. 1d shows a cross-section Id of a waist of the stud of FIG. 1a, the cross-section Id indicated in FIG. 1a, FIG. 1e shows a cross-section Ie of a base flange of the stud of FIG. 1a, the cross-section Ie indicated in FIG. 1a, FIG. 1f shows the stud in a side view and further measures thereof, FIG. 2a shows another stud in a side view, FIG. 2b shows a cross-section IIb of a pin of the stud of FIG. 2a, the cross-section IIb indicated in FIG. 2a, FIG. 2c shows a cross-section IIc of a second part of the stud of FIG. 2a, the cross-section IIc indicated in FIG. 2a, FIG. 2d shows a cross-section IId of a base flange of the stud of FIG. 2a, the cross-section IId indicated in FIG. 2a, FIG. 2e shows the stud in a side view and further measures thereof, FIG. 2f shows the stud in a side view and further measures thereof, FIG. 5a shows a tyre in a perspective view, FIG. 5b shows schematically a circumference of a tyre in a side view, FIG. 5c shows a part of a tyre in a perspective view, FIG. 5d shows a half of a cross-section of a tyre with some measures, FIG. 8c shows schematically a stud arranged on an underlayer and penetrating through a cap, FIG. 8d shows schematically a stud arranged on an underlayer and penetrating through an intermediate layer and a cap, FIG. 9 shows a half of a cross-section of a tyre, FIG. 13a shows a principal view of layers of a tyre and orientations of materials within these layers, and FIGS. 13b-d show in more detail the orientations of the materials within the layers of FIG. 13a.

DETAILED DESCRIPTION

FIG. 5a shows a studded tyre 200. A studded tyre 200 comprises a tread 210 and multiple studs 100 provided in the tread 210. Referring to FIG. 5c, the studs 100 have been installed into stud holes 250. The stud holes 250 may be made to the tread 210 during vulcanization of the tread material. The studded tyre 200 is a tubeless tyre, i.e. functional on a rim and without an inner tyre.

Figure 1A:
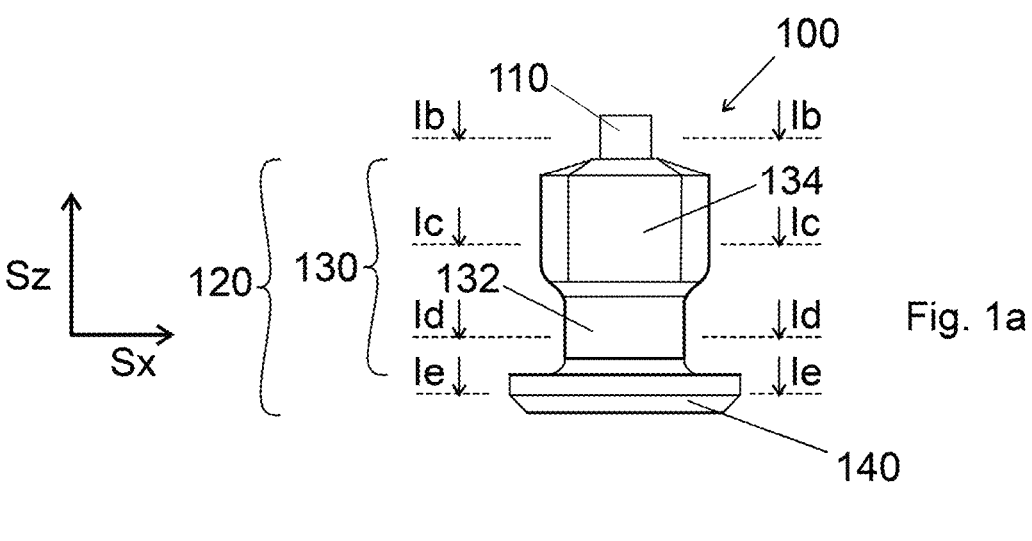
Figure 5E:
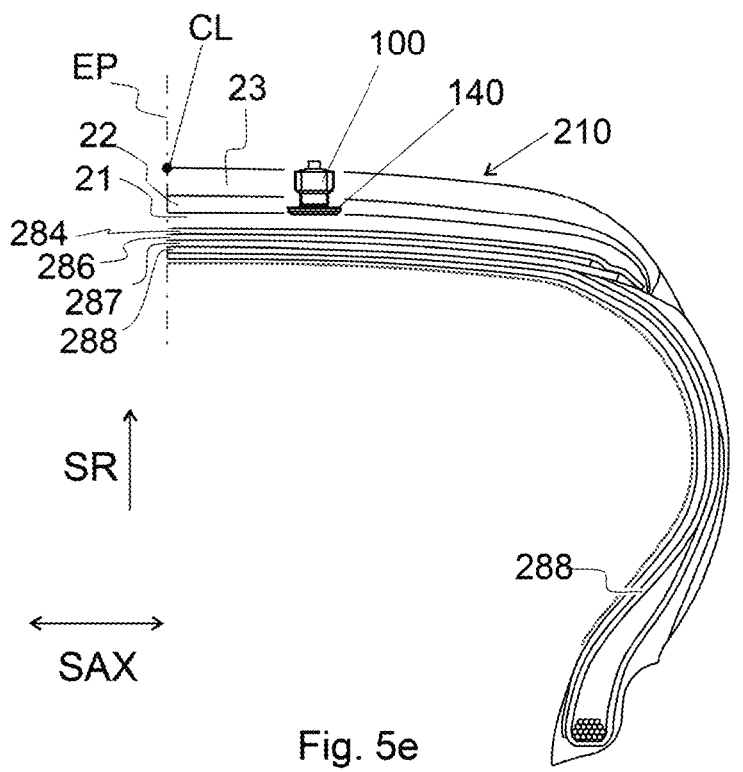
FIG. 5e shows a quarter of a cross-section of a tyre.
Figure 5F:
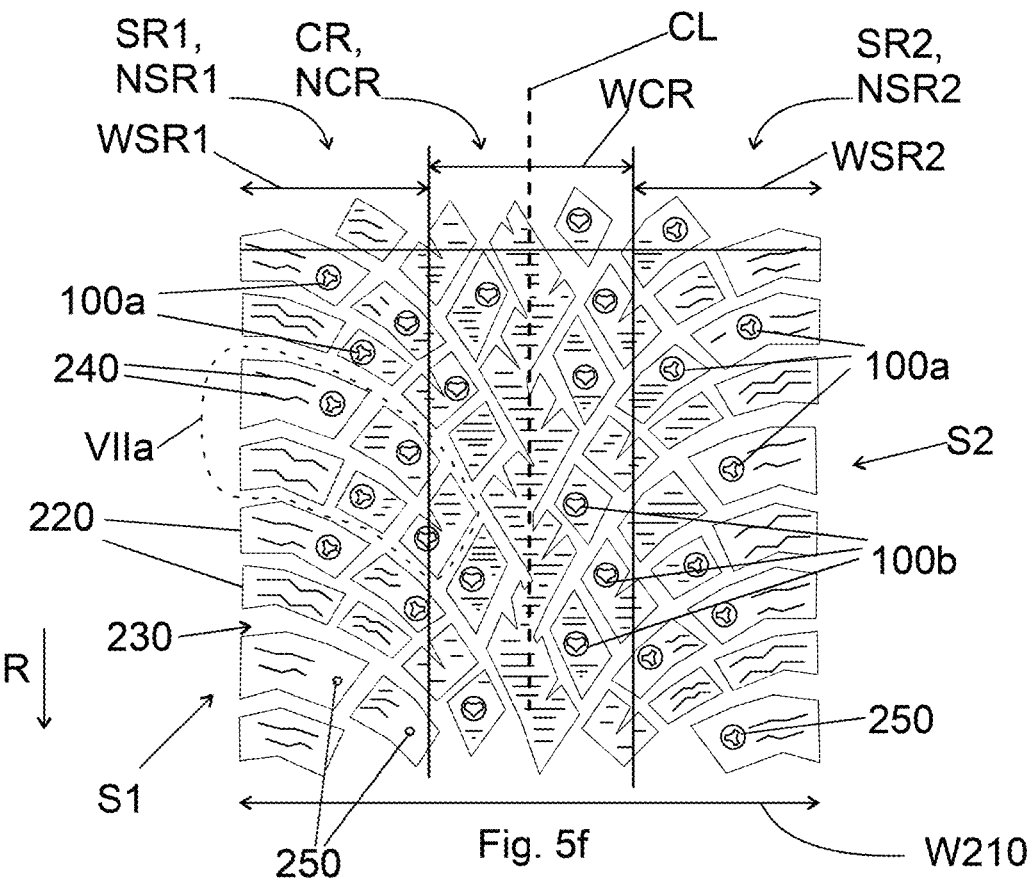
FIG. 5f shows a part of a tread of a tyre.
Figure 7A:
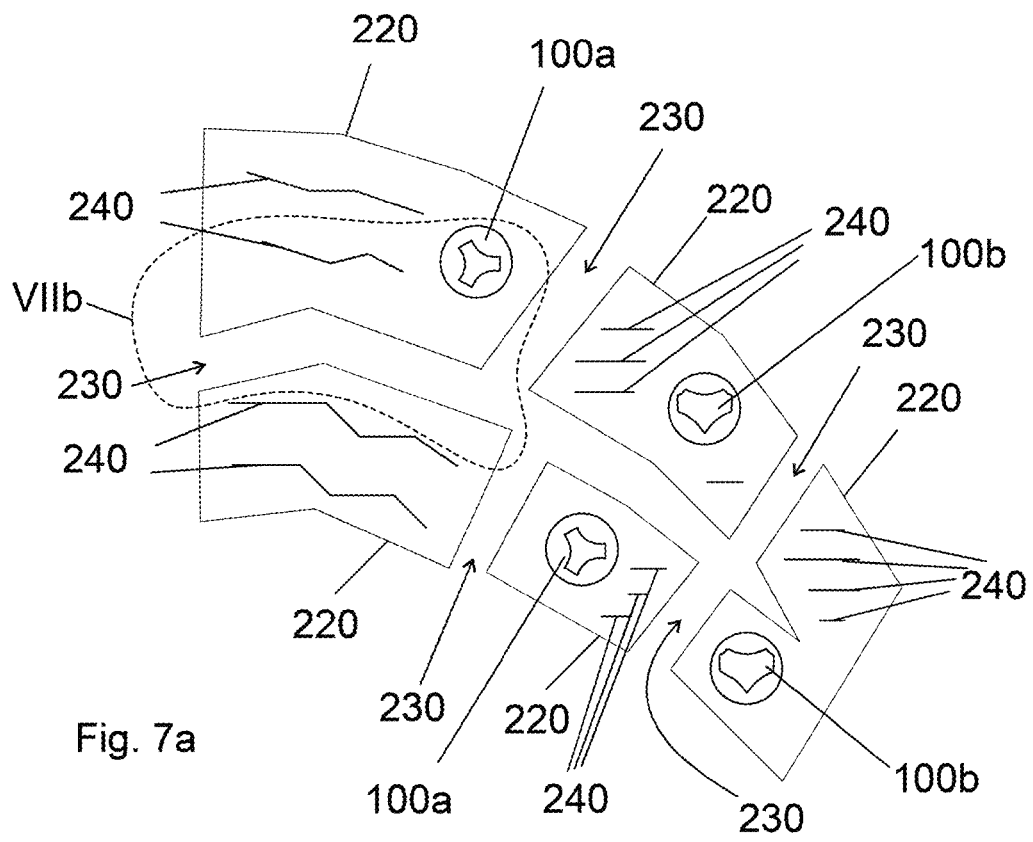
FIG. 7a shows a part of a tread provided with sipes, grooves, and studs.
Figure 7B:
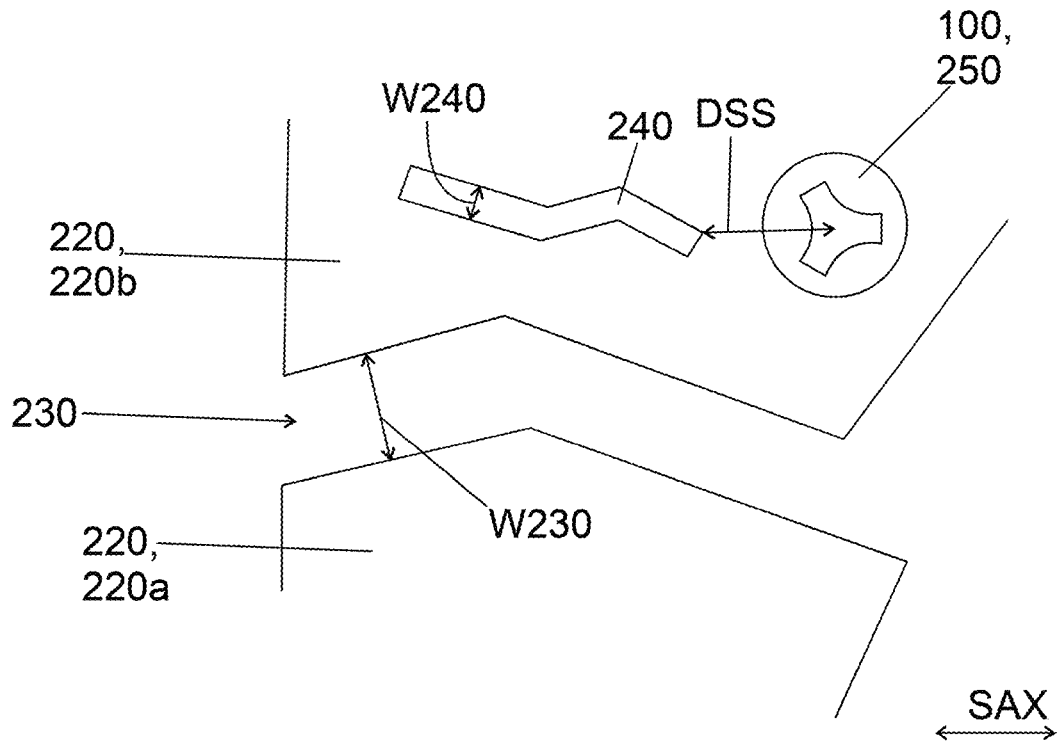
FIG. 7b shows the detail VIIb of FIG. 7a, FIG. 7c shows schematically tread blocks, a groove, a sipe and a stud.
Figure 7C:
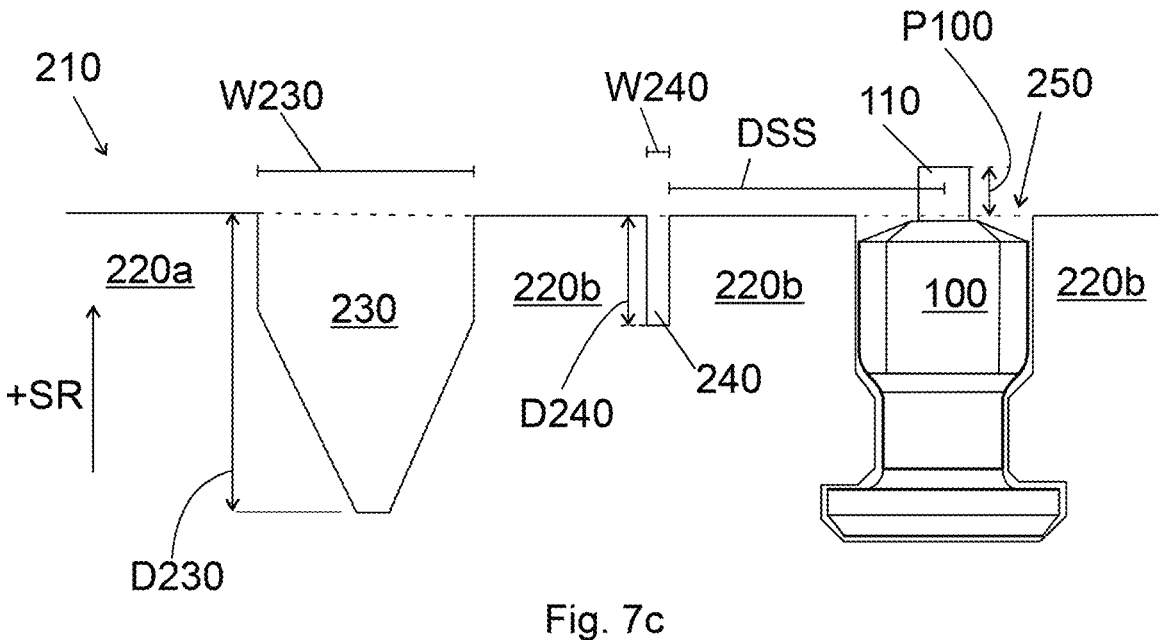

Referring to FIGS. 5c and 5f, the tread 210 of the studded tyre 200 is formed by tread blocks 220 such that grooves 230 are arranged between the tread blocks 220. In this description, a "rib" is considered as a large tread block 220. For example, the tread of FIGS. 5c and 5f include a central tread block that extends over the entire circumference of the tread, even if such a tread block could be called a central rib. A tread 210 needs not to comprise a tread block that extends circumferentially throughout the tread 210. In addition, the tyre 200 comprises studs 100, which have been installed into at least some of the tread blocks 220. Referring to FIGS. 1a and 2a, a stud 100 preferably comprises a pin 110, and preferably each stud 100 of the tyre 200 comprises a pin 100. Moreover, in the tyre 200, at least the pins 110 of the studs 100 are exposed on the tread 210 (see e.g. FIG. 5e). The pins 110 are exposed so that studs have a protrusion P100 of a stud 100 measured from the tread 210. The protrusion P100 is indicated in FIG. 7c. The protrusion P100 is measured in the radial direction +SR and from a planar surface defined by the radially outermost edges of the stud hole 250 into which the stud 100 has been installed. Naturally, the tread 210 itself defines the edges of the stud hole 250.

Some measures of a tyre 200 are depicted in FIG. 5d. Within this description, the width W200 of the tyre 200, as shown in FIG. 5d, refers to the "Section Width" as defined in the Standards Manual 2023 of the European Tyre and Rim Technical Organization (ETRTO). The height H200 of the tyre 200 is also shown in FIG. 5d, and is defined as the "Section Height" in the ETRTO Standards Manual 2023. Correspondingly, the Section Width, i.e. the width W200 of the tyre 200 as defined herein (and in the ETRTO standards manual) is the linear distance between the outsides of the sidewalls of an inflated tyre excluding elevations due to labelling (markings), decoration, or protective bands or ribs. FIG. 5d also shows half of a cross-section of a rim 300 onto which the tyre 200 has been installed.

In practice, the tyre width W200 is related to the size marking shown on the tyre 200. In general, the size marking is shown on a tyre as w/hRr, wherein w denotes a width, h an aspect ratio and r a radius. According to the ETRTO standards manual, typical size markings refer to Design Width (i.e. the width W200 of the tyre 200) and an overall diameter as shown in the Table 1 below:

TABLE 1

Tyre width and diameter indicated by a size marking of a tyre.

| Size | Section Width (mm) | Overall Diameter (mm) |
|---|---|---|
| 145/55R16 | 150 | 566 |
| 155/55R14 | 162 | 526 |
| 155/55R16 | 162 | 576 |
| 165/55R14 | 170 | 538 |
| 165/55R15 | 170 | 563 |
| 175/55R15 | 182 | 573 |
| 175/55R16 | 182 | 598 |
| 175/55R17 | 182 | 624 |
| 175/55R18 | 182 | 549 |
| 175/55R20 | 182 | 700 |
| 185/55R14 | 195 | 560 |
| 185/55R15 | 195 | 585 |
| 185/55R16 | 195 | 610 |
| 195/55R15 | 201 | 595 |
| 195/55R16 | 201 | 620 |

TABLE 1-continued

Tyre width and diameter indicated by a size marking of a tyre.

| Size | Section Width (mm) | Overall Diameter (mm) |
|---|---|---|
| 195/55R17 | 201 | 646 |
| 195/55R18 | 201 | 671 |
| 195/55R19 | 201 | 697 |
| 195/55R20 | 201 | 722 |
| 195/55R21 | 201 | 747 |
| 205/55R15 | 214 | 607 |
| 205/55R16 | 214 | 632 |
| 205/55R17 | 214 | 658 |
| 205/55R18 | 214 | 683 |
| 205/55R19 | 214 | 709 |
| 215/55R16 | 226 | 642 |
| 215/55R17 | 226 | 668 |
| 215/55R18 | 226 | 693 |
| 215/55R19 | 226 | 719 |
| 225/55R16 | 233 | 654 |
| 225/55R17 | 233 | 680 |
| 225/55R18 | 233 | 705 |
| 225/55R19 | 233 | 731 |
| 235/55R16 | 245 | 664 |
| 235/55R17 | 245 | 690 |
| 235/55R18 | 245 | 715 |
| 235/55R19 | 245 | 741 |
| 235/55R20 | 245 | 766 |
| 245/55R16 | 253 | 676 |
| 245/55R17 | 253 | 702 |
| 245/55R18 | 253 | 727 |
| 245/55R19 | 253 | 753 |
| 255/55R16 | 265 | 686 |
| 255/55R17 | 265 | 712 |
| 255/55R18 | 265 | 737 |
| 255/55R19 | 265 | 763 |
| 255/55R20 | 265 | 788 |
| 255/55R21 | 265 | 813 |
| 265/55R18 | 277 | 749 |
| 265/55R19 | 277 | 775 |
| 265/55R20 | 277 | 800 |
| 275/55R15 | 284 | 683 |
| 275/55R16 | 284 | 708 |
| 275/55R17 | 284 | 734 |
| 275/55R18 | 284 | 759 |
| 275/55R19 | 284 | 785 |
| 275/55R20 | 284 | 810 |
| 275/55R21 | 284 | 835 |
| 285/55R18 | 297 | 771 |
| 285/55R19 | 297 | 797 |
| 305/55R20 | 316 | 855 |
| 325/55R22 | 336 | 917 |

It is noted that Table 1 shows only some examples. A tyre may have a different size, in particular another aspect ratio than 55.

According to a first aspect of the invention, there is provided a stud 100, which improves grip and does not cause much road wear even when used in a studded tyre 200.

FIGS. 1a to 1f show a first embodiment of a stud 100 and FIGS. 2a to 2f show a second embodiment of a stud. The direction Sz of the FIGS. 1a to 2f is a longitudinal direction of the stud, and the stud may be installed to the tread 210 such that the positive longitudinal direction +Sz is the radially outward direction +SR of the tyre (see e.g. FIG. 5e). A purpose of a stud 100 is to improve grip of a tyre 200 particularly on ice.

Referring to FIGS. 1a and 2a, in an embodiment, a stud 100 comprises a body 120 and a pin 110. The body 120 comprises a base flange 140 and a second part 130, the second part 130 being joined to the base flange 140 and extending in the longitudinal direction +Sz of the stud 100 from the base flange 140. The pin 110 protrudes from the second part 130 in the longitudinal direction +Sz of the stud 100. The pin 110 comprises hard metal or ceramic. In terms of Vickers hardness, the Vickers hardness of the pin 110 is higher than the Vickers hardness of the second part 130.

As shown in FIG. 1*e*, the base flange 140 has a first cross-section on a plane that has a normal in the longitudinal direction Sz of the stud, the first cross-section having a first area A140. Moreover, the base flange 140 has a profile shape extending at least a certain distance in the direction Sz of the normal of the first cross-section. FIG. 1*e* shows the cross-section Ie of the base flange 140 of the stud of FIG. 1*a*, the cross-section Ie indicated in FIG. 1*a*. FIG. 2*d* shows the cross-section IId of the base flange 140 of the stud of FIG. 2*a*, the cross-section Iid indicated in FIG. 2*a*.

The pin 110 has a second cross-section on a plane that has a normal in the longitudinal direction Sz of the stud 100, the second cross-section having a second area A110. FIG. 1*b* shows the cross-section Ib of the pin 110 of the stud of FIG. 1*a*, the cross-section Ib indicated in FIG. 1*a*. FIG. 2*b* shows the cross-section IIb of the pin 110 of the stud of FIG. 2*a*, the cross-section IIb indicated in FIG. 2*a*. The first area A140 is greater than the second area A110.

Figure 1F:
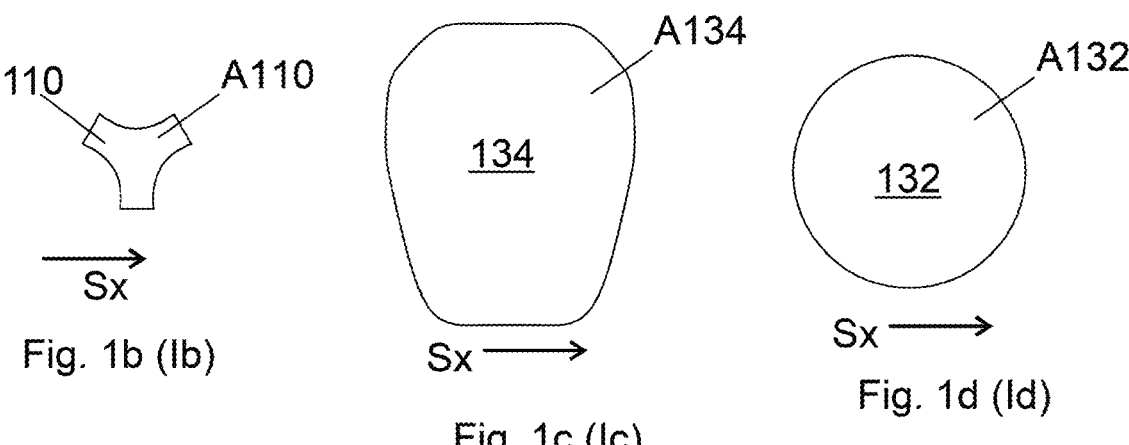
Figure 1F:
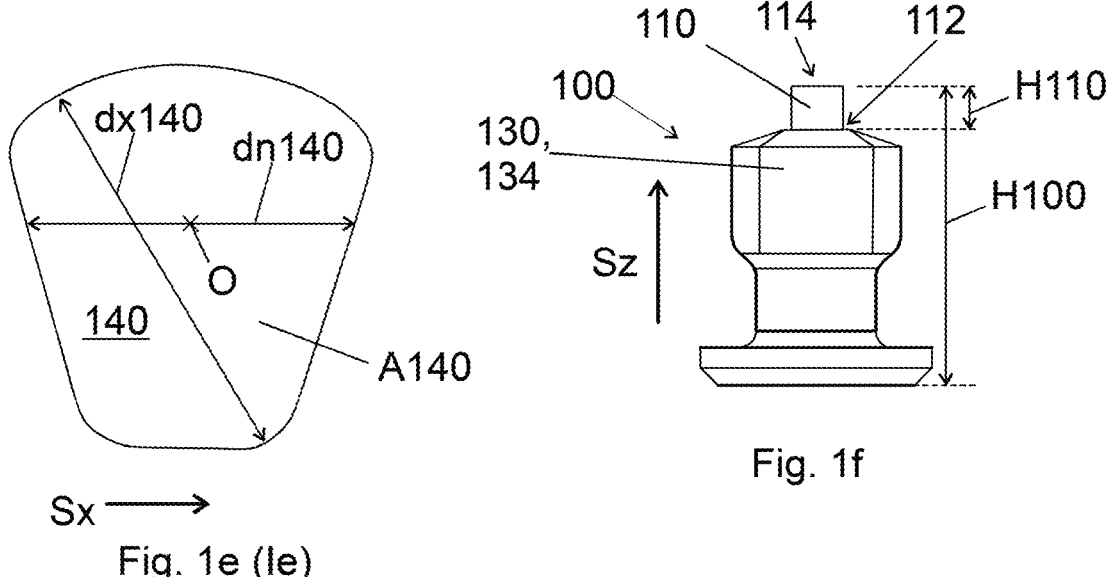

To provide a good grip, the pin 110 should protrude from second part 130 sufficiently. A first height H110, which is the height that the pin 110 protrudes from the second part 130 (e.g. from a second flange 134 of the second part 130) is depicted in FIGS. 1*f* and 2*e*. As shown in FIGS. 1*f* and 2*e*, the second part 130 extends in the longitudinal direction Sz of the stud 100 from the base flange 140 to an interfacial point 112 between the second part 130 and the pin 110 and does not extend further in this direction. In FIG. 1*f*, a waist 132 and a second flange 134 constitute the second part 130; however, in FIG. 2*e*, the second part 130 does not comprise a second flange.

The pin 110 and the second part 130 define the first height H110, which is the length the pin 110 protrudes from the interfacial point 112 in the longitudinal direction Sz to the extremal point 114 of the pin 110 in the longitudinal direction Sz of the stud. Thus, the pin 110 protrudes the first height H110 from the second part 130 of the stud; particularly from the interfacial point 112.

For good grip, the first height H110 should be sufficient. However, if the first height H110 is excessive, the road wear caused by the stud may increase. Moreover, not only the tip 110 affects grip and road wear. Particularly, a size of the base flange 140 affects grip and road wear, too. A large base flange 140 oftentimes implies that the stud 100 is arranged in the stud hole 250 in a stiff manner, i.e. the base flange 140 resists movement of the studs in the negative radial direction-SR when the stud is pressed in this direction. A reason is that the large base flange 140 supports the stud 100 to the rubber material of the tyre beneath the base flange 140 in a sturdy manner. This typically results in a large dynamic impact of the stud on the road; and a high dynamic impact implies high road wear. This applies also vice versa. A small base flange will, in general, reduce the dynamic impact and in this way the road wear. Moreover, as detailed below, the material beneath the base flange also affects the dynamic impact.

It has been found that a good compromise between the grip and the road wear is achieved when a ratio A140/H110 of the first area A140 to the first height H110 is 20 to 50 mm²/mm. An even more preferable value for this ratio A140/H110 is 25 to 48 mm²/mm, the most preferably value being 28 to 45 mm²/mm. More details of even more beneficial studs will be provided below.

The stud according to the first aspect of the invention may be used as a stud of a tyre according to the second aspect of the invention. The stud according to the first aspect of the invention may be used as a stud of another studded tyre, too.

According to the second aspect of the invention, a studded tyre has such properties that the tyre, in use, causes only low road wear. Such properties include e.g. the dynamic impact of the studs to the road. The properties may include also the number of the studs, the shape of the studs, and the placement of the studs to the tread. As indicated above also the rubber material to which the studs are installed affects grip and road wear by affecting the dynamic impact of the stud.

Within this description the term tyre refers to a tyre configured to be used on a wheel of a car, especially a passenger car. In line with this, within this description, a road wear of the studded tyre is defined as the road wear in the test specified in the standard SFS7503:2022:en, which concerns primarily tyres designed for vehicles in categories M1 and N1, as defined in the Consolidated Resolution on the Construction of Vehicles (R.E.3), document ECE/TRANS/WP.29/78/Rev.4, para. 2. These categories are:

M1: Vehicles used for the carriage of passengers and comprising not more than eight seats in addition to the driver's seat, and N1: Vehicles used for the carriage of goods and having a maximum mass not exceeding 3.5 tonnes.

The standard SFS7503:2022:en specifies the test procedure in detail. On the general level, in the test, a vehicle equipped with the tyres to be tested is driven over test specimens (i.e. test stones) with specified speed for a specific number of times. The test requires that two identical tyres are tested simultaneously; they are used on one side of the vehicle in the test. According to the standard, a properly loaded vehicle is driven two hundred (200) times over the test stones at the speed of 100 km/h. As both the front and rear wheels pass the test stones, there are a total of four hundred (400) passes of the test tyres over the test stones; and these passes cause the test stones to wear. Road wear according to the standard SFS7503:2022:en is the average weight loss of three test stone rows compensated by the weight loss of reference stones, if applicable. For further details refence is made to the standard. The average wear of test specimens is expressed in units of mass (i.e. in grams). The less the tyres wear the specimens (i.e. test stones), the less is the result (in grams, g) of the test, and thus the less the tyres wear a regular road, too.

According to the second aspect of the invention, a tyre 200 comprises a tread 210 and multiple studs 100 in the tread 210. The studs 100 comprise pins 110 of hard metal or ceramic. What has been said above about the hardness of the pin applies. The studs 100 are arranged to the tread 210 such that at least the pins 110 of the studs 100 are exposed on the tread 210. The tyre 200, in particular the studs 100 thereof, are configured such that a road wear of the tyre 200 as measured according to the standard SFS7503:2022:en is low. In particular, the road wear of the tyre is low with respect to the load that the tyre can carry. In general, tyres that can carry a larger load also wear the road more extensively; and vice versa. In particular, in the road wear test of the standard, the vehicle is loaded so that a certain percentage of the maximum load the tyres can carry is reached.

How much load the tyre can carry is generally expressed as a load index LI of the tyre. The load index LI in this description is defined in an identical way as in the standards manual 2023 of the European Tyre and Rim Technical Organization (ETRTO). The ETRTO standard manual 2023 defines the load index LI as: "The LOAD INDEX is a numerical code associated with the maximum load a tyre can carry (except for a load at speed above 210 km/h, see page P.7 and P.9 or M.4 respectively for Passenger Cars and Motorcycle Tyres) at the speed indicated by its Speed Symbol under service conditions specified by the tyre manufacturer."

Moreover, the load index LI as a function of the maximum load a tyre can carry is given in table G.7 of the ETRTO standards manual 2023. The values of that table relevant for the present invention are reproduced in Table 2 below.

TABLE 2

| maximum load a tyre can carry in kgs "max(kg)" and the associated load index "LI". | |
| --- | --- |
| Load | |
| max(kg) | LI |
| 450 | 80 |
| 462 | 81 |
| 475 | 82 |
| 487 | 83 |
| 500 | 84 |
| 515 | 85 |
| 530 | 86 |
| 545 | 87 |
| 560 | 88 |
| 580 | 89 |
| 600 | 90 |
| 615 | 91 |
| 630 | 92 |
| 650 | 93 |
| 670 | 94 |
| 690 | 95 |
| 710 | 96 |
| 730 | 97 |
| 750 | 98 |
| 775 | 99 |
| 800 | 100 |
| 825 | 101 |
| 850 | 102 |
| 875 | 103 |
| 900 | 104 |
| 925 | 105 |
| 950 | 106 |
| 975 | 107 |
| 1000 | 108 |
| 1030 | 109 |
| 1060 | 110 |
| 1090 | 111 |
| 1120 | 112 |
| 1150 | 113 |
| 1180 | 114 |
| 1215 | 115 |
| 1250 | 116 |
| 1285 | 117 |
| 1320 | 118 |
| 1360 | 119 |

Figure 6A:
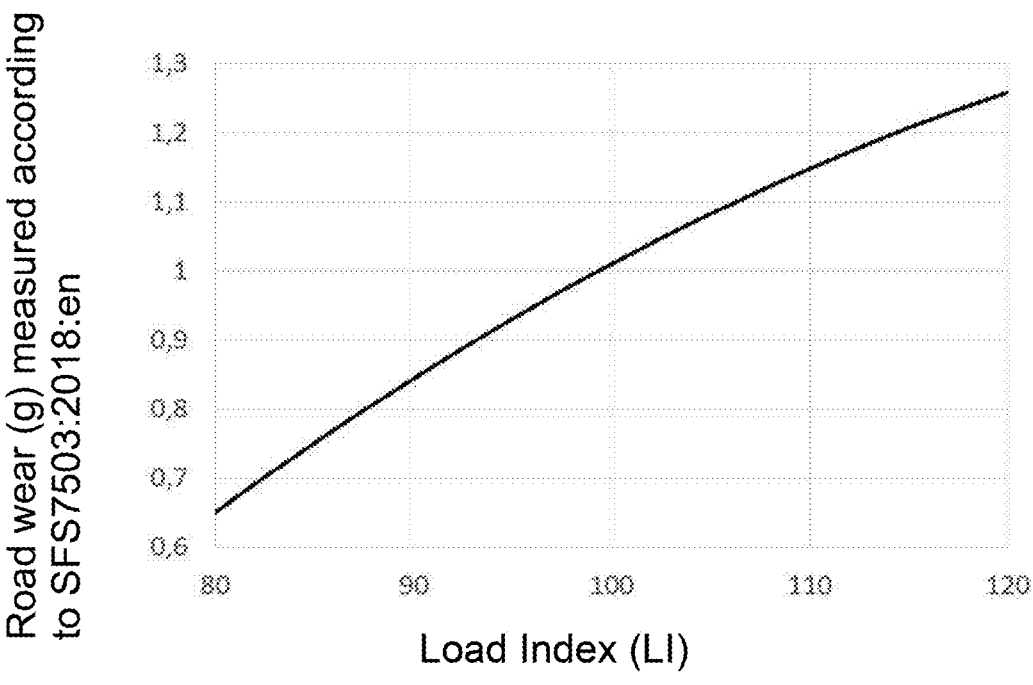
FIG. 6a shows an upper limit for road wear of a tyre as defined in the standard SFS7503:2022:en as function of a load index LI of a tyre.
Figure 6B:
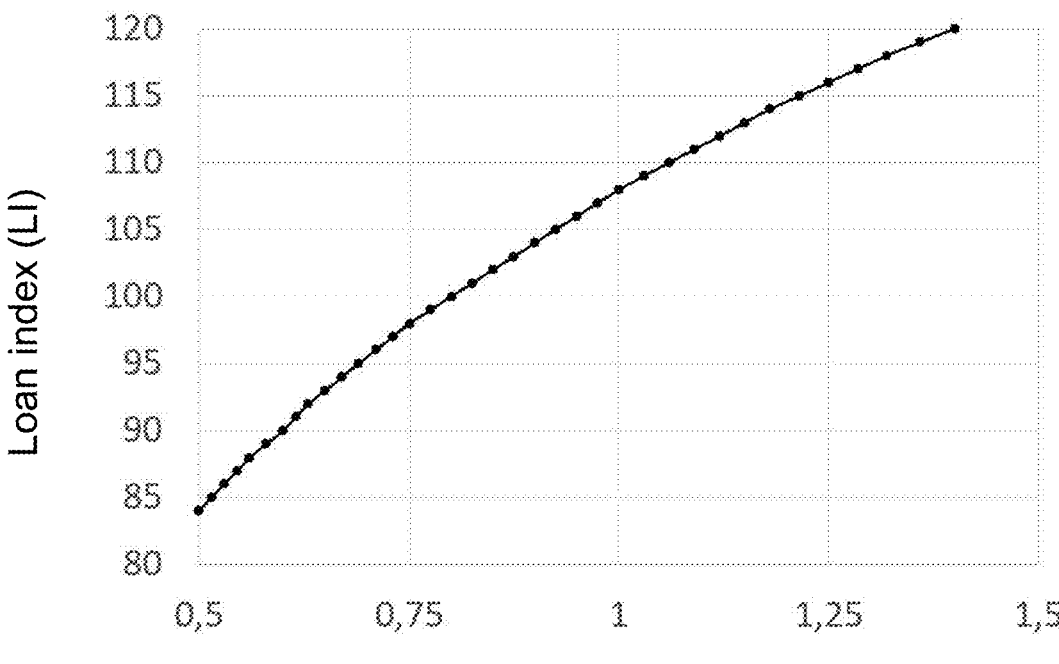
FIG. 6b shows the load index LI of a tyre as function of a maximum load the tyre can carry.

The load index LI as function of the maximum load is also shown in FIG. 6b.

Thus, a tyre 200 according to the second aspect of the invention comprises a tread 210 and multiple studs 100 in the tread 210, the studs comprising at least pins 110, such that at least the pins 110 of the studs 100 are exposed on the tread 210. What has been said about the hardness of the pins 110 applies. The tyre 200 is configured such that the load index LI of the tyre 200 as defined in The European Tyre and Rim Technical Organization Standards Manual 2023 table G.7 is from 86 to 116 (i.e. eighty six to hundred sixteen). Moreover, the road wear of the tyre 200 as measured according to the standard SFS7503:2022:en is, in unit of grams, less than the value calculatable by the polynomial formula $-0.000139 \times LI^2 + 0.0431 \times LI - 1.90$ (hereinafter Formula 1). The symbol $\times$ stands for multiplication and the superscript 2 is the exponent of LI, i.e. $LI^2$ stands for the multiplication of LI by LI once (i.e. $LI \times LI$). The load index LI is unitless. If the value of the road wear measured by the standard SFS7503:2022: en includes the unit (grams, g) then the same unit (grams, g) should be added to Formula 1.

The value of this formula as function of the load index LI is shown in FIG. 6a. As detailed above, the road wear of the tyre is less than this value according to the second aspect of the invention.

In absolute terms, also in a tyre according to the second aspect, the road wear may be less than 1.00 g. It is noted that Formula 1 gives the road wear 1.00 for the load index 99. However, the road wear may be e.g. less than 1.00 g also for greater load indexes. As an example, the load index may be 100 or more even if the road wear is less than 1.00 g. Further specific examples are disclosed as numbered examples in this description.

This may be achieved e.g. by having a sufficiently low dynamic impact of the studs to the road.

The Formula 1 can be used also when several different types of tyres are manufactured. Therefore, the invention according to the second aspect also relates to an arrangement of more than one tyres.

Thus, the second aspect relates to an arrangement of tyres, the arrangement comprising a first tyre 200 comprising a first tread 210 and multiple studs 100 in the first tread 210 such that at least pins 110 of the studs 100 are exposed on the first tread 210. The first tyre 200 is configured such that a first load index $LI_1$ of the first tyre 200 as defined in the ETRTO Standards Manual 2023 table G.7 is from eighty six to hundred sixteen (from 86 to 116) and a first road wear of the first tyre 200 as measured according to the standard SFS7503:2022:en is less than the value calculatable by the formula formula $-0.000139 \times LI_1^2 + 0.0431 \times LI_1 - 1.90$. What has been said about the units above applies.

The arrangement further comprises a second tyre comprising a second tread and multiple studs 100 in the second tread such that at least pins 110 of the studs 100 are exposed on the second tread. The second tyre is configured such that a second load index $LI^2$ of the second tyre as defined in the ETRTO Standards Manual 2023 table G.7 is from eighty six to hundred sixteen (from 86 to 116) and a second road wear of the second tyre as measured according to the standard SFS7503:2022:en is less than the value calculatable by the formula $-0.000139 \times LI_3^2 + 0.0431 \times LI_2 - 1.90$. What has been said about the units above applies. The second load index $LI_2$ is not equal to the first load index $LI_1$.

The low value of road wear may be achieved e.g. by having a sufficiently low dynamic impact of the studs to the road, particularly when driving at the speed indicated in the road wear standard. Features affecting the dynamic impact of the studs to the road include:

Mass of the stud,

Protrusion P100 of the stud,

Area of the base flange 140 (i.e. the first area A140),

Size and shape of the stud pin 110, and

The rubber material supporting the base flange 140, the material optionally being comprised by an underlayer 293.

Both the first area A140 and the rubber material supporting the base flange 140 have effect on how sturdly the stud is supported to the rubber material of the tyre.

As for the material of the tyre 200, also the rubber material of the tread 210 affects grip of the tyre and road wear. Thus, in an embodiment, the tread 210 comprises rubber material having a Shore hardness in the range 48 to 59 Sh(A) as measured with durometer type A, at the temperature 23° C. In an embodiment, the tread 210, in particular the part of the tyre that is configured to contact a road in use, is formed of rubber material having a Shore hardness in the range 48 to 59 Sh(A) as measured with durometer type A, at the temperature 23° C.

The tread can also be softened by providing sipes 240 to the tread 240. Thus, in an embodiment, at least some of the tread blocks 220 are provided with sipes 240. As well known, sipes 240 are narrow openings in tread blocks 220. Sipes 240 are shown in FIGS. 5f, 7a, 7b, and 7c. In this way also the sipes 240 provide improved grip without increasing road wear. Concerning the narrowness of the sipes, in an embodiment, a width W240 of all the sipes 240 is less than 2.0 mm. The width W240 of a sipe is shown in FIG. 7b. In an embodiment, a depth D240 of all the sipes 240 is at least 2.0 mm. A bottom a sipe needs not be even. In such a case the depth of the sipe 240 refers to a depth of the deepest point of the sipe 240.

The tread blocks 220 of the tread 210 also limit grooves 230. Thus, the tread 210 comprises tread blocks 220 such that grooves 230 are arranged between the tread blocks 220. As an example, FIG. 7c shows a groove 230 arranged between a first tread block 220a and a second tread block 220b. In an embodiment, a width W230 of at least one of the grooves 230, as measured on the level of the tread 210 limiting the groove 230, is more than 4.0 mm. The width W230 is shown in FIG. 7c. The grooves may taper radially inward (i.e. in the −SR direction). Thus, in an embodiment, a width W230 of at least one of the grooves 230 decreases in an inward radial direction −SR of the tyre. Reference is made to FIG. 7c. In an embodiment, a depth D230 of at least one of the grooves 230 is more than 6.0 mm, preferably 7 mm to 15 mm. A depth of a sipe 240 is less than a depth of a groove 230. More specifically, in an embodiment, a depth D240 of all the sipes 240 is less than a depth D230 of one of the grooves 230.

When the tyre 200 comprises sipes, preferably, no sipe 240 is provided close to a stud hole 250, in which a stud 100 has been installed. Referring to FIG. 7b, a stud 100 has been installed in a stud hole 250, and no part of any of the sipes 240 is arranged closer than the distance DSS to a centre of the stud hole 250. The distance DSS may be 6 mm, 8 mm, or 10 mm. In addition, or alternatively, multiple studs have been installed in multiple stud holes and no part of any of the sipes 240 is arranged closer than 6 mm, 8 mm, or 10 mm to a centre of any one of the stud holes 250. FIGS. 7b and 7c show the distance DSS and that no part of any of the sipes 240 is arranged closer than the distance DSS to a centre of the stud hole 250. The distance DSS may be 6 mm, 8 mm, or 10 mm. This has the effect that stud 100 is reliably fixed to its stud hole 250. Otherwise, the sipe 240 would soften the tread also near the stud hole 250 and in this way increase the risk of the stud 100 falling from the stud hole 250. Thus, this also improves the grip of the tyre 200.

However, because the sipes 240 provide for additional grip through effective softening the tread and providing further edges of tread, preferably at least one or some of the sipes are arranged reasonably close to the stud. Thus, in a preferable embodiment, a stud has been installed in a stud hole 250 such that a part of the sipe 240 is arranged closer than 12 mm to a centre of the stud hole 250. More preferably, a stud has been installed in a stud hole 250 such that a part of the sipe 240 is arranged closer than 10 mm (or closer than 9 mm) to a centre of the stud hole 250. Thus, in an embodiment, the tyre comprises such a stud and such a sipe that a distance from a part of the sipe to a centre of the stud hole 250 is, e.g., 6 to 12 mm, 6 to 10 mm, 6 to 9 mm, 8 to 12 mm, 8 to 10 mm, or 8 mm to 9 mm (one significant digit, and in line with the text above, excluding the upper end-points of these ranges but including the lower end-points of these ranges). It is noted that the reference DSS only stands for such a measure that no part of any of the sipes 240 is arranged closer than the distance DSS to a centre of the stud hole 250.

Most preferably, a stud has been installed in a stud hole 250, and no part of any of the sipes 240 is arranged closer than 8 mm to a centre of the stud hole 250 and a part of at least one of the sipes is arranged closer than 10 mm to a centre of the stud hole 250. Preferably this applies to multiple studs so that parts of different sipes may be close to different stud holes. Thus, preferably, at least parts of multiple studs (100, 100a, 100b) are arranged in multiple stud holes 250 provided in multiple tread blocks 220, and no part of any of the sipes 240 is arranged closer than 6 mm (preferably no part is arranged closer than 8 mm) to a centre of any one of the stud holes 250; and the tyre comprises multiple such sipes that a part each one of the multiple sipes 240 is arranged closer than 12 mm (preferably closer than 10 mm) to a centre a stud hole 250 to which a stud has been arranged.

In a preferable embodiment, at least some of the grooves 230 are inclined such that they define a V-shape or a half of a V-shape, the V-shape or the half thereof defining a direction of rotation R of the tyre 200 when used driving forwards, the direction of rotation R being reverse to the direction to which the V-shape or the half thereof opens. As an example, the grooves of FIG. 5a define a half of a V-shape. In contrast the grooves of FIGS. 4c, 5c, and 5f define a full V-shape. Such a tread is what is commonly known as "directional" i.e. the tyre is designed to be fitted to the vehicle wheel in one particular way. This improves the grip of the tyre by improving the efficiency of draining water and/or slush from underneath the tyre 200 in regular use of the tyre. This arrangement of grooves also does not increase the road wear. Such a directional tyre may comprise a marking on a sidewall of the tyre, the marking being indicative of the direction of rotation for the tyre.

Such a tyre can be manufactured by vulcanizing a green tyre to form the tyre 200 and forming stud holes to the tread 210 of the tyre 200 during the vulcanizing the green tyre. After vulcanization, the studs 100 are installed to the stud holes 250 of the tread 210. FIG. 5f shows two stud holes 250 to which a stud has not been installed. As shown therein, typically the stud holes 250, before the studs 100 have been inserted into the holes 205, are small compared to the studs 100. However, because the tread blocks 220 are elastic, the stud holes 250 are stretched when installing the studs 100 to the holes 250. This further improves fixing of the studs 100 to the stud holes 250. Only one stud hole 250 to which a stud has been installed have shown by reference numeral in FIG. 5f.

When the tyre comprises sipes 240, in an embodiment, the sipes are formed to the tread 210 of the tyre 200 during the vulcanizing the green tyre by using lamella blades.

The stud 100 according to the first aspect of the invention may be used as a stud of a tyre in accordance with the second aspect of the invention. The tyre according to the second aspect of the invention need not comprise a stud according to the first aspect of the invention.

As detailed above, a sturdiness of the support of the base flange 140 affects the dynamic impact. Thus, for a large impact, the first area A140 (i.e. the area of the cross-section of the base flange 140) should be large; however not too large for not wearing the road too much. Moreover, the dynamic impact is transmitted to the road through the pin. In general, a small pin will cause a higher local impact (in terms of impact per area) to the road. Thus, also the second area A110 (i.e. the area of the cross-section of the pin 110) should be selected suitably. For these reasons, as an example, the tyre according to the second aspect of the invention may comprise a stud 100 comprising the base flange 140, the second part 130, and the pin 110 such that a ratio A140/A110 of the first area A140 (i.e. the area of the cross-section of the base flange 140) to the second area A110 (i.e. the area of the cross-section of the pin 110) is 6.5 to 21. This, optionally in connection with other features affecting the dynamic impact, may provide for the low road wear. In a preferable embodiment, the ratio A140/A110 of the first area A140 to the second area A110 is 7.5 to 19, and more preferably 9 to 17. In absolute terms, preferably, the first area A140 is 20 mm$^2$ to 80 mm$^2$, more preferably 30 mm$^2$ to 70 mm$^2$.

Other features of the stud 100 that are particularly related to the optimal grip and road wear (simultaneously) include the following, each one separately or in combination:

(a) A mass of the stud. Preferably, a mass of the stud 100 is 0.4 g to 3 g, preferably 0.5 g to 1.5 g, most preferably 0.65 g to 1.1 g. Preferably, a mass of the pin 110 of the stud 100 is 0.1 g to 0.8 g, preferably 0.15 g to 0.35 g.

(b) A length of the stud 100. This is related to the structure of the tyre 200, and the fact that by using a sufficiently long stud, the base flange 140 thereof can be arranged to such a part of the tyre 200 that the hardness of the rubber material supporting the base flange 140 is proper. This applies, even if the tread 210 itself was softer or harder. Therefore, in an embodiment, a height H100 of the stud, as measured in the longitudinal direction Sz of the stud 100 is greater than 9.5 mm, preferably 10.0 to 11.0 mm. Reference is made to FIGS. 1f and 2e showing the height H100; and to FIG. 5e showing the material with which the base flange 140 of the stud 100 makes a contact.

(c) A shape of the pin 110. The second cross-section of the pin 110 may have various shapes. An example of the second cross-section is shown in FIG. 1b. Another example of the second cross-section is shown in FIG. 2b. Different examples are shown in FIGS. 3a to 3d. The second cross-section of the pin 110, the second cross-section being on a plane having normal in the direction Sz of the length of the stud, may be symmetric about one or several axes S of symmetry (the axis of symmetry being part of the plane of the cross-section).

Figures 3A, 3B, 3C, 3D:
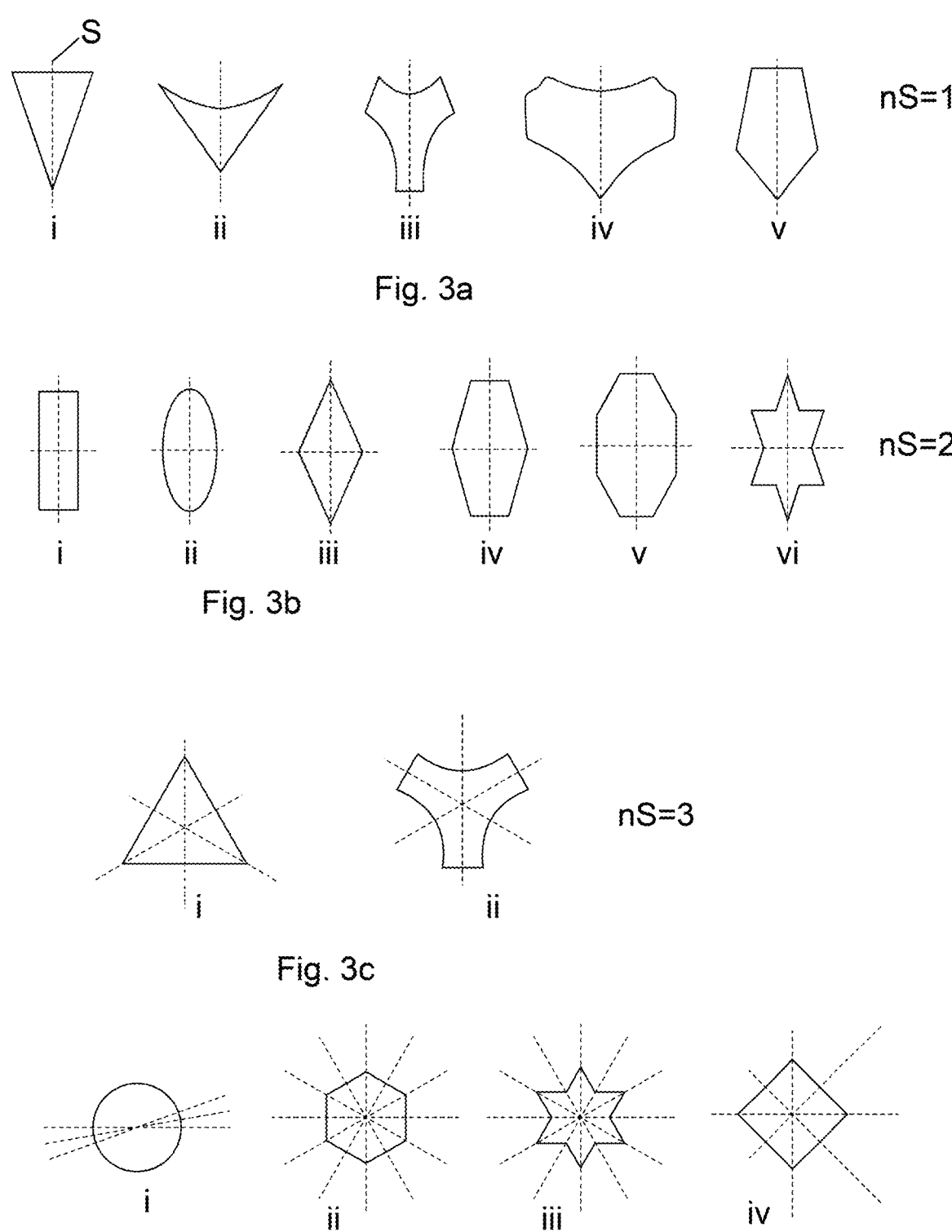
FIGS. 3a to 3d show cross-sections of pins of studs.

Starting with forms having multiple axes of symmetry, FIG. 3d(i) shows a cross-section of the pin 110, the cross-section being circular. A circle is symmetric about all axes that correspond to a diameter of the circle. Thus, the cross-section of FIG. 3d(i) has infinitely many axes of symmetry. FIGS. 3d(ii) and 3d(ii) show cross-sections having six axes of symmetry. 3d(ii) shows a shape of a regular hexagon and 3d(iii) shows a star shape with six aisles. FIG. 3d(iv) shows a square, which has four axes of symmetry. The number nS of axes of symmetry S is shown in these figures. In all FIGS. 3a to 3d the axes of symmetry S are shown by dash lines. The reference "S" is shown in FIG. 3a(i) only and denotes an axis of symmetry.

FIG. 3c (both i and ii) show second cross-sections of the tip 110, the second cross-section having three axes of symmetry S (nS=3). FIG. 3c(i) shows a triangle and FIG. 3c(ii) shows a star shape with three aisles, each aisle provided with curved edges.

FIG. 3b(i to vi) show second cross-sections of the tip 110, the second cross-section having two axes of symmetry S (nS=2). A basic form for some of these cross-sections is a polygon with an even number of corners, optionally including rounded edges, the shape being stretched in one direction.

FIG. 3a(i to v) show second cross-sections of the tip 110, the second cross-section having one axis of symmetry S (nS=1). A basic form for some of these cross-sections is a polygon with an odd number of corners, optionally including rounded edges, the shape being stretched in one direction.

Preferable shapes of the tip 110 include such shapes that the second cross-section has one, two, or three (but not more than three) axes of symmetry. Thus, in an embodiment, the second cross-section has at least one and at most three axes such axes of symmetry S that belong to the plane of the second cross-section. Having one, two or three axes S of symmetry improves the possibilities of optimizing the grip by orienting the stud (e.g. one of the axes of symmetry) relative to the direction of rotation R. Thus, this number of axes S of symmetry is beneficial in combination with the tyre being directional (see above for definition).

While the above features relate to the second aspect of the invention, they also relate to the first aspect of the invention (i.e. the stud as such).

The studs only function as intended if they remain in the stud holes 250 in use. Thus, good grip of the tyre is related to fixing the studs in a reliable manner to their stud holes 250. Features that are related to the stud 100 being fixed to the stud hole 250 in a reliable way include the following:

(d) Size of the base flange 140. The cross-section of the base flange 140 is preferably greater than a cross-section of the second part 130. Thus, the base flange 140 anchors the stud 100 well to the stud hole. Therefore, in an embodiment, the second part 130 has a third cross-section on a plane that has a normal in the longitudinal direction Sz of the stud 100, the third cross-section having a third area (A130, A132, A134), and the first area A140 is greater than the third area (A130, A132, A134). The third area A130 may correspond to a (sole) third area of the second part as in FIGS. 2a and 2c; or the third area A130 may correspond to an area A132 of a cross-section of a waist 132 or an area A134 of a cross-section of a second flange 134.

As detailed in FIGS. 1a to 1f in a preferable embodiment, the second part 130 comprises a second flange 134 and a waist 132. The waist 132 connects the base flange 140 to the second flange 134. Moreover, the pin 110 protrudes from the second flange 134 in the longitudinal direction Sz of the stud 100. In this embodiment, also the structure of the second part 130 helps the fixing of the stud 100 to the stud hole 250.

In an embodiment, the waist 132 has the third cross-section on a plane that has a normal in the longitudinal direction of the stud, the third cross-section having the third area A132 as discussed above. Moreover, the second flange 134 has a fourth cross-section on a plane that has a normal in the longitudinal direction of the stud, the fourth cross-section having a fourth area A134. Furthermore, the fourth area A134 is greater than the third area A132.

As for the values of the first area A140 in absolute terms or in relation to a size of the pin 110, reference is made to what has been said above.

(e) Shape of the base flange 140. To enable installing the stud into the stud hole 250 in a reliable manner, an aspect ratio of the cross-section of the base flange 140 should not be excessive. Therefore, in an embodiment, a greatest one-dimensional measure dx140 of the first cross-section is 6.0 mm to 10.5 mm, preferably 7.0 to 10.0 mm and most preferably 7.5 mm to 8.5 mm. The measure dx140 is shown in FIGS. 1*e* and 2*d*. In case the first cross-section of the base flange 140 would be circular, the greatest one-dimensional measure dx140 would be the diameter. However, typically, the first cross-section of the base flange is not circular. Moreover, in an embodiment, a length dn140 of a shortest straight line that connects an edge of the first cross-section, an opposite other edge of the first cross-section, and a central point O of the first cross-section is 4.5 mm to 9.5 mm, preferably 4.5 mm to 8.5 mm, and most preferably 5.0 to 7.5 mm. A shortest line that connects an edge of the first cross-section, an opposite other edge of the first cross-section, and the central point O of the first cross-section and the length dn140 thereof is shown in FIGS. 1*e* and 2*d*. The central point O may refer to one of the following:

a centre of gravity of the first cross-section, the mass of the cross-section being uniformly distributed over the first cross-section, a normal projection of a centre of gravity of the stud 100 to the first cross-section, the normal projection being projected in the direction Sz of the length of the stud, or a normal projection of a centre of gravity of the pin 110 to the first cross-section, the normal projection being projected in the direction Sz of the length of the stud.

These measures each one separately and some or all in combination ensure that the stud 100 remains well in the stud hole 250 in use, and therefore ensure good grip of the tyre 200.

Further features of the stud as such affecting grip and/or road wear include:

(f) Length of the pin 110. The pin 110 should be fixed to the second part 130 of the stud 100, e.g. to the second flange 134, in a reliable manner. This may be done by inserting a part of the pin 110 into a hole provided in the second part 130. Therefore, in an embodiment, a part of the pin 110 penetrates into the second part 130 (e.g. into the second flange 134 thereof) such that a length L110 of the pin 110 is at least two times or at least three times the height H110 (i.e. L110≥2×H110 or L110≥3×H110). Reference is made to FIG. 2*f*. Even if not shown, the pin may penetrate into the second flange 134 in the embodiment of FIGS. 1*a* to 1*f*, even if not explicitly shown.

In addition to the stud as such, how the studs are arranged to the tread 210 also affects grip and road wear on the tyre. Such features include:

(g) Protrusion of the stud(s). As detailed above, the protrusion P100 of a stud 100 affects the dynamic impact. Preferably, the protrusion P100 is between 0.6 mm and 2.0 mm, more preferably between 0.7 mm and 1.6 mm, and most preferably between 0.8 mm and 1.4 mm measured from an inflated unused tyre. The protrusion of stud P100 is shown in FIG. 4*d*. In an embodiment, these values apply to an average of the protrusions P100 of the studs 100 (i.e. all the studs 100) of the tyre. In an embodiment, these values apply to all the protrusions P100 of the studs 100 (i.e. all the studs 100) of the tyre individually.

(h) Type or types of the studs.

(h,i) In an embodiment the tyre 200 comprises multiple studs 100*a* of a first stud type only. Thus, in an embodiment, all the studs of the tyre 200 are identical in shape.

Figures 4A, 4B, 4C:
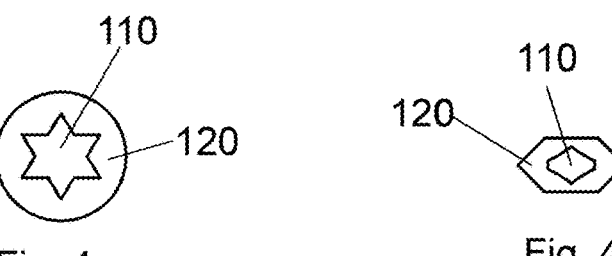
FIG. 4a shows a stud of a first type in a top view.
FIG. 4b shows a stud of a second type in a top view.
FIG. 4c shows a part of a tread of a tyre.

(h,ii) In an embodiment the tyre 200 comprises multiple studs 100*a* of a first stud type and multiple studs 100*b* of a second stud type. FIG. 4*c* shows a tread 210 to which multiple studs 100*a* of a first stud type and multiple studs 100*b* of a second stud type have been installed. For example, the shape of the studs 100*a* of the first type are shown in FIG. 4*a*, and the shape of the studs 100*b* of the second type are shown in FIG. 4*b*. Also FIG. 5*f* shows a tread 210 to which multiple studs 100*a* of a first stud type and multiple studs 100*b* of a second stud type have been installed.

(i) Placement of the studs in the tread. In FIG. 4*e*, a central region CR of the tread comprises studs 100*b* of the second stud type, and both a first shoulder region SR1 and a second shoulder region SR2 comprise studs 100*a* of the first stud type. Studs 100*b* of the second type are not identical with the studs 100*a* of the first stud type. Thus, in an embodiment, a central region CR of the tread 210 is arranged between a first shoulder region SR1 of the tread 210 and a second shoulder region SR2 of the tread 210. The central region CR comprises a circumferential central line CL of the tread 210. In an embodiment, the a circumferential central line CL of the tread 210 divides also the central region to two equally wide parts. The first shoulder region SR1 extends in an axial direction SAX from a first side S1 of the tread 210 towards the circumferential central line CL. A first side S1 is shown in FIGS. 4*c* and 5*f*. The second shoulder region SR2 extends in an axial direction SAX from a second side S2 of the tread 210 towards the circumferential central line CL. A second side S2 is shown in FIGS. 4*c* and 5*f*. In an embodiment, the first shoulder region SR1, the second shoulder region SR2 and the central region CR constitute the tread 210. In other words, in the embodiment, the tread 210 consists of the first shoulder region SR1, the second shoulder region SR2 and the central region CR. In accordance with an embodiment, the central region CR has a width which is in a range from 33% to 49% of the total width W210 of the tread 210, but may be different from that. Some examples to be mentioned are the range from 35% to 40%, or 44% to 48%

Moreover, the central region CR comprises studs 100*b* of the second stud type, and one or both of the first shoulder region SR1 and the second shoulder region SR2 comprise/comprises studs 100*a* of the first stud type.

In an embodiment, at least two thirds of the studs 100 that are arranged in the central region CR are of the second stud type (they are studs 100*b*), and at least two thirds of the studs arranged in the first and second shoulder regions SR1, SR2 are of the first stud type (they are studs 100*a*).

In an embodiment, the studs 100*a* of the first stud type comprise identical first pins. A cross-section of a first pin, the plane of the cross-section having a normal to the longitudinal direction Sz of the stud, has a first shape. Moreover, the studs 100*b* of the second stud type comprise identical second pins. A cross-section of a second pin, the plane of the cross-section having a normal to the longitudinal direction Sz of the stud, has a second shape. The second shape is different from the first shape. For example, the pin 110 of the stud 100*a* of the first type, as shown in FIG. 5*f*, has the cross-section shown in FIG. 3*c(ii)*, and the pin 110 of the stud 100*b* of the first type, as shown in FIG. 5*f*, has the cross-section shown in FIG. 3*a(iv)*. As another example, the pin 110 of the stud 100*a* of the first type, as shown in FIG. 4*c*, has the cross-section shown in FIG. 3*d(iii)*, and the pin 110 of the stud 100*b* of the first type, as shown in FIG. 4*c*, has the cross-section shown in FIG. 3*b(iv)*.

By using at least two different types of studs, the grip of the tyre can be optimized. This is particularly true, when studs of the second stud type are used in the central region CR, and studs of the first stud type are used in the shoulder regions SR1, SR2.

(j) Amount of studs. The grip of the tyre can be improved by using sufficiently many studs. In an embodiment, the tread 210 has the first width W210 and the first circumference C210, as defined above. The width W210 of the tread 210 is shown at least in FIGS. 5*a* and 5*f*; and the first circumference C210 is shown at least in FIG. 5*b*. The first circumference C210 may be measured along the circumferential central line CL. The circumferential central line CL defined above is arranged in an equatorial plane EP of the tyre 200. Moreover, the equatorial plane EP (shown in FIG. 5*e*) of the tyre 200 divides the tyre to two equally large parts.

Moreover, concerning the number of studs, in an embodiment, the tread 210 is provided with a total number N100 of studs 100. In an embodiment, a ratio (N100/(W210×C210)) of the total number N100 of the studs to the product W210×C210 of the first width W210 and the first circumference C210 is more than 5.6 pieces per square-decimetre (pcs/dm²).

The width W210 of the tread 210 may be somewhat smaller than a width W200 of the tyre. Within this description, the width W200 of the tyre 200, as shown in FIG. 5*d*, refers to the "Section Width" as defined in the ETRTO standards manual 2023. The height H200 of the tyre 200 is also shown in FIG. 5*d*, and is defined as the "Section Height" in the ETRTO standards manual 2023. Correspondingly, the Section Width, i.e. the width W200 of the tyre 200 as defined herein (and in the ETRTO standards manual) is the linear distance between the outsides of the sidewalls of an inflated tyre excluding elevations doe to labelling (markings), decoration, or protective bands or ribs. FIG. 5*d* also shows half of a cross-section of a rim 300 onto which the tyre 200 has been installed. As for the circumference C210, the circumference C210 may equal pi (i.e. 3.14) times the overall diameter indicated in Table 1 (see above).

The first width W210 may be equal to the reference tread width as defined in the ETRTO standards manual 2023 (see Design Guide, Page PC.7). In accordance with the definitions therein, the reference tread width C is calculatable as $$C=(1.075-0.005ar)s^{1.001}$$

Herein s is the Section Width (defined above), i.e. the width W200 of the tyre, and ar is the nominal aspect ratio, which is readable from the size marking w/hRr (see above), the "h" indicating the aspect ratio. Thus, the first width W210 of the tread 210 may equal the value C as calculatable with the equation given above.

(k) Distribution of studs.

(k,i) The grip of the tyre can be improved by using sufficiently many studs on both sides of the circumferential central line CL. In an embodiment, the circumferential central line CL of the tread 210 (as well as the equatorial plane EP) defines a first half H1 of the tread 210 and a second half H2 of the tread 210 (see FIG. 4*c*). In the embodiment, the first half H1 comprises a first number N1 of studs 100, 100*a*, 100*b* and the second half H2 comprises a second number N2 of studs 100, 100*a*, 100*b* such that a ratio (N1/N2) of the first number to the second number is 90% to 110%.

(k,ii) The grip of the tyre can be improved by distributing the studs, in the axial direction SAX more or less evenly on the tread 210. Referring to FIG. 4*c*, each stud is arranged at a distance from the circumferential central line CL. Thus, each stud defines a circumferential row rij, the circumferential row being parallel to the circumferential central line CL and at such a distance that the stud is arranged on the circumferential row rij. Herein "rij" stands for j:th circumferential row in the i:th half. FIG. 4*c* shows nine rows (j=1, 2, . . . , 9) on both halves (i=1 or 2). Several studs may be arranged on the same circumferential row. However, preferably not all the studs of first half of the tread are arranged on the same circumferential row. This applies also for the studs of the second half of the tread. Preferably, studs are arranged on at least six different circumferential rows.

Referring to FIG. 4*c*, in an embodiment, each one of the multiple studs 100, 100*a*, 100*b* of the tyre 200 is arranged on a circumferential row (r11, r12, r13, r14, r15, r16, r17, r18, r19, r21, r22, r23, r24, r25, r26, r27, r28, r29) such that the studs 100, 100*a*, 100*b* are arranged on at least six different circumferential rows. Different circumferential rows (r11, r12, r13, r14, r15, r16, r17, r18, r19, r21, r22, r23, r24, r25, r26, r27, r28, r29) are arranged a distance apart from each other, and multiple studs may be arranged on only one circumferential row (r11, r12, r13, r14, r15, r16, r17, r18, r19, r21, r22, r23, r24, r25, r26, r27, r28, r29).

Preferably, the circumferential central line CL of the tread 210 defines the first half of the tread 210 and the second half of the tread 210, and the studs are arranged such that at least three different circumferential rows (r11, r12, r13, r14, r15, r16, r17, r18, r19) of the at least six different circumferential rows (r11, r12, r13, r14, r15, r16, r17, r18, r19, r21, r22, r23, r24, r25, r26, r27, r28, r29) are arranged on the first half, and at least three different circumferential rows (r21, r22, r23, r24, r25, r26, r27, r28, r29) of the at least six different circumferential rows (r11, r12, r13, r14, r15, r16, r17, r18, r19, r21, r22, r23, r24, r25, r26, r27, r28, r29) are arranged on the second half.

Having such many rows rij effective spreads the studs to the tread 210 reasonably evenly, thereby improving the grip.

(l) structure of a carcass of the tyre.

In addition to the tread 210 of the tyre 200, the structure of the tyre 200 provides for sufficient rigidness of the tyre 200 and thereby also affect the grip and road wear properties of the tyre 200. The tread 210 is provided as an outermost layer of a carcass of the studded tyre 200. A quarter of a cross-section of a tyre 200 is shown in FIG. 5*e*. The relevant cross-section for FIG. 5*e* is such a cross-section that is a cross-section of the tyre 200 with a plane that comprises the axis of rotation of the tyre, which is parallel to the axial direction SAX (see FIG. 5*a*) and located in the centre defined by the tyre 200. Such cross-section has two parts, which are substantially identical. One of such parts is shown in FIG. 5*d*. A half of only one of the parts is shown in FIG. 5*e*. An equatorial plane EP (shown in FIG. 2*d*) of the tyre 200 divides the tyre to two equally large parts. The circumferential central line CL defined above is arranged in the equatorial plane EP.

As detailed above, the tyre comprises the tread blocks 220 that define the grooves 230 and the tread 210, which is an outermost layer of the carcass. Preferably, the carcass of the studded tyre 200 comprises one or more layers of reinforcing textile or textiles and one of more reinforcing metal layers.

In general, a tyre 200 has side surfaces on opposite sides of the tread 210. The side surfaces connect the bead area of the tyre to the tread 210. The side surfaces may have various markings indicating the tyre size, tyre speed class, tyre purpose (winter/summer), tyre manufacturer and/or tyre name. The bead area of a tyre has a cable. The function of the cable and the bead area is to fit the tyre 200 to the rim.

The tyre 200, in particular the carcass thereof, comprises a first ply 288. The ply 288 may comprise fibrous material, e.g. Kevlar, polyamide, carbon fibres, or glass fibres.

The carcass further comprises a first metal belt 287. Preferably, the carcass further comprises a textile belt 284, such as a textile belt 284 comprising fibrous polyamide (e.g. Nylon, aramid, or Cordura). Preferably, the carcass further comprises the textile belt 284 and a second metal belt 286. The metal belt(s) 287, 286 is/are resilient metal belts, such as steel belts comprising wires.

The tread blocks 220 are comprised by a cap layer 23 of the tyre 200. The cap layer 23 may further comprise material connecting the tread blocks 220. Thus, the cap layer 23 forms at least part of a running surface of the tyre. Thus, the cap layer 23 forms at least part of an outer surface of the tread. Under the tread blocks 220 of the tread 210, i.e. under the cap layer 23, the tyre preferably comprises a underlayer 21 made of suitable rubber material. A purpose of the underlayer 21 is to support the studs 100 so that they properly contact the ground in use. The contact is initiated by the dynamic impact detailed above. Thus, in an embodiment, the studs 100 of the tyre 200 are arranged at least partly on the underlayer 21. Thus, the underlayer 21 affects the dynamic impact the studs have on the road.

Figures 8A, 8B:
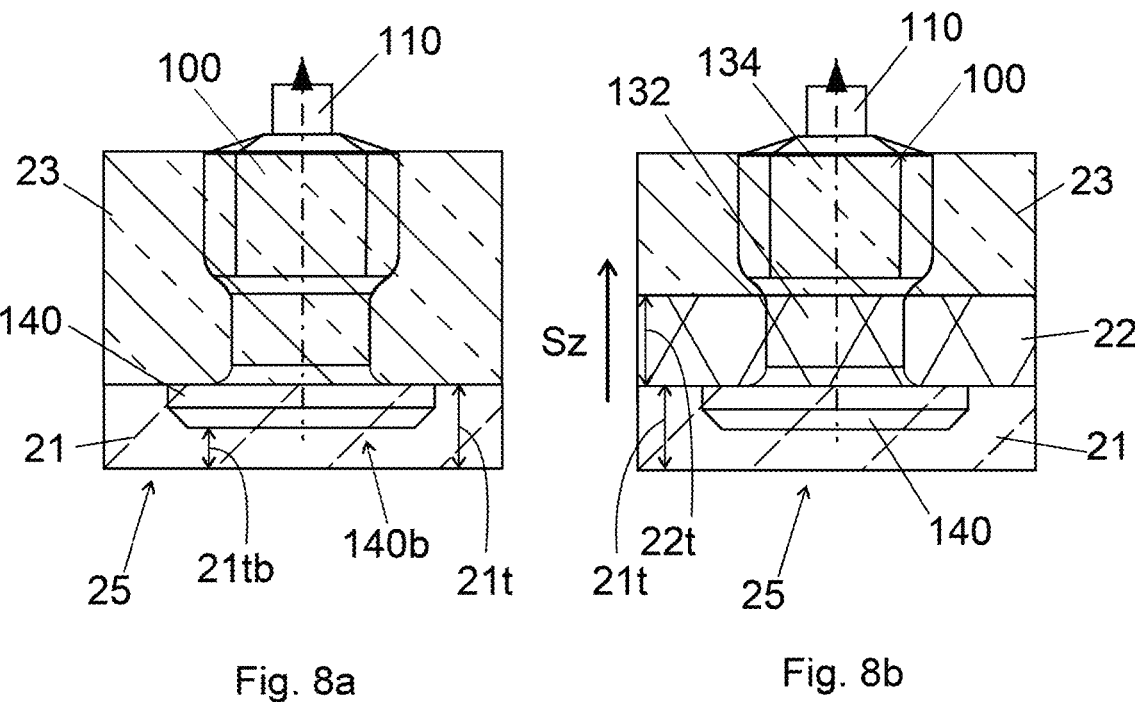
FIG. 8a shows schematically a stud arranged on an underlayer and penetrating through a cap.
FIG. 8b shows schematically a stud arranged on an underlayer and penetrating through an intermediate layer and a cap.

Referring to FIGS. 5e, 8a and 8c, in an embodiment the tyre 200 comprises the underlayer 21. The underlayer 21 is made of a first rubber compound. Thus, in an embodiment, the tyre 200 comprises at least one ply 288 at least one metal belt 286, 287, the cap layer 23 forming at least part of a running surface of the tyre, and the underlayer 21 made of a first rubber compound.

The underlayer 21 can be a circumferential layer. The underlayer 21 can be disposed radially outside an outermost belt of the tyre, such as a textile belt 284 or a metal belt 286, 287. If the tyre comprises a textile belt 284, the underlayer 21 can be disposed radially outside the textile belt 284. Technical effect of the textile belt is to restrict expansion from centrifugal forces during driving at high speed as well as improve many properties of the tyre having the underlayer, including improved handling, grip and aquaplaning for the tyre comprising the underlayer. If the outermost belt of the tyre is a metal belt 286, 287, the underlayer 21 can be disposed radially outside the metal belt 286, 287. The underlayer 21 has an inner surface 25 and an outer surface. The outer surface of the underlayer faces the tread 20. The inner surface 25 of the underlayer substantially faces the center of the tyre 200.

By the combined effect of the underlayer 21, the ply 288, and the metal belt or belts (286, 287), the dynamic impact of the studs can be particularly well controlled at different ambient temperatures.

The underlayer 21 is preferably arranged at least partly below the studs 10. Thus, the studs 100 can be placed at least partly above the underlayer 21.

Preferably, the underlayer 21 is arranged to be under each of studs of the winter tyre so that the base flange of the stud can be pressed against and retract into the underlayer 21.

The stud 100, preferably the base flange 140 of the stud, can be in direct contact with the underlayer 21. Thus, preferably, there is no other material layer between the stud and the underlayer.

Preferably, at least part of a base flange 140 of a stud is surrounded by the underlayer 21, and at least part of the second flange 134 of the stud is surrounded by the cap layer 23. Technical effect is to support the stud and decrease road wear.

More preferably, also an intermediate layer 22 is used, and at least part of a waist 132 of the stud 100 is surrounded by the intermediate layer 22. Technical effect is to improve stud retention as well as support the stud. More details of the intermediate layer 22 will follow.

The underlayer has an average thickness 21t. The average thickness 21t of the underlayer can be at least 0.5 mm, such as between 0.5 mm and 8 mm, more preferably at least 1.0 mm, and most preferably at least 1.5 mm. Furthermore, the average thickness 21t of the underlayer can be equal to or less than 7 mm, more preferably equal to or less than 6.5 mm, and most preferably equal to or less than 6 mm. The average thickness can be, for example, between 1 mm and 6 mm. Technical effect is that the ice grip properties of the stud can be substantially improved at cold weather, and moreover, the road wear at warm weather can be substantially reduced.

Moreover, the underlayer of the presented thickness can be compressible to reduce road wear, to reduce tyre noise, to improve the driving performance of the tyre as well as to keep the pin of the stud protruded from the tread to provide the tyre with good grip on an icy driving surface.

In an embodiment, the underlayer has a hardness (ShA) between 45 ShA and 65 ShA, determined at an ambient temperature of 22° C. according to standard ASTM D2240. Herein (in below) the unit ShA refers to the Shore A hardness, i.e. hardness as determined in the "A" scale of the standard. Technical effect is that the underlayer 21 is able to reduce road wear at 22° C. Preferably, the underlayer has a hardness (ShA) between 45 ShA and 60 ShA, more preferably between 45 ShA and 55 ShA, determined at an ambient temperature of 22° C. according to standard ASTM D2240. These values may apply also at 23° C.

Preferably, the tyre has such an underlayer 21 that a hardness of the underlayer varies with the temperature. Technical effect is to decrease the road wear of the studded tyre but still provide desired winter grip properties in spite of the reduced road wear. Hardening/softening of the material may occur at a temperature that can be characterized by a measuring part of of a complex modulus of the material as discussed below. In particular, a position of a tan delta maximum of the material may characterize a temperature at which hardening/softening takes places.

In an embodiment, a position of a tan delta maximum of the underlayer 21 is configured to be between −10° C. and +15° C., determined according to ISO 4664-1:2011 in compression. Technical effect is that in warm conditions, the underlayer can substantially soften, whereby the underlayer can allow the stud body to retract into the tread of the tyre, whereby it can reduce the stud's dynamic impact and thereby reduce the wear of the road.

The position of the tan delta maximum refers to the temperature at which tan delta reaches its maximum value. As background, the values of tan delta, as function of temperature, is referred to as a tan delta curve. The values for tan delta curve of this specification are determined as follows: Dynamic Mechanical Thermal Analysis ("DMTA") tests provide information about the small-strain mechanical response of the samples as a function of temperature. Sample specimens can be tested using a commercially available DMTA equipment in compression mode according to the standard ISO 4664-1:2011. The specimen is cooled to −60° C. and then heated to 70° C. at a rate of 2° C./min (i.e. 2 K/min) while subjected to an oscillatory deformation and a static strain, the oscillatory deformation having a frequency. Examples of specific values are detailed below. The output of the DMTA test is the storage modulus (E') and the loss modulus (E"), both as function of temperature. The storage modulus indicates the elastic response or the ability of the material to store energy, and the loss modulus indicates the viscous response or the ability of the material to dissipate energy. The ratio of E"/E', called tan delta, gives a measure of the damping ability of the material. As discussed, tan delta depends on temperature. Peaks in tan delta are associated with relaxation modes for the material, such as glass transition. The term "position of tan delta maximum" refers to a temperature in which the maximum value of a tan delta curve is obtained. Thus, "position of tan delta maximum" can be determined, for example, as a position of maximum tan delta value of the tan o curve.

The tan delta values can be determined from rubber compounds of a tyre as well as from rubber compounds to be used for a tyre, before forming the tyre. The sample has dimensions of diameter 4.5 mm×height 5.0 mm, when determined from a tyre. Further, the sample has dimensions of diameter 10.0 mm×height 10.0 mm, when determined from a rubber compound.

As for the values of oscillatory deformation and a static strain, for example, the following values can be used in the DMTA measurements:

an oscillatory deformation at 0.6% dynamic strain with 3.0% static strain and a frequency of 10 Hz, when using a sample having a diameter of 4.5 mm and a height of 5.0 mm, and an oscillatory deformation at 0.05% dynamic strain with 0.2% static strain and a frequency of 10 Hz, when using a sample having a diameter of 10.0 mm and a height of 10.0 mm.

The position of a tan delta maximum of the underlayer is thus the temperature at which the tan delta of the underlayer reaches it maximum. Correspondingly, the position of a tan delta maximum of the intermediate layer is the temperature at which the tan delta of the intermediate layer reaches it maximum.

From the DMTA measurements, also the dynamic stiffness (E*) of the material (underlayer of intermediate layer, whichever is tested) can be determined as detailed in the standard ISO 4664-1:2011 in a compression test. The values can be determined from rubber compounds using the procedure disclosed above for tan delta.

The dynamic stiffness of the underlayer, determined at a temperature of 20° C., can be configured to be less than 25 MPa, preferably from 5 to 20 MPa.

The dynamic stiffness (E*, MPa) of the underlayer can be
lower than 25 MPa at an ambient temperature of 20° C.,
in the range from 25 to 500 MPa, preferably from 40 to 400 MPa, at an ambient temperature of 0° C., and
at least 500 MPa at an ambient temperature of −30° C.

The change in the dynamic stiffness of the underlayer upon a decrease in the temperature can have a greater impact on the grip of the tyre in winter than the change in the hardness of the material upon a decrease in the temperature. For the above-mentioned dynamic stiffness values, the adjustment of the stud's dynamic impact of the tyre at different temperatures can be more controllable, and the grip properties of the winter tyre can be better optimized for different temperatures. Thanks to the above-mentioned dynamic stiffness, for example the braking distance on an icy road can be substantially reduced.

These properties of the underlayer 21 can be achieved by a proper composition of the material of the underlayer 21.

Preferably, the underlayer 21 contains

NR (natural rubber) from 0 to 50 phr, preferable from 10 to 40 phr, and/or BR (butadiene rubber) from 0 to 30 phr, preferable from 10 to 20 phr, and/or IR (synthetic isoprene rubber) from 0 to 50 phr, preferable from 10 to 40 phr, so that a total amount of (NR and BR and IR) is from 0 to 70 phr, SSBR (solution polymerized styrene-butadiene rubber) from 30 to 100 phr, most preferably from 40 to 70 phr, resins from 5 to 40 phr, preferably from 10 to 35 phr, and reinforcing fillers from 35 to 80 phr.

A combined amount of carbon black and/or silica (examples of reinforcing fillers) is preferably from 35 to 80 phr, more preferably from 40 to 70 phr.

Technical effect of materials comprising the rubbers comprising at least 30 phr solution polymerized styrene-butadiene rubber together with the reinforcing filler(s) and the resin(s), and preferably also 10 to 70 phr NR, BR, and/or IR, is to provide the desired tan delta curve for the rubber compound.

The underlayer 21 can further contain additives, such as one or more of oils, antidegradants, ZnO, stearic acid, vulcanization chemicals and sulphur.

As discussed, the reinforcing fillers can comprise carbon black, and/or silica.

If the reinforcing fillers comprise silica, silane can be added for improving reinforcing efficiency of the silica. Preferably, a content of the silane is equal to or less than 15% by weight, such as between 5 wt. % and 15 wt. %, determined from total weight of the silica in the underlayer. Technical effect it to provide improved dispersion. Furthermore, silane can form bonds between silica and rubber during the vulcanization.

As discussed, the underlayer 21 preferably contains styrene butadiene rubber which is solution-polymerized styrene butadiene rubber SSBR. The underlayer 21 can comprise at least 30 phr of SSBR. Thus, the content of SSBR in the underlayer 21 can be at least 30 phr, preferably at least 35 phr, more preferably at least 40 phr, and most preferably at least 45 phr. Further, the content of SSBR in the underlayer 21 can be equal to or less than 100 phr, preferably equal to or less than 90 phr, more preferably equal to or less than 80 phr, and still more preferably equal to or less than 70 phr. By using said contents of the solution-polymerized styrene butadiene rubber SSBR, the stiffness can be efficiently adjusted as desired.

Microstructure of SSBR has an effect on properties of the SSBR. When preparing the underlayer, the vinyl content of the solution-polymerized styrene butadiene rubber, is preferably between 33% and 65% by weight, more preferably between 38% and 61% by weight, wherein the vinyl contents are expressed in mol % relative to the butadiene. Furthermore, the styrene content of the styrene butadiene rubber is preferably between 25% and 45% by weight, most preferably between 27% and 40% by weight, wherein the styrene content is expressed in mass % relative to the whole polymer. The contents can be determined by 1H-NMR method in accordance with ISO 21561-1:2015.

This embodiment can provide particularly suitable properties for the underlayer so that stiffening of the underlayer can take place in a controlled manner. Thus, stiffening can take place at a moment determined more precisely in advance.

Preferably, the underlayer contains either NR and SSBR, or BR and SSBR. In these combinations, the technical effect of NR and BR is to improve the elasticity of the underlayer even at cold temperatures. Further, the technical effect of SSBR is to improve stiffness of the mixture.

Thus, advantageously, the underlayer contains 10 to 50 phr, most preferable 10 to 40 phr of NR (natural rubber), and from 30 phr of SSBR, most preferably from 40 to 70 phr SSBR (solution polymerized styrene-butadiene rubber).

Technical effect of said combination of NR and SSBR is that the position of tan delta maximum can be efficiently adjusted as desired, and hardness of the underlayer can increase at a desired temperature, particularly when used together with the reinforcing fillers and resins according to this specification. Furthermore, thanks to this combination, elasticity of the underlayer can be maintained at cold temperatures, further improving properties of the underlayer.

It is to be noted that the natural rubber NR can be replaced with a synthetic isoprene rubber and still maintain the technical effects of the natural rubber. The synthetic isoprene rubber IR is very much like natural rubber but made synthetically. Thus, from 0 to 100 wt. % of the natural rubber NR can be replaced with the synthetic isoprene rubber IR.

In an embodiment, the underlayer advantageously contains 10 to 30 phr, most preferable 10-20 phr of polybutadiene rubber, and from 30 phr of SSBR, most preferably from 40 to 70 phr of SSBR (solution polymerized styrene-butadiene rubber).

Technical effect is that properties of the studded tyre having the underlayer can be particularly improved and position of the tan delta maximum of the underlayer can be easily adjusted by using said amounts of polybutadiene rubber and the solution polymerized styrene-butadiene rubber, particularly when used together with the reinforcing fillers and resins according to this specification.

The underlayer 21 can contain reinforcing fillers. A total amount of the reinforcing fillers is preferably more than 30 phr, more preferably at least 33 phr, still more preferably at least 35 phr, and most preferably at least 40 phr, determined from the underlayer 21. Furthermore, the underlayer 21 can comprise equal to or less than 80 phr of reinforcing fillers, preferably equal to or less than 70 phr of reinforcing fillers, still more preferably equal to or less than 60 phr of reinforcing fillers, and most preferably equal to or less than 55 phr of reinforcing fillers. Technical effect of the reinforcing fillers is that the hardness of the underlayer is easier to optimize to a desired level.

The reinforcing fillers are preferably selected from silica and carbon black. The reinforcement may comprise both silica and carbon black. If the reinforcing fillers comprises silica, also silane is preferably added to the mixture. Technical effect of the reinforcing fillers is to improve the strength of the underlayer. Furthermore, the reinforcing fillers can be used to influence the ShA hardness of the underlayer so that the hardness of the underlayer can be more easily optimized to a desired level.

In a non-limiting embodiment, the carbon black is selected from N375 and N234. These carbon blacks are known by a person skilled in the art.

In an embodiment, silica can be selected from: anhydrous silica prepared by dry process and silica prepared by wet process. Among them, hydrous silica prepared by wet process is preferable because it contains a lot of silanol groups.

In a non-limiting embodiment, the silica is selected from high BET and low BET.

Silane coupling agent can be used for silica to be appropriately dispersed during kneading. Preferably, a content of the silane is between 5 wt. % and 15 wt. %, determined from total weight of the silica in the underlayer. Technical effect it to provide improved dispersion. Furthermore, silane can form bonds between silica and rubber during the vulcanization.

The silane coupling agents can be of any type known to those skilled in the art. For example, at least one of bifunctional organosilane and polyorganosiloxane can be used. "Bifunctional" means a compound having a first functional group capable of interacting with silica, e.g., alkoxy, cycloalkoxy or phenoxy group as a leaving group on the silicon atom, and a second functional group capable of interacting with the double bond of elastomer, e.g., —SCN, —SH, —NH2 or -Sx- where x=2 to 8. The organosilanes can be chosen from the group consisting of polysulphide organosilanes (symmetrical or asymmetrical) such as bis(3-triethoxysilylpropyl) tetrasulphide, abbreviated as TESPT or bis disulphide-(triethoxysilylpropyl), abbreviated as TESPD, polyorganosiloxanes, mercaptosilanes or blocked mercaptosilanes.

The underlayer 21 can contain oil(s). The amount of oils, if used, can be at least 5 phr, more preferably at least 8 phr, and most preferably at least 10 phr. Further, the amount of oils can be equal to or less than 25 phr, preferably equal to or less than 22 phr, and most preferably equal to or less than 20 phr. Technical effect is to increase processability and adjust hardness of the compound.

The oil(s) is/are preferably selected from the group of:

vegetable oil, such as sunflower oil or rapeseed oil,

TDAE oil (treated distillate aromatic extract),

MES oil (mild extracted solvate), and

RAE oil (residual aromatic extract).

Preferably, said oil contains or consists of at least primarily TDAE oil and/or SRAE oil. Technical effect of oils is to act as process aids and softeners in the manufacturing process.

As discussed, the underlayer 21 can contain one or more resins. A total content of resins is preferably at least 5 phr determined from the underlayer. Technical effect is that the resins can adjust dynamic behavior of the underlayer by shifting and/or broadening the tan delta peak of the rubber compound. Thus, thanks to the resins, position of the tan delta maximum can be adjusted in a cost-efficient and controlled manner to a predetermined temperature range.

A total amount of resins can be at least 5 phr, preferably at least 10 phr, more preferably at least 15 phr, and most preferably at least 17 phr, determined from the underlayer. Further, the total amount of resins can be equal to or less than 40 phr, preferably equal to or less than 35 phr, more preferably equal to or less than 30 phr and most preferably equal to or less than 28 phr, determined from the underlayer. Thus, the total amount of resins can be, for example, 5-40 phr, preferably 10-35 phr, and more preferably 15-30 phr, determined from the underlayer. By applying resin, position of tan delta maximum of the underlayer can be raised by a predetermined level so that the hardening of the underlayer can be implemented within a predetermined temperature range. Another technical effect is that by using the preferably ranges, resins affect the rubber compound by shifting and/or broadening the tan delta peak of the rubber compound as desired.

The resin(s) used for the underlayer can have a glass transition temperature higher than 20° C., more preferably higher than 30° C., and most preferably higher than 35° C. Further, the resin(s) used for the underlayer can have a glass transition temperature of less than 110° C., preferably less than 85° C., most preferably less than 70° C. For example, the resin(s) can have a glass transition temperature from 20 to 100° C., preferably from 35 to 60° C. As discussed, Tg for resins can be determined as a peak midpoint by a differential scanning calorimeter (DSC) at a temperature rate of increase of 10° C. per minute, according to ASTM D6604 or equivalent.

Preferably, the one or more resins of the underlayer are selected from the following group:

petroleum hydrocarbon resins, aromatic vinyl-based resins, phenol-based resins, terpene resins, terpene phenol resins, rosin derived resins and copolymers, and mixtures and modifications thereof.

Technical effect is to efficiently adjust the position of tan delta maximum to a desired temperature, i.e., to shift a position of tan delta maximum to a desirable range.

Most preferably, the one or more resins of the underlayer are selected from rosin-based resins, terpene-based resins, and pure monomer C9 resins (PMR), i.e., aromatic resins based on aromatic feedstocks that have been highly purified prior to polymerization, including copolymers of styrene and $\alpha$-methylstyrene. Technical effect is to shift tan delta peak position to a desirable temperature range more efficiently.

The underlayer can comprise an aromatic resin. Thus, the resin(s) can contain aromatic groups. In an embodiment, the resins contain more than 4% aromatic groups, more preferably more than 6% aromatic groups. However, the aromatic content is preferably less than 60%, more preferably equal to or less than 54%.

Advantageously, for adjusting the position of the tan delta peak of the underlayer to a desired temperature range in a controlled and precise manner, the underlayer comprises:

solution-polymerized styrene butadiene rubber SSBR, and polybutadiene rubber and/or natural rubber, and/or synthetic isoprene rubber, reinforcing filler(s), and resin(s).

The contents of the materials are preferably in the range defined in this specification.

The underlayer 21 can comprise, primarily comprise, or consist of a material whose tan delta maximum is at a temperature of at least −20° C., for example at least −15° C., preferably at least −12° C., more preferably at least −10° C., or at least −8° C., and most preferably at least −5° C. Furthermore, tan delta maximum of said material can be at a temperature of equal to or less than 20° C., for example not higher than 15° C., preferably not higher than 12° C., more preferably not higher than 10° C., or not higher than 8° C., and most preferably not higher than 5° C. Thus, the hardening of the underlayer can be suitable in view of road wear and winter grip. Technical effect of the preferable ranges is that the hardening of the underlayer can take, more accurately, place at a point optimal in view of road wear and winter grip hence, the stud's dynamic impact of the tyre can be controlled easier at different temperatures.

An unvulcanized material of the underlayer can be vulcanized so that sulphur is used as the vulcanizing agent.

As indicate above, the underlayer 21 may be reasonably soft at a high temperature. However, it has been found that a too soft underlayer 21 may not result in optimal handling properties of the tyre. The inventors have found that the handling properties can be, in such a case, improved by using an intermediate layer 22 providing for sufficient rigidness, even if the underlayer 21 is soft. This applies in particular, when the underlayer 21 is made of adaptive material, i.e. material that softens at high temperatures as discussed above. Thus, in an embodiment, the tyre 200 comprises comprises the intermediate layer 22. Moreover, in such an embodiment, the underlayer 21 is arranged, at least partially, under the intermediate layer 22. The intermediate layer 22 can be a circumferential layer.

FIGS. 8b and 8d show embodiments comprising the intermediate layer 22. The intermediate layer 22 can be arranged between the cap layer 23 and the underlayer 21, at least on locations of the studs. Technical effect is that the intermediate layer improves the stability of the tyre and supports the studs 10 therein when the underlayer is softening. The intermediate layer 22 can support the studs and hence improve driving stability of the tyre on a dry road.

Even if not shown, a part of the intermediate layer 22 may form a part of the cap layer 23. Thus, in an embodiment, the intermediate layer 22, or at least part of the intermediate layer 22, is be placed between the cap layer 23 and the underlayer 21.

An average thickness 22t of the intermediate layer can be at least 0.4 mm, preferably at least 0.5 mm. As for an upper limit, the thickness of the intermediate layer may be at most 7 mm. A preferable range for the thickness is at least 0.6 mm and less than 6.5 mm, more preferably at least 0.7 mm and equal to or less than 6 mm, and most preferably in a range between 0.8 mm and 5 mm. Technical effect is that the intermediate layer can, together with the underlayer, provide the stud with particularly suitable winter grip properties. Thus, the ice grip properties of the tyre can be substantially improved. In addition, properties of the vehicle tyre can be designed as desired more efficiently than in other solutions.

A thickness of the intermediate layer 22, determined at a location wherein the intermediate layer is surrounding a stud, can be at least 0.4 mm and equal to or less than 7 mm, preferably at least 0.5 mm, more preferably at least 0.6 mm and less than 6.5 mm, still more preferably at least 0.7 mm and equal to or less than 6 mm, and most preferably in a range between 0.8 mm and 5 mm. Technical effect is that the intermediate layer can support the stud. Further technical effect is that the intermediate layer can provide particularly suitable handling properties.

The intermediate layer 22 is made of a second rubber compound. In an embodiment, the intermediate layer has a hardness (ShA) between 66 ShA and 80 ShA, determined at an ambient temperature of 22° C. according to standard ASTM D2240. Technical effect is that the intermediate layer is able to improve stability of tyres having the underlayer 21. Preferably, the intermediate layer has a hardness (ShA) between 70 ShA and 78 ShA, determined at an ambient temperature of 22° C. according to standard ASTM D2240. These values may apply also at the temperature 23° C.

A position of tan delta maximum of the intermediate layer 22 is, in an embodiment, configured to be between −40° C. and −70° C. (more preferably between −40° C. and −60° C.), determined according to ISO 4664-1:2011 in compression. Further, preferably, at the same time, a position of a tan delta maximum of the underlayer 21 can be configured to be between −10° C. and +15° C. (preferably between −5° C. and +15° C.), determined according to ISO 4664-1:2011 in compression. Thus, when the underlayer substantially softens in warm conditions, the intermediate layer can substantially maintain its stiffness and therefore support the stud and the whole tyre.

The dynamic stiffness of the intermediate layer, determined at a temperature of 20° C., can be configured to be at least 25 MPa, preferably at least 27 MPa, and more preferably from 30 to 100 MPa. Technical effect is to decrease road wear while the intermediate layer supports the whole tyre and the studs of the tyre at the warmer temperature. At the same time, the dynamic stiffness of the underlayer, determined at a temperature of 20° C., can be configured to be less than 25 MPa, preferably from 5 to 20 MPa.

The composition of the intermediate layer 22 affects these properties.

The intermediate layer can comprise or be made of materials selected from a group comprising or consisting of:
    elastomers, for example, SBR, BR, NR,
    fillers, for example silica and/or carbon black, wherein silane is preferably used together with the silica)
    vulcanization chemicals or curing agents, and
    one or more of resins, sulphur, oils, and antidegradants.

In an embodiment, silica may be selected from: anhydrous silica prepared by dry process and silica prepared by wet process. Among them, hydrous silica prepared by wet process is preferable because it contains a lot of silanol groups. Silane coupling agent can be used for silica to be appropriately dispersed during kneading.

If the fillers comprise silica, silane can be added for improving reinforcing efficiency of the silica. Preferably, the content of the silane is equal or less than 15% (such as from 5% to 15%) by weight relative to the amount of silica. Technical effect is to improve dispersion and during the vulcanization silane forms bond between silica and rubber.

The silane coupling agents can be of any type known to those skilled in the art. For example, at least one of bifunctional organosilane and polyorganosiloxane can be used. "Bifunctional" means a compound having a first functional group capable of interacting with silica, e.g., alkoxy, cycloalkoxy or phenoxy group as a leaving group on the silicon atom, and a second functional group capable of interacting with the double bond of elastomer, e.g., —SCN, —SH, —NH2 or -Sx- where x=2 to 8. The organosilanes can be chosen from the group consisting of polysulphide organosilanes (symmetrical or asymmetrical) such as bis(3-triethoxysilylpropyl) tetrasulphide, abbreviated as TESPT or bis disulphide-(triethoxysilylpropyl), abbreviated as TESPD, polyorganosiloxanes, mercaptosilanes or blocked mercaptosilanes.

Most preferably, the intermediate layer comprises
    SBR between 0 phr and 50 phr, such as 20 phr and 50 phr,
    BR between 0 phr and 50 phr, preferably between 10 phr and 35 phr,
    NR and/or IR between 20 phr and 100 phr, so that a total amount of (BR and NR and IR) is from 50 to 100 phr
    oils between 0 phr and 30 phr, resins between 0 phr and 30 phr,
    fillers between 40 phr and 80 phr, preferably the filler(s) is/are selected from carbon blacks and silicas,
    preferably, additives such as, ZnO, stearic acid, vulcanization chemicals and sulphur, and
    optionally, antidegradants.

As discussed, in an embodiment, the intermediate layer is made of an electrically conductive rubber material.

Preferably, the intermediate layer 22 comprises a rubber reinforcing carbon black. Technical effect is to increase stiffness of the intermediate layer while improving electrical conductivity through the tread. The intermediate layer can comprise a rubber reinforcing carbon black content of at least 40 phr, preferably at least 50 phr. Thus, the rubber composition(s) of the intermediate layer 22 can be relatively electrically conductive. Thus, the relatively electrically conductive rubber composition of the intermediate layer can e.g., form a part of the electrically conductive path. Thus, a very small electrical resistance can be obtained through the cap layer.

The intermediate layer 22 can comprise one or more oils. The oil(s) can comprise, for example,
    TDAE oil (treated distillate aromatic extract),
    MES oil (mild extracted solvate),
    RAE oil (residual aromatic extract), and
    vegetable oil, such as sunflower oil or rapeseed oil.
    Preferably, the oil(s) are selected from TDAE and SRAE. The oils can act in the manufacturing process as process aids and softeners.

A total amount of the oils in the intermediate layer 22 can be from 0 to 30 phr.

The resin(s) of the intermediate layer can be selected from the following group:
    petroleum hydrocarbon resin,
    aromatic vinyl-based resin,
    phenol-based resin,
    terpene resin,
    terpene phenol resin,
    rosin derived resins and copolymers, and
    mixtures and modifications thereof.

A total amount of the resins in the intermediate layer 22 can be from 0 phr to 30 phr, preferably 2 to 20 phr. Technical effect of resins is fine tuning stiffness properties of the intermediate layer.

Thanks to the underlayer and the intermediate layer, properties of the tyre can be easier to control so that the underlayer can yield to a particularly suitable extent when the ambient temperature rises, which can further reduce wear of the road surface. Further, by the combined technical effect of the intermediate layer and the underlayer, wear of the road surface under non-frozen conditions can be reduced while the underlayer together with the intermediate layer substantially improves winter grip of the tyre on an icy road.

As for the relation of the hardnesses of the underlayer 21 and the intermediate layer 22, in an embodiment, hardness (ShA) of the intermediate layer is configured to be greater than hardness of the underlayer at 22° C. Said difference between the underlayer and the intermediate layer is preferably at least 10%, more preferably from 10% to 60%, and most preferably from 11% to 40% so that underlayer is at least 10% softer than the intermediate layer, determined at 22° C. Technical effect is that the underlayer yields to a suitable extent at said ambient temperature, which reduces wear of the road surface, while the harder intermediate layer supports the tyre.

In an embodiment, the first rubber compound has a first hardness (ShA) and the second rubber compound has a second hardness (ShA), and a hardness (ShA) difference between the first rubber compound and the second rubber compound is at least 15% determined at –25° C. so that the second rubber compound is at least 15% softer than the first rubber compound, determined according to standard ASTM D2240 with an exception that the hardness is determined at a temperature of –25° C. and the rubber compounds are tempered according to Table 3 of the specification. Technical effect is that the underlayer made of the first rubber compound substantially improves ice grip of the tyre on an icy road.

The hardness (ShA) difference between the underlayer and the intermediate layer at cold temeperatures is preferably at least 5%, more preferably from 10% to 60%, still more preferably from 12% to 50%, and most preferably from 15% to 30% so that the underlayer is harder than the intermediate layer, determined at −25° C. Technical effect is that the underlayer and the intermediate layer substantially improves ice grip of the tyre on an icy road.

Accordingly, when measuring the Shore hardness at a temperature which is not disclosed in the standard ASTM D2240; the Shore hardness is measured by first tempering the material to be measured at the reference temperature by keeping the material to be measured at the reference temperature for a time given in Table 3 before the measurements.

TABLE 3

Tempering of a sample before hardness measurement.

| Sample Thickness (mm) | Temperature (° C.) | | | | | | | | | | |
|---|---|---|---|---|---|---|---|---|---|---|---|
| | −50 to less than −40 | −40 to less than −25 | −25 to less than −10 | −10 to less than −5 | −5 to less than 0 | 0 to less than 5 | 5 to less than 10 | 10 to less than 25 | 25 to less than 40 | 40 to less than 60 | 60 |
| | Time (min) to balance | | | | | | | | | | |
| 10 | 45 | 45 | 40 | 35 | 35 | 30 | 35 | 35 | 35 | 35 | 45 |
| 8 | 35 | 35 | 30 | 30 | 30 | 25 | 30 | 30 | 30 | 30 | 35 |
| 5 | 20 | 20 | 20 | 20 | 20 | 15 | 20 | 20 | 20 | 20 | 20 |
| 3 | 15 | 15 | 15 | 15 | 15 | 10 | 10 | 10 | 10 | 10 | 10 |
| 2 | 10 | 10 | 10 | 10 | 10 | 10 | 10 | 10 | 10 | 10 | 10 |

A softer underlayer material can substantially increase the retraction of the stud into the tyre at warmer temperatures and thereby reduce road wear and noise. The greater the difference in hardness of the material at different temperatures, the greater the effect of the underlayer on the grip of the tyre in cold weather and on road wear in warm weather. Thus, the effects of the underlayer can be particularly advantageous for both cold and warm conditions.

The dynamic stiffness of the underlayer, determined at a temperature of 0° C., can be configured to be at least two times the dynamic stiffness of the underlayer at a temperature of 20° C. Further, the dynamic stiffness of the intermediate layer, determined at a temperature of 0° C., can be configured to be from 1 to 1.5 times, preferably from 1.1 to 1.4 times, the dynamic stiffness of the intermediate layer at a temperature of 20° C. Technical effect is that the winter grip properties of the winter tyre can be substantially improved while the intermediate layer supports the whole tyre and the studs of the tyre at warmer temperatures.

The dynamic stiffness of the underlayer can be at least 100% higher, preferably at least 150% higher, than the dynamic stiffness of the intermediate layer at a temperature of 0° C. Technical effect is that the ice grip properties of the winter tyre can be substantially improved at 0° C. The dynamic stiffness of the underlayer may further be equal to or less than 1000% higher, such as equal to or less than 900% higher, preferably equal to or less than 580% higher than the dynamic stiffness of the intermediate layer at a temperature of 0° C.

Furthermore, the dynamic stiffness of the intermediate layer can be higher than the dynamic stiffness of the underlayer at a temperature of at least 5° C., such as at a temperature of at least 7° C. In a particularly advantageous embodiments, the dynamic stiffness of the intermediate layer is higher than the dynamic stiffness of the underlayer at temperatures from 10° C. to 20° C. Technical effect is to reduce road wear while improving handling properties of the tyre. Further technical effect is that the intermediate layer effectively supports the stud.

The dynamic stiffness of the underlayer at −25° C. can be at least 20 times the dynamic stiffness of the underlayer at +20° C. Thus, the grip properties of the winter tyre can be substantially improved, and, for example, the braking distance needed by the winter tyre under certain conditions can be substantially reduced.

It was noted during experimental tests that properties of tyres were particularly improved when the position of tan delta maximum of the underlayer was in a range between 0° C. and 10° C., and the position of tan delta maximum of the intermediate layer was less than −30° C. Thus, preferably, the tan delta peak position of the underlayer is in a range between 0° C. and 10° C., and the tan delta peak position of the intermediate layer is equal to or less than −30° C.

In a preferred example, for optimizing the grip properties of the tyre in winter,
(A) the hardness (ShA) of the underlayer can be
    lower than 60 ShA and preferably lower than 55 ShA at 20° C., and
    preferably at least 60 ShA, more preferably at least 65 ShA, at 0° C., and
    higher than 75 ShA at −30° C.;
and furthermore,
(B) the dynamic stiffness of the underlayer can be
    lower than 25 MPa at an ambient temperature of 20° C.,
    between 25 and 500 MPa at an ambient temperature of 0° C., and
    at least 500 MPa at an ambient temperature of −30° C.

During the experimental tests, it was noted that properties of tyres were particularly improved when a cross point of stiffness curves of the underlayer and the intermediate layer (shown in FIG. 6b) was in a range between +5° C. and 20° C., and particularly when the cross point of stiffness curves was in a range between +7° C. and 13° C.

Thus, advantageously, a cross point of stiffness curves of the underlayer and the intermediate layer is in a range between +5° C. and 20° C., more preferably in a range between +7° C. and 13° C.

In an advantageous embodiment, the dynamic stiffness of the underlayer is higher than the dynamic stiffness of the intermediate layer at temperatures of less than 5° C., but the dynamic stiffness of the intermediate layer is higher than the dynamic stiffness of the underlayer at temperatures from 15° C. to 20° C. Technical effect is to substantially reduce road wear while improving handling properties of the tyre.

According to a third aspect of the invention, there is provided a studded tyre having a special type of a textile belt, which has been found to affect the road wear caused by the tyre. As above the road wear refers to the road wear according to the test described in the standard SFS7503: 2022:en.

Referring to FIG. 9, which shows a half of a cross-section of a tyre, the cross-section being on a plane comprising a rotational axis of the tyre, according to the third aspect, the textile belt 284 is provided in the form of a long and narrow strand 310 that is wound around a metal belt of the tyre several rounds. Such a strand 310 forming the textile belt 284 is commonly known as a jointless belt (JLB) or a jointless band (JLB). However, it has been found that that when the different neighbouring rounds 311, 312 of the strand 310 are suitably spaced apart from each other, as shown e.g. in FIGS. 9-11 and 13, the road wear is reduced compared to other possible arrangements of the rounds of the strand, including partly overlapping rounds of strand. Partly overlapping rounds are shown, for comparison, in FIG. 12. Preferably, the neighbouring rounds of the strand 310, which are suitably spaced apart from each other, are both preferably reasonably close to a sidewall of the tyre.

Experiments were made concerning the spacing of different strands close to a side wall, and these confirm this finding. However, the inventors consider that same technical principles apply also at regions near the circumferential central line CL of the tread 210. Therefore, such a spacing may be provided, in addition or alternatively, between neighbouring rounds of the strand near the circumferential central line CL.

In this way, according to the third aspect of the invention and with reference to FIG. 9, the tyre 200 comprises a tread 210, multiple studs 100 in the tread 210, a metal belt 286 extending circumferentially around a rotational axis of the tyre, and a textile belt 284 comprising a strand 310 running around the metal belt 286 multiple rounds 311, 312, 313, 314 such that the textile belt 284 is arranged between the tread 210 and the metal belt 286. In a preferable embodiment the metal belt 286 comprises steel. When the metal belt 286 comprises steel, it may be called a steel belt or a steel breaker. The terms steel belt and steel breaker are also commonly used in the field of tyres.

In case the tyre comprises also another metal belt 287, these belts may be numbered so that the outermost metal belt, about which the strand 310 is wound, is called the second metal belt 286 in line with what has been discussed above. Reference is made to FIGS. 9 and 5e. At least the pins 110 of the studs 100 are exposed on the tread 210 so as to grip to ground or ice when the tire is used.

Concerning a suitable spacing between the different rounds of the strand 310, a first round 311 of the strand 310 is spaced apart from a second round 312 of the strand 310 so that a first spacing SW1 between the first round 311 of the strand 310 and the second round 312 of the strand 310 is 5% to 50% of a width W2 of the strand 310. As shown in FIG. 9, the first and second rounds 311, 312 are also neighbouring rounds, whereby not even a part of any other round of the strand 310 is arranged between first and second rounds 311, 312. Preferably, the first spacing SW1 between the first round 311 of the strand 310 and the second round 312 of the strand 310 is 10% to 40% or 15% to 25% of a width W2 of the strand 310. While a wider spacing may provide for less road wear, the inventors consider this to be an optimal compromise between low road wear, high ice grip, and good handling of the tyre. The first spacing SW1 is arranged in the axial direction SAX.

It has been found that this applies particularly to the rounds of the strand that are located at a shoulder region of the tyre. More specifically, the strand 310 forms an axial edge E310 of the strand 310, as shown in FIG. 9. The axial edge E310 is an outermost part of the strand 310 in an axial direction of the tyre (i.e. in a direction SAX of a rotational axis of the tyre). Naturally, the strand comprises also another edge opposite to the axial edge E310.

In an embodiment, the first round 311 is arranged close to the axial edge E310, or it forms the axial edge E310. For further discussion, the first and second rounds 311, 312 are defined so that, [Ai] the first round 311 forms the axial edge E310 of the strand 310 or [Bi] an axial edge E310 of the strand 310 is arranged closer to the first round 311 than to the second round 312, as e.g. in FIG. 9.

As for the closeness to the edge 310, more specifically, in an embodiment, [Aii] the first round 311 forms the axial edge E310 of the strand 310 or [Bii] the first round 311 is arranged a distance D2 apart from the axial edge E310 of the strand 310, the distance D2 being at most five times the width of the strand (i.e. D2 is at most 5×W2). More preferably, the distance D2 is at most three times the width of the strand (i.e. D2 is at most 3×W2) or the first round 311 forms the axial edge E310 of the strand 310.

FIG. 9 shows and embodiment, wherein the rounds are numbered so that the first round 311 does not form the axial edge E310 of the strand 310 and the first round 311 is arranged less than three times (and less than two times) the width W2 of the strand 310 apart from the axial edge E310. However, since the first round 311 is spaced apart from the round forming the axial edge E310 (see FIG. 9), the rounds in FIG. 9 could alternatively be renumbered so that the first round 311 would form the axial edge E310.

It has been surprisingly found that such a first spacing SW1 is beneficial in terms of low road wear caused by the normal use of the tyre. Experimental evidence will be provided in the section Experimental—part 2.

Because the spacing between neighbouring rounds of the strand 310 affects road wear, the inventors consider that for similar reasons the spacing between neighbouring rounds (313, 314) of the strand 310 closer to the circumferential central line should affect the road wear in a similar manner.

Therefore, in an embodiment, a third round 313 of the strand 310 is spaced apart from a fourth round 314 of the strand 310. Herein, the third and fourth rounds (313, 314) of the strand 310 are arranged closer to the circumferential central line CL of the tread 210 than the second round 312. I.e. The second round 312 is arranged further apart from the central line CL than how far the either of the third and fourth rounds (313, 314) is arranged from the central line CL. As shown in FIG. 9, the third and fourth rounds 314, 315 are also neighbouring rounds, whereby not even a part of any other round of the strand 310 is arranged between third and fourth rounds 313, 314.

In line with what has been said above, a second spacing SW2 is arranged between the third round 313 of the strand 310 and the fourth round 314 of the strand 310. The second spacing SW2 is arranged in the axial direction SAX. The second spacing SW2 is 5% to 50% of a width W2 of the strand 310. Preferably, the second spacing SW2 is 10% to 40% or 15% to 25% of a width W2 of the strand 310.

As an example, the width W2 of the strand 310 may be 6 mm to 18 mm, such as 8 mm to 12 mm. It is noted that a width of the tread may be e.g. 150 mm to 330 mm (see Table 1). Therefore, the number of rounds 311, 312, 313, 314 of the strand 310 constituting the textile belt 284 may be significant, say at least ten, such as 10-30, and typically about 10 to 25, depending on e.g. the widths SW1 and SW2 of the spacings, the width of the strand and the width of the tyre.

Without being bound to a theory, the inventors consider that the supportive effect brought by the textile layer 284 as described above is slightly reduced because of the spacings between the individual rounds 311 and 312, or 313 and 314. Such spacings become filled with elastic rubber material instead of harder textile material of the strand 310, whereby the material remaining underneath the studs become softer and in this way the studs can be pressed by less force. Or the other way around, the same force caused by the road to the stud pushes the studs more into the tread in this way reducing the road wear.

Referring to FIG. 9, an embodiment of the tyre comprises the first metal belt 287, the second metal belt 286, and the textile belt 284, which comprises the strand 310, as discussed above. On the textile belt 284, or more specifically, on the rounds 311, 312, 313, 314 of the strand 310 and at the locations of the spacings between the rounds 311, 312, 313, 314, on the second metal belt 286, there is arranged an underlayer 21. The underlayer 21 may have the properties as discussed above, in particular the temperature dependent properties related to dynamic stiffness and/or the position (i.e. temperature) of the tan delta maximum, as discussed above. As for the chemical composition of the material of the underlayer 21, reference is made to what has been said above. Concerning the structure of the tyre, reference is also made to FIG. 5e, which, however, does not show the details of the textile belt 284.

On the underlayer 21, the intermediate layer 22 may be arranged. On the underlayer 21 or on the intermediate layer 22 (if the intermediate layer 22 is present), there is arranged tread blocks 220, which constitute the tread 210. The cap layer 23, comprises the tread blocks 220. What has been said about the materials of the intermediate layer 22 and the cap layer 23 applies. The tyre may be configured to rotate in the direction R as shown by the one-head arrow R in FIG. 5c, or in either one of the two directions, as shown by the two-headed arrow in FIGS. 10 to 12.

Figure 10:
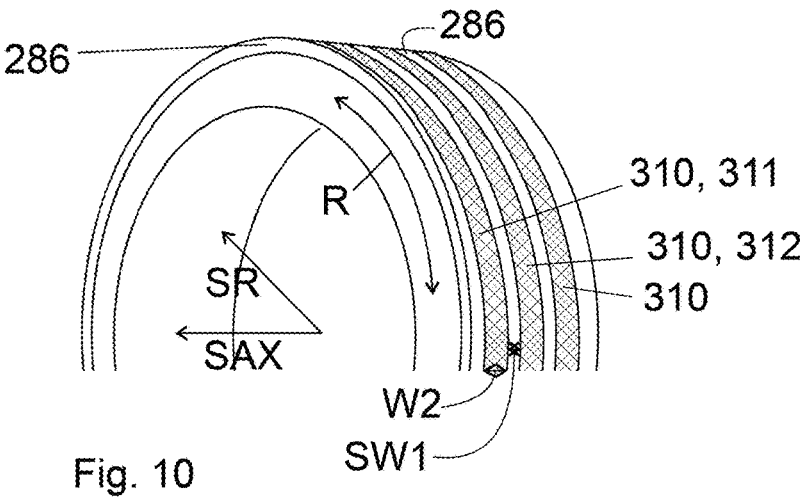
FIG. 10 shows a principal view of a strand, commonly known as a jointless belt or a jointless band, arranged on a metal belt in a schematic view.

FIG. 10 shows in a perspective view the strand 310 of the textile layer 284. FIG. 10 also shows individual rounds 311, 312 of the strand 310 and the first spacing SW1 between the rounds 311, 312 of the strand 310. The strand 310 extends substantially in the circumferential direction of the tyre, as will be discussed below in more detail below.

Figure 11:
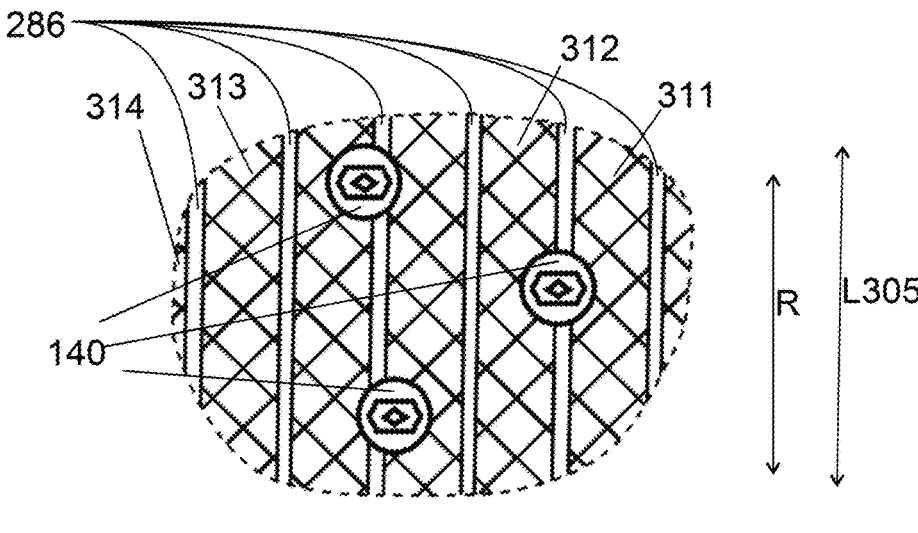
FIG. 11 shows a principal view of the strand and studs of a tyre, wherein different rounds of the strand are spaced apart.
Figure 12:
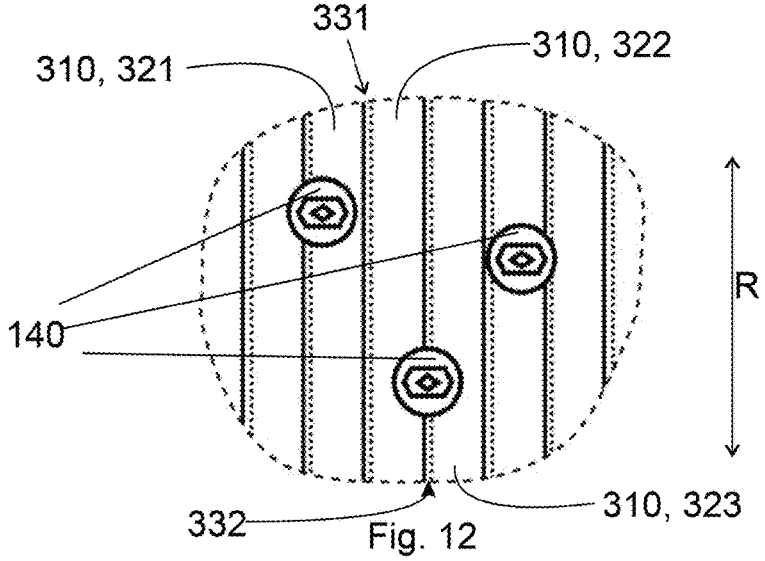
FIG. 12 shows a principal view of the strand and studs of a tyre, wherein different rounds of the strand are overlapping.

FIG. 11 shows in a top view rounds 311, 312, 313, 314 of the strand 310 of the textile layer 284 and studs arranged on the textile layer 284, however, referring to FIGS. 8a to 8d some rubber material of the underlayer 21 may be arranged in between the studs and the textile layer 284. The circles shown in FIG. 12 show in particular the base flanges 140 of the studs. For the definition of a base flange 140, reference is also made to FIGS. 1a-1f and 2a-2f. The tyre may be configured to rotate in either one of the two possible directions, as shown by the double headed arrow R in FIGS. 11 and 12.

Without being bound to a theory, the inventors consider that when at least a part of the base flange 140 of the stud is arranged on a spacing between the rounds 311, 312, 313, 314 of the strand 310, the spacings being indicated by the metal belt 286 in FIG. 11, the spacings have become filled with elastic rubber material (e.g. of the underlayer 21) instead of harder textile material of the strand 310 during manufacturing of the tyre, whereby the material remaining underneath the studs is reasonably soft and in this way the studs cause less road wear.

In line with this, in a preferable embodiment, the multiple studs 100 of the tyre include a first group of studs 100, wherein each stud 100 of the first group of studs comprise a base flange 140. Moreover, each stud 100 of the first group of studs is arranged such that a spacing between two neighbouring rounds of the strand is arranged radially inward from a part of the base flange 140 of the stud of the first group of studs. In other words, each stud 100 of the first group of studs is arranged such that a base flange of each stud of the first group of studs comprise such a part of the base flange that no part of the strand 310 is arranged between the part of the base flange 140 of the stud and the metal belt 286. Reference is made to FIG. 11. The parts of the base flanges 140 remain above the metal belt 286 as shown in FIG. 11.

Referring to FIG. 11, each one of the studs shown in FIG. 11 is arranged such that below a certain part of the base flange, no part of the strand 310 is arranged. In other words, each one of the studs shown in FIG. 11 comprise such a part of a base flange that no part of the strand 310 is arranged between the part of the base flange 140 of the stud and the metal belt 286. Such parts of the base flanges 140 are arranged above the spacings between the rounds 311, 312, 313, 314 of the strand 310. Thus, each one of the studs of FIG. 11 belong to the first group of studs 100 as defined above. It is noted that because FIG. 12 does not show spacing between the rounds 321, 322, 323 of the strand 310, none of the studs of FIG. 12 belong to the first group of studs.

Having studs belonging to the first grip reduce the road wear because of the elastic material underneath the base flanges.

Moreover, without being bound to a theory, the inventors consider that when at least a part of the base flange 140 of the stud is arranged on a part of the strand 310, this provides improved ice grip and handling for the tyre.

Therefore, in an embodiment, the multiple studs 100 of the tyre include a second group of studs 100. Each stud of the second group of studs comprises a base flange 140. Moreover, each stud of the second group of studs is arranged such that a part of the strand 310 is arranged radially inward from at least a part of the base flange 140 of the stud of the second group.

Referring to FIGS. 11 and 12, each one of the studs shown in FIGS. 11 and 12 is arranged such that below a certain part of the base flange a part of the strand 310 is arranged. In other words, each one of the studs shown in FIGS. 11 and 12 comprise such a part of a base flange that a part of the strand 310 is arranged radially inward from the part of the base flange 140. Thus, all the studs of FIGS. 11 and 12 belong to the second group of studs. Thus, all the studs of FIG. 11 belong both to the first group and to the second group of studs. Therefore, also in general, in a preferable embodiment, at least a part of the studs of the second group belong also to the first group of studs as defined above.

Figures 13A, 13B, 13C, 13D:
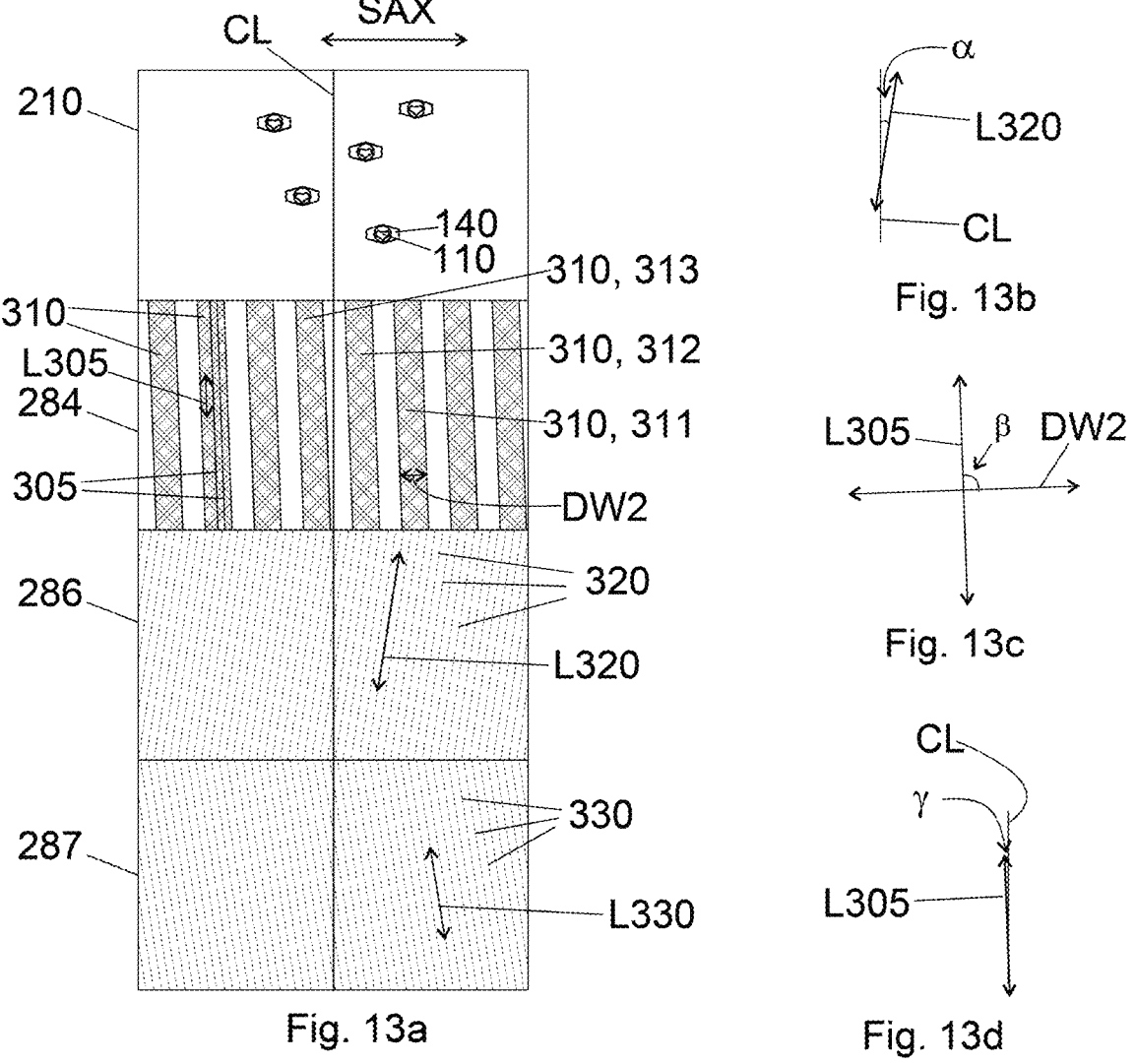

FIG. 13a shows a part of the tread 21, a part of the textile layer 284 comprising the strand 310 and the rounds 311, 312, 313 of the strand 310, a part of the second metal layer 286, and a part of the first metal layer 287 side-by-side.

Concerning the material of the textile layer 284, particularly the strand 310 thereof, in an embodiment, the strand 310 comprises fibrous material. In general, fibrous materials provide strength even if only a small amount of the material is used. Thus, fibrous material provides for strength and reduced weight for the tyre. In a preferable embodiment, the strand 310 comprises fibres 305 such that a longitudinal direction L305 of the fibres 305 of the strand 310 forms a right angle β with a direction DW2 defined by the width of the strand 310, i.e. the second width W2. In other words, the fibres 305 are longitudinal fibres of the strand 310.

As an example, FIG. 13a shows two fibres 305 of the strand 310. Moreover, the longitudinal direction L305 of the fibres 305 is also shown in FIG. 13a. The direction DW2 defined by the second width W2 is also shown in FIG. 13a. As shown therein, the direction DW2 defined by the second width W2 is the direction in which the second width W2 (i.e. the width of the strand 310) is measured. As usual, the strand 310 has a thickness, a width, and a length, wherein the thickness is less than the width, and the width is less than the length. Naturally, also the other rounds 311, 312, 313 of the strand 310 comprise the fibres 305, even is not explicitly shown in FIG. 13a. The fibres 305 of the strand 310 extend within the strand 310 throughout the length of the strand 310. The right angle β is shown also in FIG. 13c, which further shows the direction DW2 defined by the second width W2 and the longitudinal direction L305 of the fibres 305 of the strand 310.

An angle between the longitudinal direction L305 of the fibres 305 of the strand 310 and the circumferential central line CL is, in FIG. 13a, exaggerated. Typically, an angle γ between the longitudinal direction L305 of the fibres 305 of the strand 310 and the circumferential central line is e.g. less than one degree, such as about 0.3±0.2 degrees. The angle γ is shown in FIG. 13d, however, also there the angle γ is larger than in a normal tyre. The magnitude of the angle γ depends at least on the radius of the tyre, the width of the strand, and the spacing between the rounds of the strand.

Concerning the material of the textile layer 284, particularly the strand 310 thereof, in an embodiment, the strand 310 comprises polyamide, aramid, rayon, or polyester. Most preferably, the strand 310 comprises polyamide. One type of polyamide is commonly known by the name Nylon®. Polyamide has a good balance between strength, weight, and price.

In a particularly preferable embodiment, the strand 310 comprises fibres 305 made of polyamide, aramid, rayon, or polyester, most preferably made of polyamide. What has been said by the angle β applies. Most preferably, the strand 310 comprises fibres 305 made of polyamide and having a diameter of 0.4 to 0.7 mm. Most preferable materials for the fibres 305 are polyamide 6 and polyamide 6.6. Thus, preferable, the strand 310 comprises fibres 305 made of polyamide 6 or polyamide 6.6.

Concerning a material of the metal belt 286, 287 (or both the metal belts), in an embodiment, the metal belt 286, 287 comprises metal cords 320, 330, such as steel cords, extending in a longitudinal direction L320, L330 of the metal cords. Moreover, an angle α between the longitudinal direction L320 of the cords 320 and a circumferential central line CL of the tyre is 10 to 40 degrees, preferably 20 to 30 degrees. The angle α is shown in FIG. 13b.

In case the tyre comprises two metal belts 286, 297 as shown in FIG. 13a, an angle α between the longitudinal direction L320 of the cords 320 of the second metal belt 286 and a circumferential central line CL of the tyre is 10 to 40 degrees, preferably 20 to 30 degrees; and an angle between the longitudinal direction L330 of the cords 330 of the first metal belt 287 and the circumferential central line CL of the tyre is 10 to 40 degrees, preferably 20 to 30 degrees. Moreover, an angle between the longitudinal direction L320 of the cords 320 of the second metal belt 286 and the longitudinal direction L330 of the cords 330 of the first metal belt 287 is greater than the angle α as defined above. In other words, the cords of one of the metal belts are inclined clockwise while the cords of the other metal belts are inclined counter-clockwise. Reference is made to FIG. 13a.

Experimental—Part 1

According to the principles laid down above, the inventors manufactured a tyre having the size 215/60R16. A load index LI of the tyre was 99. Reference is made to Table 2. In line with what has been said above, in the tyre, a mass of each one of the studs was 0.9 g, i.e. in the range 0.5 g to 1.5 g. Moreover, an average of the protrusions P100 of the studs from the tread 210 was 1.0 mm, i.e. between 0.7 mm and 1.6 mm. The areas of the stud pin 110 and the base flange 140 were selected such that of the first area A140 was 50 mm$^2$ and the second area A110 was 3.5±0.1 mm$^2$. Thus, a ratio A140/A110 of the first area A140 (that of the base flange 140) to the second area A110 (that of the pin) was 14.3, i.e. in the range 7.5 to 19. Moreover, the first height H100 (of the pin 110) was selected to be 1.3 mm. Thus, the ratio A140/H110 of the first area A140 to the first height H110 was 38.5 mm$^2$/mm, i.e. in the range 25 to 48 mm$^2$/mm. Furthermore, the tyre comprised an underlayer 21 as discussed above.

A road wear of the tyre was tested according to the standard SFS7503:2022:en. The result was 0.955 g. In line with what has been said above, the Formula −0.000139× LI$^2$+0.0431×LI−1.90 gives the value 0.995 for load index LI that equals 99. Thus, the tested road wear 0.955 (in grams) was 4% less than the value (in grams) calculatable by the Formula. This shows an example of a tyre according to an embodiment of the second aspect of the invention.

As for the materials of the underlayer 21 and the intermediate layer 22, several studded tyres comprising the underlayer and the intermediate layer according to this specification were manufactured. The amounts of raw materials were as disclosed in the specification.

Table 4 discloses, as an example, raw materials of the underlayer and the intermediate layer for one of the manufactured tyres.

TABLE 4

| Raw materials | Underlayer (phr) | Intermediate layer (phr) |
|---|---|---|
| SSBR (58% vinyl, 34% styrene) | 50 | — |
| ESBR (16% vinyl, 23% styrene) | — | 40 |
| NR | 30 | 40 |
| BR | 20 | 20 |
| Oil (TDAE) | 20 | 9 |
| Resin, Tg 39° C. | 30 | — |
| Carbon black, N375 | 40 | 60 |
| Zinc oxide (ZnO) | 3 | 3 |
| Stearic acid | 2 | 1 |
| 6PPD (N-(1,3-Dimethylbutyl)-N'-phenyl-p-phenylenediamine) | 1 | 1 |
| TMQ (2,2,4-Trimethyl-1,2-dihydroquinoline) | 1 | 1 |
| Sulphur | 1.40 | 1 |
| CBS (N-Cyclohexyl-2-benzothiazole sulfenamide) | 1.40 | 2.90 |
| ZBEC (Zinc bis(dibenzyldithiocarbamate)) | 0.25 | — |

The rubber mixtures were obtained by means of a stepwise mixing process. A 2 L-internal mixer (Krupp Elastomertechnik GK 1,5 laboratory mixer) was used to add the compounds.

In the first step, the polymers were added and mixed for 40 seconds. In the second step, part of the carbon black and chemicals were added and mixed for 60 seconds. In the third step, the rest of the carbon black and oil were added and mixed for 90 seconds or temperature in mixing chamber received 150 degrees.

The final step with curing chemicals was performed at 95° C. for 50 seconds.

DMTA samples were vulcanized at 150° C. by using a pressure of 150 bar. The optimum vulcanization time of t90

(at 150° C.) was determined with a moving die rheometer according to ISO 4664-1:2011. A vulcanization time of t90 plus 5 min was used for the samples.

Position of tan delta max, DMTA at 20° C. and at −20° C., and hardness (ShA) at 20° C. were determined from the obtained underlayer and intermediate compounds.

DMTA measurements results of Table 5 were done by using tension mode according to standard ISO 4664-1:2011, by using a temperature range from −60° C. to 70° C., 10 Hz, static strain 3%, and dynamic strain ±0.2%.

TABLE 5

| DMTA measurements | | |
|---|---|---|
| Properties | Underlayer | Intermediate layer |
| Position of Tan δ maximum (Temperature (° C.)) | 3 | −47 |
| E* (20° C.) (MPa) | 6 | 17 |
| E* (−20° C.) (MPa) | 411 | 34 |
| E*(−25 ° C.) (Mpa) | 566 | 41 |
| Hardness (22 ° C.) (ShA) | 48 | 68 |

As can be seen from Table 5, the underlayer as well as the intermediate layer had the desired properties for being able to reduce road wear while improving stability of tyres.

Experimental—Part 2

To test how the spacing—if any—between neighbouring rounds of the strand 310 affect the road wear of the tyre, two sets of experiment were conducted.

In the first test, the spacing between two neighbouring rounds of the strand in the central area (i.e. middle) of the of the tread was 20% of a width of the strand 310. Thus, considering that the width of the spacing in the central area is SW2, in the central area, the ratio SW2/W2 was 20%. In the first test it was tested how the spacing or overlapping between neighbouring rounds of the strand at the shoulder area affects road wear. In the first test and in a reference tyre therein, the degree of overlap between two neighbouring rounds was changed from a 40% overlap to 20% overlap in a shoulder region of a reference tyre. To compare the road wear with this reference tyre, in a test tyre, a spacing of 20% was used in the shoulder region of the test tyre. These overlap and spacing are expressed relative to the width W2 of the strand 310. To clarify, FIG. 12, shows a strand 310 as discussed above. However, the strand 310 comprises a first overlapping round 321, a second overlapping round 322, and a third overlapping round 323. As shown in FIG. 12, a part of the first overlapping round 321 overlaps in the axial direction (perpendicular to the rotational direction R) with a part of the second overlapping round 322. In this way, a first overlapping area 331 is formed, the first overlapping area 331 comprising the overlapping parts of the two rounds 321, 322. In a similar manner, a part of the second overlapping round 322 overlaps in the axial direction with a part of the third overlapping round 323. In this way, a second overlapping area 332 is formed, the second overlapping area 332 comprising the overlapping parts of the two rounds 322, 323. The degree of overlap, as discussed above and shown in table 6, indicates a width of the overlapping areas 331, 332 relative to the width W2 of the strand 310.

In table 6 the degree of overlap is depicted by the word "overlap" and the percentage range of the overlap relative to the width W2 of the strand. In tables 6 and 7 the width of the spacing is depicted by the word "spacing" and the percentage indicating the ratio of the width of the spacing relative to the width W2 of the strand.

The results were as follows:

TABLE 6

| Road wear in a first test. | | | | |
|---|---|---|---|---|
| Shoulder | | Middle | | Wear |
| | % | | % | Index 1 |
| Overlap | 40 . . . 20 | Spacing | 20 | 100.0 |
| Spacing | 20 | Spacing | 20 | 103.2 |

Herein the Wear Index 1 is indicative of the wear of the road caused by the tyre in the first test. A greater number indicates less road wear. Thus, the results of Table 6 relate to an inverse of the result of the test according to SFS7503: 2022:en.

Moreover, the results are normalized so that the result in the reference tyre is 100,0 by multiplying with a factor. In tables 6 and 7 a comma "," is used for a decimal separator. As shown in Table 6, when the feature of overlapping rounds of the strand 310 was changed to a spacing of 20% between two neighbouring rounds of the strand 310, the results were improved, i.e. the tyre wore the test specimens less in the test SFS7503:2022:en. It is noted that in that test wearing of test specimens is measured as discussed above.

The results prove that having a spacing between neighbouring rounds of the strand 310 reduces the road wear of the tyre compared to the case where the textile belt 284 would be formed by partially overlapping rounds of the strand 310.

In the second test, the spacing between two neighbouring rounds of the strand in the central area of the of the tread was 50% of a width of the strand 310, i.e. considering that the width if the spacing in the central area is SW2, therein the ratio SW2/W2 was 50%. In the second test it was tested how increasing the spacing between two neighbouring rounds of the strand at the shoulder area affects road wear. The width of the spacing between two neighbouring rounds was changed from a 20% to 50% relative to the width W2 of the strand 310.

The results were as follows:

TABLE 7

| Road wear in a second test. | | | | |
|---|---|---|---|---|
| Shoulder | | Middle | | Wear |
| | % | | % | Index 2 |
| Spacing | 20 | Spacing | 50 | 100.0 |
| Spacing | 50 | Spacing | 50 | 108.3 |

Herein the Wear Index 2 is indicative of the wear of the road caused by the tyre in the test. A greater number indicates less road wear. Thus, the index is an inverse of the result of the test according to SFS7503:2022:en. Moreover, the results are normalized to 100 by multiplying both the results with a same factor. In table 7 the term "Wear Index 2" is used to indicate that the results are normalized differently than the results of table 6, i.e. the factor for normalization is different in table 6 than in table 7. However, for both tables 6 and 7 the road wear was measured according to SFS7503:2022:en.

The results prove that increasing the spacing between neighbouring rounds of the strand 310 decreases the road wear.

However, the inventors noticed that a high spacing between the rounds, even if reduced the road wear, simultaneously affect grip, and handling of the tyre. In particularly a wide spacing may reduce grip on ice and/or worsen handling on dry road. Furthermore, a function of the strand 310 (i.e. the jointless belt JLB) is to reinforce the tyre and in this way improve durability. However, the higher the spacing between the rounds, the less material the textile belt (i.e. the jointless belt JLB) comprises. These factors imply that the spacing should not bee too high. Therefore, the inventors consider that an optimal compromise between the road wear, grip, handling, and durability would be obtainable for a spacing of 15 to 25%, a very good compromise would be obtainable for a spacing of 10 to 40%, and a good compromise would be obtainable for a spacing of 5 to 50%.

Numbered Examples Concerning a Stud Usable in Tyres

98. A stud (100) for improving grip of a tyre (200), the stud (100) comprising
    a body (120) comprising a base flange (140) and a second part (130), the second part (130) being joined to the base flange (140) and extending in a longitudinal direction (Sz) of the stud (100) from the base flange (140), and
    a pin (110) protruding from the second part (130) in the longitudinal direction (Sz) of the stud, wherein
    the pin (110) comprises hard metal or ceramic,
    the base flange (140) has a first cross-section on a plane that has a normal in the longitudinal direction of the stud, the first cross-section having a first area (A140),
    the pin (110) has a second cross-section on a plane that has a normal in the longitudinal direction (Sz) of the stud (100), the second cross-section having a second area (A110), and
    the first area (A140) is greater than the second area (A110).

99. The stud of the example 98, wherein
    a ratio (A140/A110) of the first area (A140) to the second area (A110) is 6.5 to 21.

100. The stud of the example 98 or 99, wherein
    the pin (110) protrudes a first height (H110) from the second part (130) in the longitudinal direction (Sz) and
    a ratio (A140/H110) of the first area (A140) to the first height (H110) is 20 to 50 mm²/mm.

For example,
    the second part (130) extends in the longitudinal direction (Sz) of the stud (100) from the base flange (140) to an interfacial point (112) between the second part (130) and the pin (110) and does not extend further in this direction and
    the pin (110) and the second part (130) define the first height (H110) such that, the first height (H110) equals the length that the pin (110) protrudes from the interfacial point (112) in the longitudinal direction (Sz) to the extremal point (114) of the pin (110) in the longitudinal direction (Sz) of the stud.

Numbered Examples Concerning Preferable Embodiment of a Stud

101. A stud (100) for improving grip of a tyre (200), the stud (100) comprising a body (120) comprising a base flange (140) and a second part (130), the second part (130) being joined to the base flange (140) and extending in a longitudinal direction (Sz) of the stud (100) from the base flange (140), and
    a pin (110) protruding from the second part (130) in the longitudinal direction (Sz) of the stud (100), wherein
    the pin (110) comprises hard metal or ceramic,
    the base flange (140) has a first cross-section on a plane that has a normal in the longitudinal direction (Sz) of the stud, the first cross-section having a first area (A140),
    the pin (110) has a second cross-section on a plane that has a normal in the longitudinal direction (Sz) of the stud, the second cross-section having a second area (A110),
    a ratio (A140/A110) of the first area (A140) to the second area (A110) is 6.5 to 21,
    the pin (110) protrudes a first height (H110) from the second part (130) in the longitudinal direction (Sz), wherein
    a ratio (A140/H110) of the first area (A140) to the first height (H110) is 20 to 50 mm²/mm.

102. The stud (100) of any of the examples 98 to 101, wherein
    the second part (130) has a third cross-section on a plane that has a normal in the longitudinal direction of the stud, the third cross-section having a third area (A130, A132, A134),
    the first area (A140) is greater than the third area (A130, A132, A134).

103. The stud (100) of any of the examples 98 to 102, wherein
    the second part (130) comprises a second flange (134) and a waist (132), the waist (132) connecting the base flange (140) to the second flange (134) and
    the pin (110) protrudes from the second flange (134) in the longitudinal direction (Sz) of the stud (100).

104. The stud (100) of the example 103, wherein
    the waist (132) has a/the third cross-section on a plane that has a normal in the longitudinal direction of the stud, the third cross-section having a/the third area (A132),
    the second flange (134) has a fourth cross-section on a plane that has a normal in the longitudinal direction of the stud, the fourth cross-section having a fourth area (A134), and
    the fourth area (A134) is greater than the third area (A132).

105. The stud (100) of any of the examples 98 to 104, wherein
    a mass of the stud (100) is 0.4 g to 3 g, preferably 0.5 g to 1.5 g, most preferably 0.65 g to 1.1 g.

106. The stud (100) of any of the examples 98 to 105, wherein
    a mass of the pin (110) is 0.1 g to 0.8 g, preferably 0.15 g to 0.35 g.

107. The stud (100) of any of the examples 100 to 106, wherein
    a ratio (A140/H110) of the first area (A140) to the first height (H110) is 25 to 48 mm²/mm, preferably 28 to 45 mm²/mm.

108. The stud (100) of any of the examples 98 to 107, wherein
    a ratio (A140/A110) of the first area (A140) to the second area (A110) is 7.5 to 19, preferably 9 to 17.

109. The stud (100) of any of the examples 98 to 108, wherein
   a height (H100) of the stud, as measured in the longitudinal direction (Sz) of the stud (100) is greater than 9.5 mm, preferably 10.0 to 11.2 mm.
110. The stud (100) of any of the examples 98 to 110, wherein
   a greatest one-dimensional measure (dx140) of the first cross-section is 6.0 mm to 10.5 mm, preferably 7.0 mm to 10.0 mm, most preferably 7.5 mm to 8.5 mm.
111. The stud (100) of any of the examples 98 to 110, wherein
   the first area (A140) is 20 mm$^2$ to 80 mm$^2$, preferably 30 mm$^2$ to 70 mm$^2$.
112. The stud (100) of any of the examples 98 to 111, wherein
   a length of a shortest straight line (dn140) that connects an edge of the first cross-section, an opposite other edge of the first cross-section, and a central point (O) of the first cross-section is 4.5 mm to 9.5 mm, preferably 4.5 mm to 8.5 mm, and most preferably 5.0 to 7.5 mm.
113. The stud (100) of any of the examples 98 to 112, wherein
   the second cross-section has at least one and at most three axes of symmetry (S).
114. The stud (100) of any of the examples 198 to 113, wherein
   a part of the pin (110) penetrates into the second part (130, 134) such that a length (L110) of the pin (110) is at least 150% of the first height (H110), preferably a ratio of the length (L110) of the pin (110) to the first height (H110) is at least 2, more preferably at least 3.
115. The stud of any of the examples 98 to 114, wherein
   the second part (130) extends in the longitudinal direction (Sz) of the stud (100) from the base flange (140) to an interfacial point (112) between the second part (130) and the pin (110) and does not extend further in this direction,
   the pin (110) and the second part (130) define the first height (H110), such that the first height (H110) is equal to the length the pin (110) protrudes from the interfacial point (112) in the longitudinal direction (Sz) to the extremal point (114) of the pin (110) in the longitudinal direction (Sz) of the stud.

Numbered Examples Concerning a Studded Tyre

199. A tyre (200) comprising
   a tread (210) and
   multiple studs (100) according to any of the examples 98 to 115 arranged in the tread (210) such that
   at least the pins (110) of the studs (100) are exposed on the tread (210); preferably,
   the tread (210) of the tyre (200) is formed by tread blocks (220) such that grooves (230) are arranged between the tread blocks (220).
200. A tyre (200) comprising
   a tread (210) and
   multiple studs (100) according to any of the examples 101 to 115 arranged in the tread (210) such that
   at least the pins (110) of the studs (100) are exposed on the tread (210); preferably, the tread (210) of the tyre (200) is formed by tread blocks (220) such that grooves (230) are arranged between the tread blocks (220).

Numbered Examples Concerning a Studded Tyre
Having a Low Road Wear

201. A tyre (200) comprising
   a tread (210) and
   multiple studs (100) in the tread (210) such that
   at least pins (110) of the studs (100) are exposed on the tread (210), the tyre (200) being configured such that
   a load index (LI) of the tyre (200) as defined in The European Tyre and Rim Technical Organization Standards Manual (2023) table G.7 is from eighty six to hundred sixteen (from 86 to 116) and
   a road wear of the tyre (200) as measured according to the standard SFS7503:2022:en is less than the value calculatable by the formula −0.000139×LI$^2$+0.0431× LI−1.90.
202. The tyre (200) of the example 201, wherein
   the road wear of the tyre (200) as measured according to the standard SFS7503:2022:en is less than 1.00 g and the load index (LI) of the tyre (200) is 99 or more than 99; or
   the road wear of the tyre (200) as measured according to the standard SFS7503:2022:en is less than 0.91 g and the load index (LI) of the tyre (200) is 93 or more than 93; or
   the road wear of the tyre (200) as measured according to the standard SFS7503:2022:en is less than 1.09 g and the load index (LI) of the tyre (200) is 105 or more than 105.
203. The tyre (200) of the example 201, wherein
   the load index (LI) of the tyre (200) is 99 and the road wear of the tyre (200) as measured according to the standard SFS7503:2022:en is less than 1.00 g; or
   the load index (LI) of the tyre (200) is 93 and the road wear of the tyre (200) as measured according to the standard SFS7503:2022:en is less than 0.91 g; or
   the load index (LI) of the tyre (200) is 105 and the road wear of the tyre (200) as measured according to the standard SFS7503:2022:en is less than 1.09 g.
204. The tyre (200) of any of the examples 201 to 203, wherein
   the multiple studs (100) include studs according to any of the examples 98 to 115;
preferably,
   the multiple studs (100) include studs according to any of the examples 101 to 115;
205. The tyre (200) of any of the examples 199 to 204, wherein
   the multiple studs (100, 100a, 100b) include studs (100a) of a first stud type and
   the tyre (200) does not comprise studs of a second stud type; preferably,
   the first stud type is a stud according to any one of the examples 98 to 115; more preferably,
   each one of the studs (100a) of the first stud type is a stud according to any one of the examples 101 to 115.
206. The tyre (200) of any of the examples 199 to 204, wherein
   the multiple studs (100, 100a, 100b) include studs (100a) of a first stud type and studs (100b) of a second stud type.

207. The tyre (200) of the example 206, wherein
    a central region (CR) of the tread (210) is arranged between a first shoulder region (SR1) of the tread (210) and a second shoulder region (SR2) of the tread (210),
    the central region (CR) comprises a circumferential central line (CL) of the tread (210),
    the central region (CR) comprises studs (100b) of the second stud type,
    the first shoulder region (SR1) and/or the second shoulder region (SR2) comprise/comprises studs (100a) of the first stud type; preferably,
    at least two thirds (⅔) of the studs (100, 100a, 100b) that are arranged in the central region (CR) are of the second stud type,
    at least two thirds (⅔) of the studs arranged in the first shoulder region (SR1) are of the first stud type, and
    at least two thirds (⅔) of the studs arranged in the second shoulder region (SR2) are of the first stud type.
208. The tyre (200) of the example 206 or 207, wherein
    the studs (100a) of the first stud type comprise identical first pins, a cross-section of a first pin having a first shape, and
    the studs (100b) of the second stud type comprise identical second pins, a cross-section of a second pin having a second shape that is different from the first shape.
209. The tyre (200) of any of the examples 206 to 208, wherein
    each one of the studs (100a) of the first stud type is a stud according to any one of the examples 98 to 115 and/or
    each one of the studs (100b) of the second stud type is a stud according to any one of the examples 98 to 115.
210. The tyre (200) of the example 209, wherein
    each one of the studs (100a) of the first stud type is a stud according to any one of the examples 101 to 115 and
    each one of the studs (100b) of the second stud type is a stud according to any one of the examples 101 to 115.
211. The tyre (200) of any of the examples 199 to 210, wherein
    the tread (210) comprises tread blocks (220) such that grooves (230) are arranged between the tread blocks (220).
212. The tyre (200) of the example 211, wherein
    a depth (D230) of at least one of the grooves (230) is more than 6.0 mm, preferably 7 mm to 15 mm.
213. The tyre (200) of the example 211 or 212, wherein
    a width (W230) of at least one of the grooves (230), as measured on the level of the tread (210) limiting the groove (230), is more than 4.0 mm.
214. The tyre (200) of any of the examples 211 to 213, wherein
    a width (W230) of at least one of the grooves (230) decreases in an inward radial direction (−SR) of the tyre.
215. The tyre (200) of any of the examples 211 to 214, wherein
    at least some of the grooves (230) are inclined such that they define a V-shape or a half of a V-shape, the V-shape or the half thereof defining a direction of rotation (R) of the tyre (200) when used driving forwards, the direction of rotation (R) being reverse to the direction to which the V-shape or the half thereof opens.
216. The tyre (200) of any of the examples 199 to 215, wherein
    a central line (CL) of the tread (210) defines a first half (H1) of the tread (210) and a second half (H2) of the tread (210), wherein
    the first half comprises a first number (N1) of studs (100, 100a, 100b) and
    the second half comprises a second number (N2) of studs (100, 100a, 100b) such that
    a ratio (N1/N2) of the first number to the second number is 90% to 110%.
217. The tyre (200) of any of the examples 199 to 216, wherein
    the tread (210) has a first width (W210) and a first circumference (C210),
    the tread (210) is provided with a total number (N100) of studs (100), and
    a ratio (N100/(W210×C210)) of the total number (N100) of the studs to the product of the first width (W210) and the first circumference (C210) is more than 5.6 pieces per square-decimetre.
218. The tyre (200) of any of the examples 199 to 217, wherein
    each one of the multiple studs (100) is arranged on a circumferential row (r11, r12, r13, r14, r15, r16, r17, r18, r19, r21, r22, r23, r24, r25, r26, r27, r28, r29) such that the studs are arranged on at least six different circumferential rows (r11, r12, r13, r14, r15, r16, r17, r18, r19, r21, r22, r23, r24, r25, r26, r27, r28, r29), wherein
    different circumferential rows (r11, r12, r13, r14, r15, r16, r17, r18, r19, r21, r22, r23, r24, r25, r26, r27, r28, r29) are arranged a distance apart from each other.
    In this example, several studs may be arranged on only one circumferential row (r11, r12, r13, r14, r15, r16, r17, r18, r19, r21, r22, r23, r24, r25, r26, r27, r28, r29).
219. The tyre (200) of the example 218, wherein
    a central line (CL) of the tread (210) defines a first half (H1) of the tread (210) and
    at least three different circumferential rows (r11, r12, r13, r14, r15, r16, r17, r18, r19) of the at least six different circumferential rows (r11, r12, r13, r14, r15, r16, r17, r18, r19, r21, r22, r23, r24, r25, r26, r27, r28, r29) are arranged on the first half (H1) and
    at least three different circumferential rows (r21, r22, r23, r24, r25, r26, r27, r28, r29) of the at least six different circumferential rows (r11, r12, r13, r14, r15, r16, r17, r18, r19, r21, r22, r23, r24, r25, r26, r27, r28, r29) are arranged on the second half (H2).
220. The tyre (200) of any of the examples 199 to 219, wherein
    the tyre (200) has been manufactured by
    vulcanizing a green tyre to form the tyre (200) and
    forming stud holes to the tread (210) of the tyre (200) during the vulcanizing the green tyre and
    installing the studs (100) to the stud holes (250) of the tread (210).
221. The tyre (200) of any of the examples 199 to 220, wherein
    at least some of the tread blocks (220) are provided with sipes (240).

222. The tyre (200) of the example 221, wherein
  a width (W240) of all the sipes (240) is less than 2.0 mm.
223. The tyre (200) of example 221 or 222, wherein
  a depth of all the sipes (240) is at least 2.0 mm.
224. The tyre (200) of any of the examples 221 to 223, wherein
  the tread (210) comprises tread blocks (220) such that grooves (230) are arranged between the tread blocks (220), and
  a depth (D240) of all the sipes (240) is at most equal to a depth (D230) of one of the grooves (230).
225. The tyre (200) of any of the examples 221 to 224, wherein
  the tyre (200) has been manufactured by
  vulcanizing a green tyre to form the tyre (200) and
  forming the sipes (240) to the tread (210) of the tyre (200) during the vulcanizing the green tyre by using lamella blades.
226. The tyre (200) of any of the examples 221 to 225, wherein
  one of the studs (100, 100a, 100b) is arranged in a stud hole (250) and
  no part of any of the sipes (240) is arranged closer than 6 mm to a centre of the stud hole (250);
preferably,
  no part of any of the sipes (240) is arranged closer than 8 mm or closer than 10 mm to a centre of the stud hole (250).
227. The tyre (200) of any of the examples 221 to 226, wherein
  at least parts of multiple studs (100, 100a, 100b) are arranged in multiple stud holes (250) provided in multiple tread blocks (220), and
  no part of any of the sipes (240) is arranged closer than 6 mm, 8 mm, or 10 mm to a centre of any one of the stud holes (250).
228. The tyre of the example 226 or 227, wherein
  a part of at least one of the sipes (240) is arranged closer than 12 mm to a centre of the stud hole (250);
preferably,
  a part of at least one of the sipes (240) is arranged closer than 10 mm to a centre of the stud hole (250).
229. The tyre (200) of any of the examples 199 to 228, wherein
  the tread comprises or is formed of rubber material having a Shore hardness in the range 48 to 59 Sh(A) as measured with durometer type A, at the temperature 23° C.
230. The tyre (200) of any of the examples 207 to 229, wherein
  the circumferential central line (CL) of the tread 210 divides also the central region (CR) to two equally wide parts.
231. The tyre (200) of any of the examples 207 to 230, wherein
  the first shoulder region (SR1), the second shoulder region (SR2) and the central region (CR) constitute the tread (210).
232. The tyre of any of the examples 199 to 231, wherein
  an average of protrusions (P100) of studs (100) from the tread (210) is between 0.6 mm and 2.0 mm, preferably between 0.7 mm and 1.6 mm, and most preferably between 0.8 mm and 1.4 mm.

233. The tyre of any of the examples 199 to 232, wherein
  protrusions (P100) of all the studs from the tread (210) is between 0.6 mm and 2.0 mm, preferably between 0.7 mm and 1.6 mm, and most preferably between 0.8 mm and 1.4 mm.
234. The tyre of any of the examples 199 to 233, comprising
  at least one ply (288),
  at least one metal belt (286, 287),
  a cap layer (23) forming at least part of a running surface of the tyre, and
  an underlayer (21) made of a first rubber compound.
235. The tyre of the example 234 comprising
  at least one textile belt (284).
236. The tyre of the example 234 or 235, wherein
  a position of a tan delta maximum of the underlayer (21) and/or the first rubber compound is configured to be between −10° C. and +15° C., determined according to ISO 4664-1:2011 in compression.
237. The tyre of any of the examples 234 to 236, wherein
  an average thickness of the underlayer (21) is at least 0.5 mm and not greater than 8 mm.
238. The tyre of the example 237, wherein
  the average thickness of the underlayer (21) is 1 mm to 7 mm, preferably 1 mm to 6.5 mm, more preferably 1.5 mm to 6.0 mm.
239. The tyre of any of the examples 234 to 238, wherein
  each stud (100) of the tyre (200) comprises a base flange (140), a waist (132), and a second flange (134),
  at least part of the base flange (140) is surrounded by the underlayer (21), and
  at least part of the second flange (134) is surrounded by the cap layer (23).
240. The tyre of any of the examples 234 to 239, wherein
  a dynamic stiffness (E*, Mpa) of the underlayer (21) is configured to be less than 25 MPa, preferably from 5 to 20 MPa, determined at 20° C., and
  the dynamic stiffness (E*, MPa) of the underlayer (21), determined at 0° C., is configured to be at least 2 times the dynamic stiffness of the underlayer determined at 20° C.,
the dynamic stiffnesses determined according to ISO 4664-1:2011 in compression.
241. The tyre of any of the examples 234 to 240, wherein
  a/the dynamic stiffness (E*, MPa) of the underlayer (21) is configured to be less than 25 MPa, preferably from 5 to 20 MPa, determined at 20° C., and
  the dynamic stiffness (E*, MPa) of the underlayer (21) determined at −25° C., is configured to be at least 20 times the dynamic stiffness of the underlayer determined at +20° C.,
the dynamic stiffnesses determined according to the standard ISO 4664-1:2011 in compression.
242. The tyre of any of the examples 234 to 241, wherein
  the underlayer (21) comprises
  natural rubber (NR) from 0 to 70 phr,
  and/or butadiene rubber (BR) from 0 to 30 phr,
  and/or synthetic isoprene rubber (IR) from 0 to 70 phr,
  so that a total amount of (natural rubber, butadiene rubber and synthetic isoprene rubber) is from 0 to 70 phr, preferably from 30 to 60 phr,
  solution polymerized styrene-butadiene rubber (SSBR) from 30 to 100 phr, preferably from 40 to 70 phr,
  one or more reinforcing fillers from 35 to 80 phr, and
  one or more resins from 5 to 40 phr.

243. The tyre of any of the examples 234 to 242, wherein the underlayer (21) comprises a/the solution-polymerized styrene butadiene rubber (SSBR), wherein the solution-polymerized styrene butadiene rubber has, when preparing the underlayer, a vinyl content in a range between 33% and 65%, preferably in a range between 38% and 61%, wherein the vinyl contents are determined in mol % relative to the butadiene, and a styrene content between 25% and 45%, preferably between 27% and 40%, wherein the styrene contents are determined in mass % relative to the whole polymer determined according to ISO 21561-1:2015.

244. The tyre of any of the examples 234 to 243, wherein the underlayer contains a total amount of 10 to 50 phr, preferable 10 to 40 phr of natural rubber and/or synthetic isoprene rubber, and optionally, 10 to 30 phr, preferable 10-20 phr of polybutadiene rubber.

245. The tyre of any of the examples 234 to 244, wherein the underlayer comprises one or more reinforcing fillers selected from carbon blacks, and silicas, wherein a total amount of said reinforcing fillers is from 35 to 80 phr, more preferably from 40 to 70 phr.

246. The tyre of any of the examples 234 to 245, wherein the first rubber compound has a first hardness (ShA) between 45 ShA and 65 ShA, determined at an ambient temperature of 23° C. according to standard ASTM D2240.

The unit ShA denotes the Shore hardness using the "A" scale.

247. The tyre of any the examples 234 to 246 comprising an intermediate layer (22) made of a second rubber compound, the intermediate layer (22) being arranged, at least partially, between the underlayer (21) and the cap layer (23).

248. The tyre of the example 247, wherein a position of a tan delta maximum of the intermediate layer (22) and/or the second rubber compound is configured to be between −40° C. and −70° C., such as between −40° C. and −60° C., determined according to ISO 4664-1:2011 in compression.

249. The tyre of the example 247 or 248, wherein an average thickness of the intermediate layer (22) is at least 0.4 mm and not greater than 7 mm.

250. The tyre of any of the examples 247 to 249, wherein each stud (100) of the tyre (200) comprises a base flange (140), a waist (132), and a second flange (134), at least part of the waist (132) is surrounded by the intermediate layer (22).

251. The tyre of any of the examples 247 to 250, wherein a thickness of the intermediate layer (22), determined at a location wherein the intermediate layer is surrounding a stud, is at least 0.4 mm, preferably at least 0.5 mm.

252. The tyre of any of the examples 247 to 251, wherein a dynamic stiffness of the intermediate layer (22) is configured to be from 25 to 100 MPa, determined at 20° C., and the dynamic stiffness of the intermediate layer (22), determined at 0° C., is configured to be from 1 to 1.5 times the dynamic stiffness of the intermediate layer determined at 20° C., the dynamic stiffnesses determined according to the standard ISO 4664-1:2011 in compression.

253. The tyre of any of the examples 247 to 252, wherein the second rubber compound has a second hardness (ShA) between 66 ShA and 80 ShA, determined at an ambient temperature of 23° C. according to standard ASTM D2240.

The unit ShA denotes the Shore hardness using the "A" scale.

254. The tyre of any of the examples 247 to 253, wherein the first rubber compound has a/the first hardness (ShA) and the second rubber compound has a/the second hardness (ShA), and a hardness (ShA) difference between the first rubber compound and the second rubber compound is at least 10% determined at −25° C. so that the second rubber compound is at least 10% softer than the first rubber compound, determined according to standard ASTM D2240 with an exception that the temperature is −25° C. and the rubber compounds are tempered according to Table 3 of the specification.

255. An arrangement of tyres, the arrangement comprising a first tyre (200) comprising a first tread (210) and multiple studs (100) in the first tread (210) such that at least pins (110) of the studs (100) are exposed on the first tread (210), the first tyre (200) being configured such that a first load index ($LI_1$) of the first tyre (200) as defined in The European Tyre and Rim Technical Organization Standards Manual (2023) table G.7 is from eighty six to hundred sixteen (from 86 to 116) and a first road wear of the first tyre (200) as measured according to the standard SFS7503:2022:en is less than the value calculatable by the formula $-0.000139 \times LI_1{}^2 + 0.0431 \times LI_1 - 1.90$; the arrangement further comprising a second tyre comprising a second tread and multiple studs (100) in the second tread such that at least pins (110) of the studs (100) are exposed on the second tread, the second tyre being configured such that a second load index ($LI_2$) of the second tyre as defined in The European Tyre and Rim Technical Organization Standards Manual (2023) table G.7 is from eighty six to hundred sixteen (from 86 to 116) and a second road wear of the second tyre as measured according to the standard SFS7503:2022:en is less than the value calculatable by the formula $-0.000139 \times LI_2{}^2 + 0.0431 \times LI_2 - 1.90$.

256. The arrangement of example 255, wherein the second load index ($LI_2$) is not equal to the first load index ($LI_1$).

257. The arrangement of the example 255 or 256, wherein the first tyre is a tyre according to any one of the examples 201 to 252 and the second tyre is a tyre according to any one of the examples 201 to 252.

Numbered Examples Concerning a Studded Tyre
Having a Special Type of A Jointless Belt 301. A tyre (200) comprising a tread (210), multiple studs (100) in the tread (210), a metal belt (286) extending circumferentially around a rotational axis of the tyre, and a textile belt (284) comprising a strand (310) running around the metal belt (286) multiple rounds (311, 312, 313, 314) such that the textile belt (284) is arranged between the tread (210) and the metal belt (286), wherein at least pins (110) of the studs (100) are exposed on the tread (210), a first round (311) of the strand (310) is spaced apart from a second round (312) of the strand (310) such that a first spacing (SW1) is arranged between the first round (311) of the strand (310) and the second round (312) of the strand (310) in an axial direction of the tyre (210), the first spacing (SW1) having a width of 5% to 50% of a width (W2) of the strand (310).

302. The tyre (200) of Example 301, wherein an axial edge (E310) of the strand (310) is arranged closer to the first round (311) than to the second round (312) or the first round (311) forms the axial edge (E310) of the strand (310); and the first round (311) is arranged a distance (D2) apart from the axial edge (E310) of the strand (310), the distance (D2) being at most five times the width of the strand (W2; D2≤5×W2) or the first round (311) forms the axial edge (E310) of the strand (310); preferably the distance (D2) is at most three times the width of the strand (W2; D2≤3×W2) or the first round (311) forms the axial edge (E310) of the strand (310).

303. The tyre (200) of the Example 301 or 302, wherein a third round (313) of the strand (310) is spaced apart from a fourth round (314) of the strand (310) such that the third and fourth rounds (313, 314) of the strand (310) are arranged closer to the circumferential central line (CL) of the tread (210) than the second round (312), and a second spacing (SW2) is arranged between the third round (313) of the strand (310) and the fourth round (314) of the strand (310) the second spacing (SW2) being 5% to 50% of a width (W2) of the strand (310).

304. The tyre (200) of any of the Examples 301 to 303, wherein the width (W2) of the strand (310) is 6 mm to 18 mm, such as 8 mm to 12 mm.

305. The tyre (200) of any of the Examples 301 to 304, wherein the first spacing (SW1) between the first round (311) of the strand (310) and the second round (312) of the strand (310) is 10% to 40%, preferably 15% to 25%, of the width (W2) of the strand (310);

preferably a/the second spacing (SW2) between a/the third round (313) of the strand (310) and a/the fourth round (314) of the strand (310) is 10% to 40%, preferably 15% to 25%, of the width (W2) of the strand (310).

306. The tyre (200) of any of the Examples 301 to 305, wherein the strand (310) comprises fibrous material; preferably, the strand (310) comprises fibres (305) such that a longitudinal direction (L305) of the fibres (305) of the strand (310) forms a right angle (β) with a direction (DW2) of the second width (W2).

307. The tyre of the Example 306, wherein the strand (310) comprises polyamide, aramid, rayon, or polyester, most preferably polyamide;

preferably, the strand (310) comprises fibres (305) made of polyamide, aramid, rayon, or polyester, most preferably made of polyamide, wherein the longitudinal direction (L305) of the fibres (305) of the strand (310) forms a right angle (B) with a direction (DW2) of the second width (W2), more preferably, the strand (310) comprises fibres (305) made of polyamide and having a diameter of 0.4 to 0.7 mm.

308. The tyre of any of the Examples 301 to 307, wherein the multiple studs (100) include a first group of studs (100), each stud of the first group of studs comprising a base flange (140), wherein each stud of the first group of studs is arranged such that the base flange of each stud of the first group of studs comprise such a part of the base flange that no part of the strand (310) is arranged between the part of the base flange (140) and the metal belt (286).

309. The tyre of any of the Examples 301 to 308, wherein the multiple studs (100) include a second group of studs (100), each stud of the second group of studs comprising a base flange (140), wherein each stud of the second group of studs is arranged such that a part of the strand (310) is arranged radially inward from at least a part of the base flange (140) of the stud of the second group;

optionally at least a part of the studs of the second group belong to a/the first group of studs, wherein each stud of the first group of studs is arranged such that no part of the strand (310) is arranged between a part of the base flange (140) of the stud of the first group and the metal belt (286).

310. The tyre of any of the Examples 301 to 309, wherein the metal belt (286) comprises metal cords (320), such as steel cords, extending in a longitudinal direction (L320) of the metal cords such that an angle (α) between the longitudinal direction (L320) of the cords (320) and a circumferential central line (CL) of the tyre is 10 to 40 degrees, preferably 20 to 30 degrees.

311. The tyre of any of the Examples 301 to 310 being configured such that a load index (LI) of the tyre (200) as defined in The European Tyre and Rim Technical Organization Standards Manual (2023) table G.7 is from eighty six to hundred sixteen (from 86 to 116) and a road wear of the tyre (200) as measured according to the standard SFS7503:2022:en is less than the value calculatable by the formula $-0.000139 \times LI^2 + 0.0431 \times LI - 1.90$.

312. The tyre of any of the Examples 301 to 311, wherein the multiple studs (100) include a group of studs (100) each stud of the group comprising a base flange (140), a second part (130), the second part (130) being joined to the base flange (140) and extending in a longitudinal direction (Sz) of the stud (100) from the base flange (140), and a pin (110) protruding from the second part (130) in the longitudinal direction (Sz) of the stud, the pin (110) comprising hard metal or ceramic, wherein the base flange (140) has a first cross-section on a plane that has a normal in the longitudinal direction of the stud, the first cross-section having a first area (A140), the pin (110) of each one of the studs (100) has a second cross-section on a plane that has a normal in the longitudinal direction (Sz) of the stud (100), the second cross-section having a second area (A110), and the first area (A140) is 20 mm² to 80 mm², preferably 30 mm² to 70 mm².

313. The tyre of any of the Examples 301 to 312, wherein a mass of each one of the studs (100) is 0.4 g to 3 g, preferably 0.5 g to 1.5 g, most preferably 0.65 g to 1.1 g, and an average of protrusions (P100) of studs (100) from the tread (210) is between 0.6 mm and 2.0 mm, preferably between 0.7 mm and 1.6 mm, and most preferably between 0.8 mm and 1.4 mm.

314. The tyre (200) of any of the Examples 301 to 313, comprising at least one ply (288), a cap layer (23) forming at least part of a running surface of the tyre (200), and an underlayer (21) made of a first rubber compound, wherein a position of a tan delta maximum of the underlayer (21) and/or the first rubber compound is configured to be between −10° C. and +15° C., Determined according to ISO 4664-1:2011 in compression.

315. The tyre (200) of Example 314, wherein the dynamic stiffness (E*, MPa) of the underlayer (21) is configured to be less than 25 MPa, preferably from 5 to 20 MPa, determined at 20° C., and the dynamic stiffness (E*, MPa) of the underlayer (21), determined at 0° C., is configured to be at least 2 times the dynamic stiffness of the underlayer determined at 20° C., determined according to ISO 4664-1:2011 in compression;

preferably in addition, the dynamic stiffness (E*, MPa) of the underlayer (21) determined at −25° C., is configured to be at least 20 times the dynamic stiffness of the underlayer determined at +20° C., determined according to the standard ISO 4664-1:2011.

The invention claimed is:

1. A tyre comprising:

a tread;

a metal belt extending circumferentially around a rotational axis of the tyre, a textile belt comprising a strand running around the metal belt a plurality of rounds such that the textile belt is arranged between the tread and the metal belt, an underlayer comprising a first rubber compound, the underlayer being arranged radially outside the textile belt, a cap layer forming at least part of a running surface of the tyre, and an intermediate layer made of a second rubber compound, the intermediate layer being arranged, at least partially, between the underlayer and the cap layer, wherein a first round of the plurality of rounds of the strand is spaced apart from a second round of the plurality of rounds of the strand such that:

a first spacing is arranged between the first round of the strand and the second round of the strand in an axial direction of the tyre, the first spacing having a width of 5% to 50% of a width of the strand;

the strand comprises fibres, the fibres having a diameter of 0.4 mm to 0.7 mm, having a longitudinal direction forming a right angle with a direction of the width of the strand, and being made of polyamide; and a plurality of studs in the tread;

wherein:

the plurality of studs are arranged at least partly on the underlayer, the underlayer has a hardness between 45 ShA and 60 ShA, the intermediate layer being arranged, at least partially, on locations of the studs, a dynamic stiffness of the underlayer is at least 100% higher than a dynamic stiffness of the intermediate layer at a temperature of 0° C., and the dynamic stiffness of the intermediate layer is higher than the dynamic stiffness of the underlayer at a temperature of at least 5° C., the dynamic stiffnesses of the underlayer and the dynamic stiffness of the intermediate layer being determined according to the standard ISO 4664-1:2011 in a compression test, the plurality of studs include a first group of studs, each stud of the first group of studs comprising a base flange, wherein each stud of the first group of studs is arranged such that the base flange of each stud of the first group of studs comprises a portion of the base flange such that no part of the strand is arranged between the part of the base flange and the metal belt, at least pins of the studs are exposed on the tread, the tyre being configured such that:

a load index of the tyre as defined in The European Tyre and Rim Technical Organization Standards Manual (2023) table G.7 is from eighty six to one hundred sixteen, and a road wear of the tyre as measured according to the standard SFS7503:2022:en is less than the value calculatable by the formula $-0.000139 \times LI^2 + 0.0431 \times LI - 1.90$.

2. The tyre of the claim 1, wherein:

the road wear of the tyre as measured according to the standard SFS7503:2022:en is less than 1.00 g and the load index of the tyre is 99 or more; or the road wear of the tyre as measured according to the standard SFS7503:2022: en is less than 0.91 g and the load index of the tyre is 93 or more; or the road wear of the tyre as measured according to the standard SFS7503:2022: en is less than 1.09 g and the load index of the tyre is 105 or more.

3. The tyre of claim 1, wherein:

a mass of each one of the studs is 0.4 g to 3 g.

4. The tyre of claim 1, wherein:

an average of protrusions of studs from the tread is between 0.6 mm and 2.0 mm.

5. The tyre of claim 1, wherein:

a central line of the tread defines a first half of the tread and a second half of the tread, wherein:

the first half comprises a first number of studs and the second half comprises a second number of studs such that:

a ratio of the first number to the second number is 90% to 110%.

6. The tyre of claim 1, wherein:

the tread has a first width and a first circumference, the tread comprises a total number of studs, and a ratio of the total number of studs to the product of the first width and the first circumference is more than 5.6 pieces per square-decimetre.

7. The tyre of claim 1, wherein:

the tread comprises tread blocks such that grooves are arranged between the tread blocks, and at least some of the grooves are inclined such that the at least some of the grooves define a V-shape or a half of a V-shape, the V-shape or the half of a V-shape defining a direction of rotation of the tyre when used driving forwards, the direction of rotation being reverse to a direction to which the V-shape or the half of a V-shape opens.

8. The tyre of claim 1, wherein:

the dynamic stiffness of the underlayer is configured to be less than 25 MPa, determined at 20° C., and the dynamic stiffness of the underlayer, determined at 0° C., is configured to be at least 2 times the dynamic stiffness of the underlayer determined at 20° C., determined according to the standard ISO 4664-1:2011.

9. The tyre of claim 1, wherein:

an axial edge of the strand is arranged closer to the first round than to the second round or the first round forms the axial edge of the strand; and the first round is arranged a distance apart from the axial edge of the strand, the distance being at most five times the width of the strand or the first round forms the axial edge of the strand;

the distance is at most three times the width of the strand or the first round forms the axial edge of the strand.

10. The tyre of claim 1, wherein:

the width of the strand is 6 mm to 18 mm and/or the first spacing between the first round of the strand and the second round of the strand is 10% to 40% of the width of the strand.

11. The tyre of claim 1, wherein the first spacing is 15% to 25% of the width of the strand.

12. The tyre of claim 1, wherein an average thickness of the underlayer is 1.0 to 6.0 mm.

13. The tyre of claim 1, wherein a thickness of the intermediate layer, determined at a location wherein the intermediate layer is surrounding a stud, is 0.4 mm to 7 mm.

14. The tyre of claim 1, wherein a hardness of the intermediate layer is 66 to 80 ShA.

15. The tyre of claim 1, wherein one or more studs of the plurality of studs each comprises:

a base flange, a second part, the second part being joined to the base flange and extending in a longitudinal direction of the stud from the base flange, and a pin protruding from the second part in the longitudinal direction of the stud, the pin comprising metal or ceramic, wherein:

the base flange has a first cross-section on a plane to which the longitudinal direction of the stud is normal, the first cross-section having a first area, the pin has a second cross-section on a plane to which longitudinal direction of the stud is normal, the second cross-section having a second area, and the first area is 20 mm$^2$ to 80 mm$^2$.

16. The tyre of the claim 15, wherein in each one of the one or more studs of the plurality of studs:

a ratio of the first area to the second area is 6.5 to 21.

17. The tyre of claim 15, wherein in each one of the one or more studs of the plurality of studs:

the pins protrude a first height from the second part of the stud in the longitudinal direction of the stud, wherein a ratio of the first area to the first height is 20 to 50 mm$^2$/mm.

18. The tyre of claim 15, wherein in each one of the one or more studs of the plurality of studs:

the second cross-section has at least one and at most three axes of symmetry.

19. The tyre of claim 1, wherein;

a position of a tan delta maximum of the underlayer and/or the first rubber compound is configured to be between –10° C. and +15° C., determined according to ISO 4664-1:2011 in compression.

20. The tyre of claim 19, wherein:

the dynamic stiffness of the underlayer is configured to be less than 25 MPa, determined at 20° C., and the dynamic stiffness of the underlayer, determined at 0° C., is configured to be at least 2 times the dynamic stiffness of the underlayer determined at 20° C., determined according to ISO 4664-1:2011 in compression;

the dynamic stiffness of the underlayer determined at –25° C., is configured to be at least 20 times the dynamic stiffness of the underlayer determined at +20° C., determined according to the standard ISO 4664-1:2011.

21. The tyre of claim 1, wherein:

the plurality of studs include a second group of studs, each stud of the second group of studs comprising a base flange, and each stud of the second group of studs is arranged such that a part of the strand is arranged radially inward from at least a part of the base flange of the stud of the second group.

22. The tyre of claim 21, wherein at least a part of the studs of the second group belong to the first group of studs.

23. The tyre of claim 1, wherein the strand comprises fibres made of polyamide 6 or polyamide 6.6.

24. The tyre of claim 23, wherein the first spacing is 15% to 25% of the width of the strand.

25. An arrangement comprising:

a first tyre according to claim 1, and a second tyre comprising a second tread and a plurality of studs in the second tread such that at least pins of the studs are exposed on the second tread, the second tyre being configured such that:

a second load index of the second tyre as defined in The European Tyre and Rim Technical Organization Standards Manual (2023) table G.7 is from eighty six to one hundred sixteen and a second road wear of the second tyre as measured according to the standard SFS7503:2022:en is less than the value calculatable by the formula $-0.000139 \times LI_2^2 + 0.0431 \times LI_2 - 1.90$, wherein the second load index is not equal to the load index of the first tyre.

* * * * *